United States Patent
Abdulla et al.

(10) Patent No.: US 12,339,128 B2
(45) Date of Patent: Jun. 24, 2025

(54) DYNAMICALLY DETERMINING PROVIDER-TRANSPORTATION ROUTES AND RENTAL-VEHICLE ROUTES FOR A MULTI-MODAL GRAPHICAL USER INTERFACE

(71) Applicant: Lyft, Inc., San Francisco, CA (US)

(72) Inventors: Keith Amir Abdulla, San Francisco, CA (US); Jimmy Pulimoottil Alexander, San Mateo, CA (US); Balaji Chandrasekhar, San Francisco, CA (US); Victor Steven Gallet, San Mateo, CA (US); Derek John Knapp, San Francisco, CA (US); Mayank Manesh Makwana, San Francisco, CA (US); Mallory Jackson Paine, Alpharetta, GA (US); Gordon Dee Tindall, Los Angeles, CA (US); Raghul Siddarthan Velusamy, Santa Clara, CA (US)

(73) Assignee: Lyft, Inc., San Francisco, CA (US)

( * ) Notice: Subject to any disclaimer, the term of this patent is extended or adjusted under 35 U.S.C. 154(b) by 671 days.

(21) Appl. No.: 16/834,977

(22) Filed: Mar. 30, 2020

(65) Prior Publication Data
US 2021/0302174 A1 Sep. 30, 2021

(51) Int. Cl.
*G01C 21/00* (2006.01)
*B60K 35/00* (2024.01)
(Continued)

(52) U.S. Cl.
CPC .......... *G01C 21/3423* (2013.01); *B60K 35/00* (2013.01); *B60R 25/2018* (2013.01);
(Continued)

(58) Field of Classification Search
CPC ............ G01C 21/3423; G01C 21/3453; G01C 21/3676; G01C 21/3697; B60K 35/00;
(Continued)

(56) References Cited

U.S. PATENT DOCUMENTS

| 4,815,190 A | 3/1989 | Haba, Jr. et al. |
| 6,324,749 B1 | 12/2001 | Katsuura et al. |

(Continued)

FOREIGN PATENT DOCUMENTS

| DE | 102016107091 A1 * | 11/2016 | ............. B64C 39/00 |
| JP | 5777373 B2 | 9/2015 | |

(Continued)

OTHER PUBLICATIONS

Nam, D., Yang, D., An, S., Yu, JG, Jayakrishnan, R., & Masoud, N. (2018). Designing a Transit-Feeder System using Multiple Sustainable Modes: Peer-to-Peer (P2P) Ridesharing, Bike Sharing, and Walking. Transportation Research Record, 2672(8), 754-763. http://dx.doi.org/10.1177/0361198118799031 (Year: 2018).*

(Continued)

*Primary Examiner* — Russell Frejd
*Assistant Examiner* — Brittany Renee Peko
(74) *Attorney, Agent, or Firm* — Keller Preece PLLC

(57) ABSTRACT

The present disclosure relates to systems, non-transitory computer-readable media, and methods for determining different routes along which provider vehicles and rental vehicles can transport a requestor to a destination. For instance, in some cases, a multi-modal-transportation system receives a transportation request that includes a pickup location and a destination location. The multi-modal-transportation system analyzes the transportation request to generate (i) a provider transportation route by which a provider vehicle transports the requestor to the destination location and (ii) a rental route by which one or more intermediate (Continued)

vehicles and a rental vehicle transport the requestor along rental-route segments to the destination location. The multi-modal-transportation system further transmits data for both routes to a requestor device to display within a multi-modal graphical user interface.

20 Claims, 16 Drawing Sheets

(51) Int. Cl.
| | |
|---|---|
| B60K 35/80 | (2024.01) |
| B60K 35/85 | (2024.01) |
| B60R 25/20 | (2013.01) |
| G01C 21/34 | (2006.01) |
| G06Q 10/02 | (2012.01) |
| G06Q 30/0645 | (2023.01) |
| G06Q 50/40 | (2024.01) |
| H04W 4/02 | (2018.01) |
| H04W 4/021 | (2018.01) |
| H04W 4/40 | (2018.01) |

(52) U.S. Cl.
CPC ......... *G01C 21/3453* (2013.01); *G06Q 10/02* (2013.01); *G06Q 30/0645* (2013.01); *G06Q 50/40* (2024.01); *H04W 4/021* (2013.01); *H04W 4/023* (2013.01); *H04W 4/40* (2018.02); *B60K 35/80* (2024.01); *B60K 35/85* (2024.01); *B60K 2360/563* (2024.01); *B60K 2360/589* (2024.01)

(58) Field of Classification Search
CPC ........ B60K 2370/563; B60K 2370/589; B60K 2370/166; B60K 2370/566; B60R 25/2018; G06Q 10/02; G06Q 30/0645; G06Q 50/30; H04W 4/021; H04W 4/023; H04W 4/40; H04W 4/024
See application file for complete search history.

(56) References Cited

U.S. PATENT DOCUMENTS

| | | | |
|---|---|---|---|
| 6,772,027 B2 | 8/2004 | Kurihara | |
| 8,849,685 B2 | 9/2014 | Oden | |
| 8,949,028 B1* | 2/2015 | Klampfl | G01C 21/3423 |
| | | | 701/538 |
| 10,096,176 B1 | 10/2018 | Namineni et al. | |
| 10,185,921 B1 | 1/2019 | Heller et al. | |
| 10,708,277 B2 | 7/2020 | Thorley et al. | |
| 10,895,463 B1* | 1/2021 | Cope | G01C 21/3438 |
| 11,402,223 B1* | 8/2022 | Grealish-Rust | G01C 21/3614 |
| 2002/0082814 A1 | 6/2002 | Doner | |
| 2002/0152615 A1 | 10/2002 | Kurihara | |
| 2005/0073434 A1 | 4/2005 | Arquette et al. | |
| 2005/0089053 A1 | 4/2005 | Zhu | |
| 2005/0257358 A1 | 11/2005 | Giarrizzo, Jr. | |
| 2007/0050221 A1 | 3/2007 | Singh et al. | |
| 2008/0010107 A1 | 1/2008 | Small et al. | |
| 2008/0133283 A1 | 6/2008 | Backer et al. | |
| 2009/0106036 A1 | 4/2009 | Tamura et al. | |
| 2011/0060480 A1 | 3/2011 | Mottla et al. | |
| 2011/0314665 A1 | 12/2011 | Kilibarda | |
| 2013/0238167 A1* | 9/2013 | Stanfield | G06F 17/00 |
| | | | 701/2 |
| 2013/0318002 A1 | 11/2013 | Tomiyama et al. | |
| 2014/0129301 A1 | 5/2014 | Van Wiemeersch et al. | |
| 2015/0206206 A1 | 7/2015 | Puente et al. | |
| 2016/0078695 A1 | 3/2016 | McClintic et al. | |
| 2016/0093216 A1 | 3/2016 | Lee et al. | |
| 2016/0140649 A1 | 5/2016 | Kleve et al. | |
| 2016/0298977 A1* | 10/2016 | Newlin | G01C 21/3423 |
| 2016/0352113 A1 | 12/2016 | Zhao et al. | |
| 2016/0364678 A1* | 12/2016 | Cao | G06Q 10/083 |
| 2017/0153624 A1 | 6/2017 | Cameron | |
| 2017/0316535 A1 | 11/2017 | Hirose et al. | |
| 2018/0253700 A1 | 9/2018 | Coquillette et al. | |
| 2018/0276595 A1 | 9/2018 | Gariepy et al. | |
| 2019/0025856 A1 | 2/2019 | Turato et al. | |
| 2019/0057335 A1 | 2/2019 | Dyer | |
| 2019/0080274 A1 | 3/2019 | Kovach et al. | |
| 2019/0139258 A1 | 5/2019 | Slattery et al. | |
| 2019/0318549 A1 | 10/2019 | Zeira et al. | |
| 2020/0111268 A1* | 4/2020 | Montague | G07B 15/02 |
| 2020/0132480 A1* | 4/2020 | Majima | G01C 21/3423 |
| 2020/0258018 A1 | 8/2020 | Brady | |
| 2020/0273333 A1* | 8/2020 | Elshenawy | G08G 1/096805 |
| 2020/0342418 A1 | 10/2020 | Zatta et al. | |
| 2020/0342419 A1 | 10/2020 | Zatta et al. | |
| 2020/0342420 A1 | 10/2020 | Zatta et al. | |
| 2020/0356909 A1* | 11/2020 | Tan | G06Q 10/025 |
| 2020/0394623 A1 | 12/2020 | Gardner et al. | |
| 2021/0101563 A1 | 4/2021 | Azarko | |
| 2021/0304153 A1 | 9/2021 | Calvillo et al. | |
| 2022/0333936 A1* | 10/2022 | Schirano | G01C 21/3423 |

FOREIGN PATENT DOCUMENTS

| | | |
|---|---|---|
| KR | 10-2016-0103376 A | 9/2016 |
| WO | 2004-059446 A2 | 7/2004 |
| WO | 2005-124699 A1 | 12/2005 |
| WO | WO 2012-157343 A1 | 11/2012 |
| WO | 2013-061289 A1 | 5/2013 |
| WO | 2013-177087 A2 | 11/2013 |
| WO | 2017-205961 A1 | 12/2017 |
| WO | 2018-102475 A1 | 6/2018 |

OTHER PUBLICATIONS

U.S. Appl. No. 16/727,773, Sep. 6, 2022, Office Action.
U.S. Appl. No. 16/727,746, Nov. 22, 2022, Office Action.
International Search Report and Written Opinion as received in PCT/US2020/030297 dated Aug. 12, 2020.
U.S. Appl. No. 16/727,773, Mar. 13, 2023, Office Action.
U.S. Appl. No. 16/727,746, May 24, 2023, Office Action.
Bhadra, Dipasis, David A. Knorr, and Benjamin Levy. "Benefits of virtual queuing at congested airports using ASDE-X: A case study of JFK airport." Air Traffic Control Quarterly 20.3 (2012): 225-251.
U.S. Appl. No. 16/727,715, Aug. 17, 2023, Office Action.
U.S. Appl. No. 16/727,746, Dec. 6, 2023, Office Action.
U.S. Appl. No. 16/727,715, Apr. 24, 2024, Office Action.
U.S. Appl. No. 17/138,658, Apr. 11, 2024, Office Action.
"How HyreCar Works." Retrieved from [URL: https://web.archive.org/web/20200713184448/https://www.hyrecar.com/howitworks] on Nov. 20, 2024, Archived on Jul. 13, 2020. (Year: 2020).
"HyreCar Deploys Mobile App w/Identity Verification." Online Product News, 38.4 Worldwide Videotex, Apr. 1, 2019. (Year: 2019).
"HyreCar Provides Corporate Update and New Insurance Partnership with Lloyd's Apollo Insurance Syndicate." Business Wire, Jun. 16, 2020. (Year: 2020).
U.S. Appl. No. 17/138,658, Nov. 27, 2024, Office Action.
U.S. Appl. No. 16/727,746, Jul. 25, 2024, Office Action.
U.S. Appl. No. 16/727,715, Sep. 4, 2024, Notice of Allowance.
U.S. Appl. No. 17/138,658, Mail Date Mar. 27, 2025, Office Action.

* cited by examiner

Intermediate Vehicles 124

- Scooter 132

- Bicycle 134

- Autonomous Vehicle 136

- Intermediate Provider Vehicle 138

- Public Transportation Vehicles 140

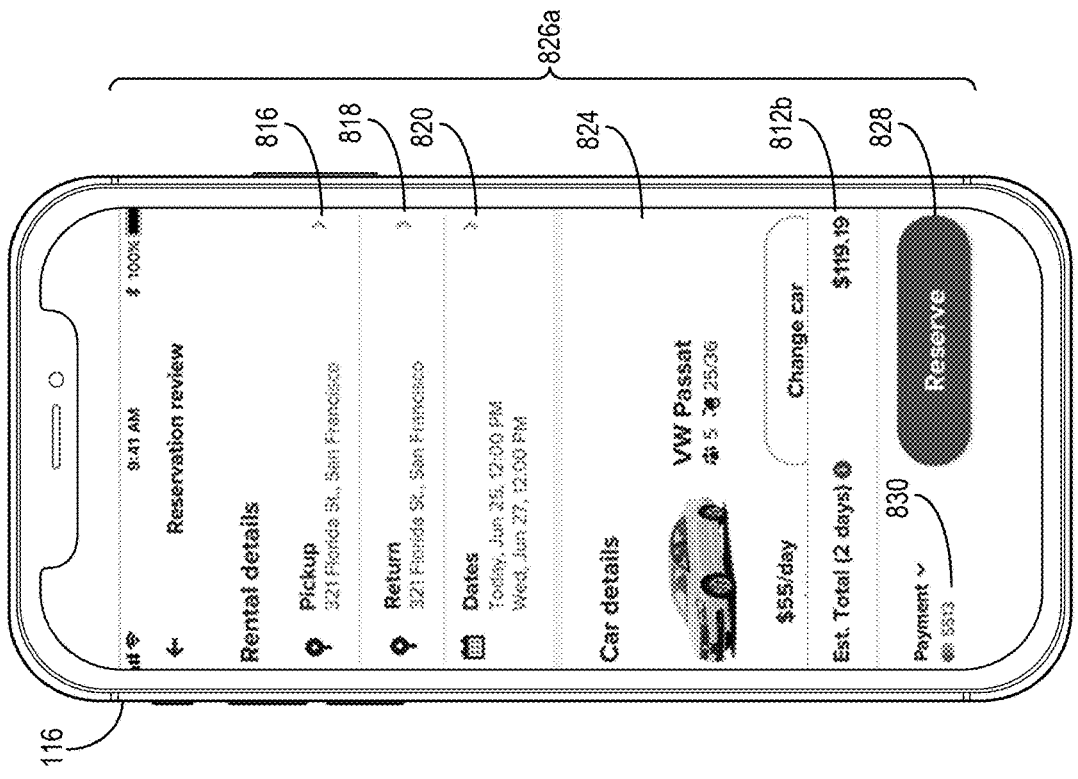
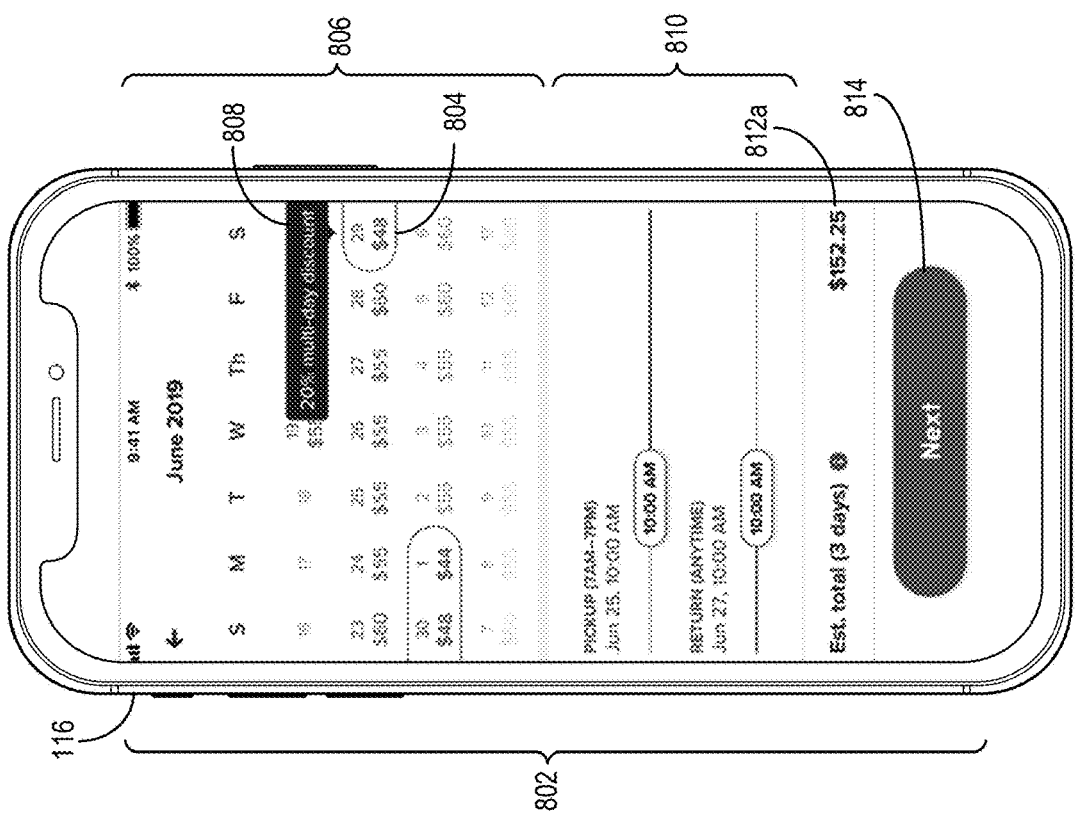
Fig. 8B
Fig. 8A

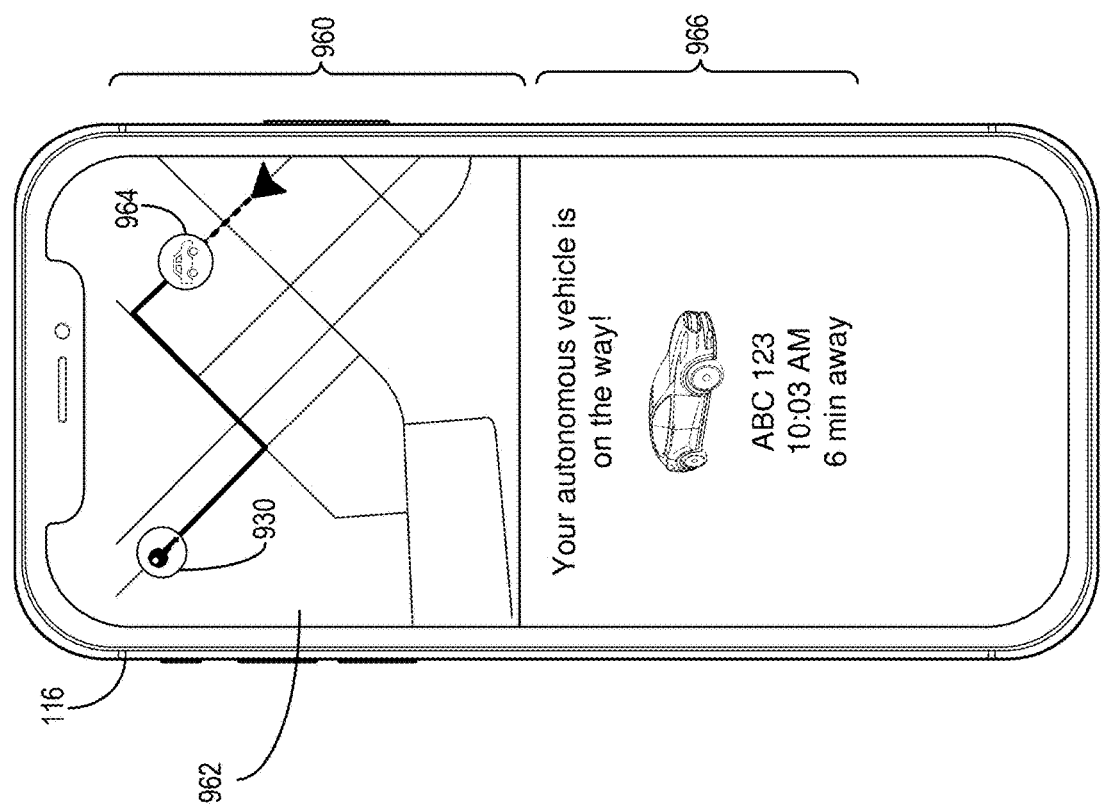

DYNAMICALLY DETERMINING PROVIDER-TRANSPORTATION ROUTES AND RENTAL-VEHICLE ROUTES FOR A MULTI-MODAL GRAPHICAL USER INTERFACE

BACKGROUND

In recent years, ride sharing systems have introduced significant technological improvements in mobile app-based matching of transportation providers and requestors. Indeed, the proliferation of web and mobile applications enable requesting computer devices to submit transportation requests via ride sharing systems. On-demand ride sharing systems can identify available provider computing devices that can provide transportation services from one geographic location to another and efficiently identify digital matches between provider computing devices and requestor computing devices.

Although conventional ride sharing systems can match requesting computing devices with provider computing devices, conventional ride sharing systems often face a number of technical problems, particularly with regard to practicality, efficiency, and flexibility of operation. Conventional ride sharing systems are often impractical because they generate impractical transportation matches between requestor computing devices and provider computing devices. For example, conventional ride sharing systems often simply forward transportation requests to available drivers, even if the transportation requests include impractical destinations. In some such cases, conventional systems generate long transportation routes that require providers to travel longer distances (e.g., 3 hours or more) to and from destination locations. Conventional systems may also generate transportation requests to remote locations. Available providers often cancel rides or otherwise avoid fulfilling impractical rides. Thus, conventional ride sharing systems often generate one or more impractical transportation matches between requestor computing devices and provider computing devices.

In addition to accuracy concerns, conventional ride sharing systems often have limited functionality. In particular, some conventional ride sharing systems only provide the option to match provider vehicles with requestors. Furthermore, conventional ride sharing systems are often isolated from other services that identify and remedy implausible transportation requests. For example, some conventional ride sharing systems simply generate implausible transportation requests and require users to access additional systems to remedy impractical requests.

In addition to limited functionality, some conventional ride sharing systems impose rigid computing algorithms or models when analyzing request data to match requestors with providers. In particular, conventional systems frequently rigidly focus on inflexible parameters that offer limited information regarding the practicality of a ride. For example, some conventional systems rigidly rely on location data of provider and requestor computing devices to determine transportation matches between providers and requestors within proximity to each other. Focusing rigidly on location data along with request pickup and drop off points, for example, often leads to generating impractical rides. Indeed, even if conventional systems can identify an implausible ride, conventional systems often fail to adapt to remedy implausible rides.

These and other disadvantages exist with respect to conventional ride sharing systems.

SUMMARY

This disclosure describes one or more embodiments of systems, methods, and non-transitory computer readable media that provide benefits and solve one or more of the foregoing or other problems. In particular, the disclosed system determines different routes along which provider vehicles and rental vehicles can transport a requestor to a destination (upon request) and transmits provide indicators of such routes to a computing device of the requestor for display in a multi-modal graphical user interface. After receiving a transportation request from a requestor's computing device, for instance, the disclosed system can analyze the transportation request to determine different routes and alternative vehicles for transporting a requestor to a destination. To determine and present one mode of transportation, the disclosed system can generate a route by which an available provider vehicle may transport the requestor to a destination location. To determine and present another mode (or modes) of transportation, the disclosed system can generate another route by which an intermediate vehicle and a rental vehicle transport the requestor along route segments to the destination location. The disclosed system can further transmit data for both routes to a requestor computing device to display route options within a multi-modal graphical user interface. By intelligently determining when to generate different modes of transportation for a multi-modal graphical user interface, the disclosed system flexibly adjusts and suggests different transportation options based on transportation-request data.

BRIEF DESCRIPTION OF THE DRAWINGS

Various embodiments will be described and explained with additional specificity and detail through the use of the accompanying drawings in which:

FIGS. 8A-8D illustrate graphical user interfaces for receiving requestor-modified rental parameters in accordance with one or more embodiments.

FIGS. 9A-9E illustrate graphical user interfaces identifying intermediate vehicles and presenting intermediate routes to locations of intermediate vehicles in accordance with one or more embodiments.

DETAILED DESCRIPTION

Figure 1A:
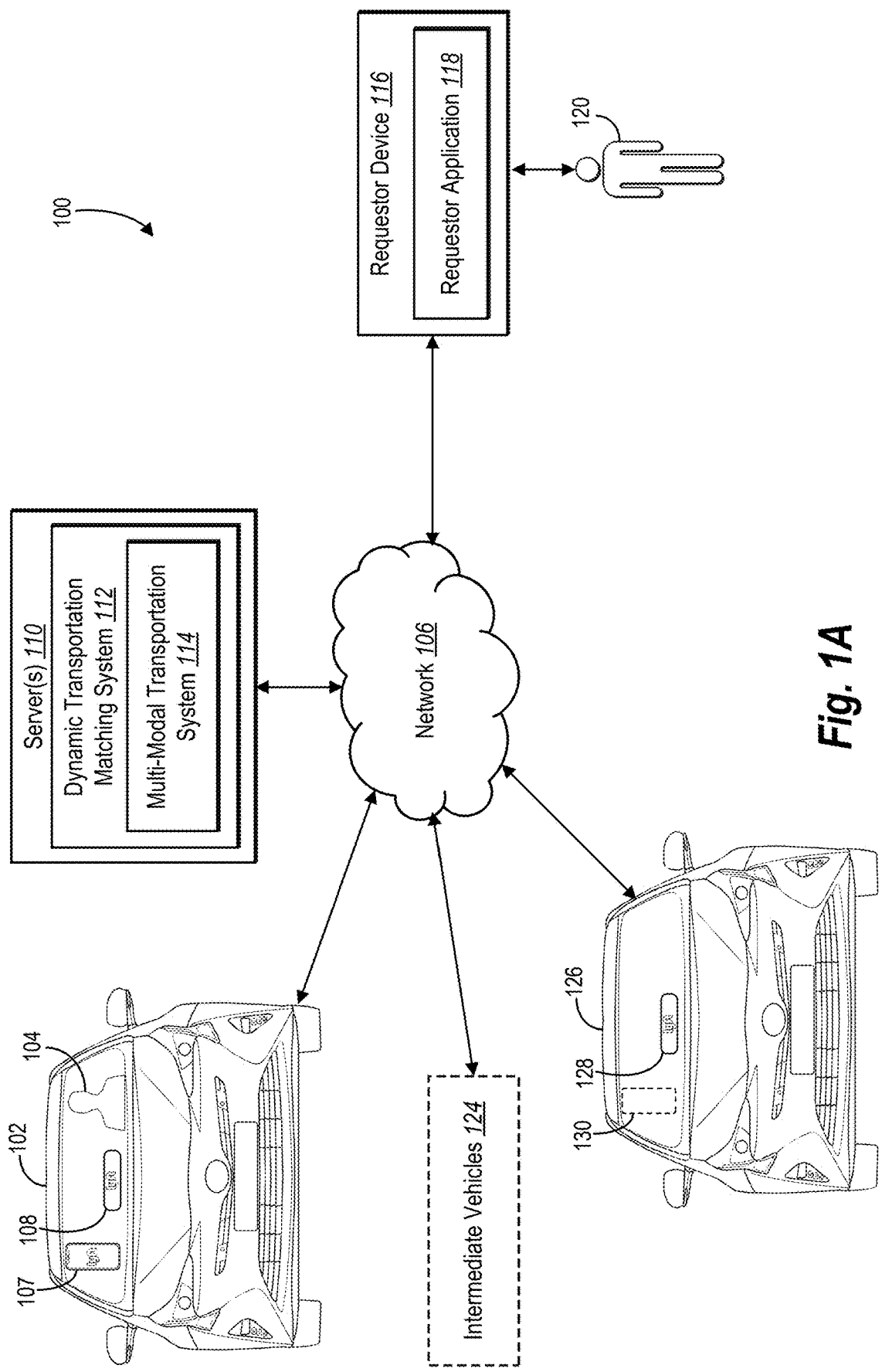
FIGS. 1A-1B illustrate an environment in which a multi-modal-transportation system can operate and various transportation vehicles in accordance with one or more embodiments.

This disclosure describes one or more embodiments of a multi-modal-transportation system that determines different routes along which provider vehicles and rental vehicles can transport a requestor to a destination (upon request) and provide indicators of such routes to a computing device of the requestor for display in a multi-modal graphical user interface. In particular, the multi-modal-transportation system can receive a transportation request from a computing device indicating a pickup location and a destination location. The multi-modal-transportation system can further analyze the transportation request by analyzing historical transportation data, distance between pickup and destination locations, destination location characteristics, or other signals. Based on analyzing the transportation request, the multi-modal-transportation system can determine different routes and alternative vehicles for transporting a requestor to a destination.

To determine one mode of transportation involving a provider, the multi-modal-transportation system can generate a provider transportation route by which an available provider vehicle may transport the requestor to a destination location. To determine another mode (or modes) of transportation involving a rental vehicle, the multi-modal-transportation system can generate a rental route by which an intermediate vehicle and a rental vehicle transport the requestor along different segments of the rental route to the destination location. The multi-modal-transportation system can further transmit data for both routes to a requestor computing device for display within a multi-modal graphical user interface.

As suggested above, in certain implementations, the multi-modal-transportation system analyzes the transportation request to intelligently determine whether or not to present a rental route to a requestor. In some cases, the multi-modal-transportation system determines not to present or transmit indicators for a rental route in response to a given transportation request. For instance, the multi-modal-transportation system may determine that a provider transportation route involving a provider vehicle represents a practical and economical option for transporting the requestor to a requested destination location. To determine whether to transmit indicators for a rental route, the multi-modal-transportation system analyzes data signals associated with the transportation request, including transportation-request characteristics, destination-location characteristics, historical transportation data for transportation vehicles or the requestor in a relevant geographic area, rental rates, provider-vehicle rates, or other data.

As mentioned, the multi-modal-transportation system can determine a rental route based on a transportation request. In particular, the multi-modal-transportation system can identify an available rental vehicle at a rental-vehicle location. For example, the multi-modal-transportation system can access rental vehicle data to identify available rental vehicles and access location data of the available vehicles to determine an available rental vehicle near a pickup location. The multi-modal-transportation system may also determine a first segment of the rental route from the pickup location to the location of the rental vehicle (or simply the "rental-vehicle location") and a second segment of the rental route from the location of the rental vehicle to the destination location.

As part of generating a rental route, in some cases, the multi-modal-transportation system determines intermediate vehicles to transport the requestor along a segment of the rental route from a pickup location to a location of the rental vehicle. For example, the multi-modal-transportation system may transmit instructions to an autonomous vehicle or to a provider vehicle to pick up and transport the requestor to the location of the rental vehicle. Additionally, or alternatively, the multi-modal-transportation system may identify other intermediate vehicles and determine an intermediate route for a requestor to travel to a location of such an intermediate vehicle, such as an autonomous vehicle, scooter, bicycle, or public transportation vehicle. The multi-modal-transportation system may also mix and match intermediate vehicles to decrease the time required to transport the requestor to the location of the rental vehicle. For example, in some cases, the multi-modal-transportation system generates an intermediate route by which the requestor rides a scooter to a bus stop or other intermediate stop, then takes the bus or other intermediate vehicle directly to the location of the rental vehicle.

In addition to generating a rental route, in certain implementations, the multi-modal-transportation system dynamically determines a rate for the rental route. For instance, the multi-modal-transportation system can determine a first estimated rate for a first segment of the rental route for one or more intermediate vehicles and a second estimated rate for a second segment of the rental route for the rental vehicle. The multi-modal-transportation system can analyze intermediate vehicle data to estimate a rate for the intermediate vehicle(s) of the first segment based on a per-use basis, time, or distance. Additionally, the multi-modal-transportation system can estimate a rate for the rental vehicle based on an estimated rental vehicle daily rate, a rental duration, rental pickup and return locations, estimated insurance rate, estimated fuel rate, and/or other rates.

As further suggested above, the multi-modal-transportation system may also transmit data for a rental route and a provider transportation route to a computing device for display in a multi-modal graphical user interface. For instance, the multi-modal-transportation system can transmit route data, including rates, time to destination, and other relevant information to a requestor device. Based on receiving an indication of a user selection of the provider transportation route, the multi-modal-transportation system can send a provider request to a corresponding provider device or otherwise match a requestor with a provider. Based on receiving an indication of the requestor selecting the rental route, the multi-modal-transportation system can send prompts to the requestor device to either confirm or modify rental parameters, such as rental duration, rental pickup location, rental drop-off location, and other relevant parameters.

In addition to providing indicators for different routes and parameters, the multi-modal-transportation system can facilitate identification and access of the rental vehicle by the requestor. For instance, the multi-modal-transportation system may pair a requestor with a rental vehicle and aid the requestor in identifying the paired rental vehicle. In some cases, the multi-modal-transportation system transmits a rental-vehicle-matching identifier to both a requestor device and a vehicle-display device of the rental vehicle. Based on receiving the rental-vehicle-matching identifier, the requestor device and the vehicle-display device can present a visual indicator representing the matching between the rental vehicle and the mobile device. As a further example, in some cases, the multi-modal-transportation system can facilitate access of the rental vehicle by transmitting a virtual key for the rental vehicle to the requestor device for the requestor to access the rental vehicle.

The multi-modal-transportation system can provide numerous advantages, benefits, and practical applications relative to conventional systems. For instance, the multi-modal-transportation system is often more practical than conventional systems. By analyzing the transportation request, the multi-modal-transportation system can identify transportation requests for which a provider transportation route may be impractical. For example, the multi-modal-transportation system can determine that a transportation request including a remote destination or excessive requested stops is impractical for a provider transportation route. Based on analyzing the transportation request, the multi-modal-transportation system may also generate and transmit a more practical rental route. Thus, the multi-modal-transportation system can improve practicality relative to conventional systems.

As suggested above, the multi-modal-transportation system solves several technical problems that hinder conventional ride sharing systems. In some cases, the multi-modal-transportation system improves the practicality and efficiency with which a ride sharing system determines and customizes transportation options for a transportation request. As suggested above, some conventional ride sharing systems isolate rideshare options from other services, such as rental vehicles. By contrast, the multi-modal-transportation system intelligently generates routes for both a rental vehicle and a provider vehicle based on a transportation request. By running an algorithm to intelligently identify when a provider vehicle would be impractical or too costly for a transportation request—and suggesting a rental route by which a rental vehicle may transport a requestor to a requested destination—the multi-modal-transportation system efficiently identifies and customizes both a provider-vehicle option and a rental-vehicle option for a requestor within a single multi-modal graphical user interface. For example, in some cases, the multi-modal-transportation system suggests a rental route for display on a requestor device based on determining that the provider-vehicle option is too costly, long, or includes multiple stops.

In addition to improving the efficiency of ride sharing systems, the multi-modal-transportation system improves flexibility of operation relative to conventional systems. As noted above, conventional ride sharing systems often impose rigid computing algorithms or models when analyzing request data to match requestors with providers based on location data alone. By accessing and analyzing diverse sets of data signals, by contrast, the multi-modal-transportation system can intelligently determine transportation requests for which to transmit a rental route to a corresponding computing device. For example, the multi-modal-transportation system can access and analyze transportation request characteristics, destination characteristics, historical transportation data for providers and for the requestor, and compare rental vehicle and provider-vehicle rates—as part of a flexible algorithm or model that presents both provider-vehicle options and rental-vehicle options. Accordingly, the multi-modal-transportation system can flexibly rely on available data signals to determine and transmit rental route indicators.

In terms of improving efficiency, the multi-modal-transportation system also generates user interfaces and tools that efficiently and intuitively display transportation options. As mentioned above, some conventional ride sharing systems present limited transportation options and thus require users to access multiple applications to identify and compare various transportation options. Further to the point, conventional systems often fail to provide additional tools for arranging more than one transportation option. Unlike such conventional systems, the multi-modal-transportation system can provide interactive elements within a single graphical user interface (or a combination of graphical user interfaces) that facilitate easy user access to information or functionalities related to various transportation options. For instance, the multi-modal-transportation system can transmit a multi-modal graphical user interface including both a provider-vehicle option and a rental-vehicle option from which a requestor can select a transportation option in a consolidated user interface. By presenting the various transportation options, the multi-modal-transportation system can quickly summarize or guide a requestor through routes corresponding to a provider-vehicle option or a rental-vehicle option based on detected user interaction with the interactive elements-thereby reducing navigation across multiple user interfaces or platforms in comparison to conventional systems.

As illustrated by the foregoing discussion, the present disclosure utilizes a variety of terms to describe features and advantages of the ridership error detection system. For example, as used herein, the term "mobile device" refers to a mobile computing device. In particular, a mobile device can include a computing device operated by a user and may include a desktop computer, a laptop, tablet, a smartphone, or other mobile computing device. Additionally, a mobile device may be associated with a requestor or a provider. For example, a requestor mobile device refers to a mobile device associated with a requestor who submits a transportation request (via a dynamic transportation matching system).

Relatedly, the term "provider device" refers to a computing device associated with (or used by) a provider or a transportation vehicle. In some embodiments, a provider device includes a provider application comprising instructions that (upon execution) cause the provider device to perform various actions for a dynamic transportation matching system, as described herein. Such instructions may likewise cause a provider device to present a graphical user interface including driving-event scores, provider ratings, or location ratings. By contrast, the term "requester device" refers to a computing device associated with (or used by) a requester. In some embodiments, a requester device includes a requester application comprising instructions that (upon execution) cause the requester device to perform various actions for a transportation matching system, as described herein.

As used herein, the term "transportation request" refers to a request from a requesting individual (i.e., a requestor) for transport by a transportation vehicle. In particular, a transportation request includes a request for a transportation vehicle to transport a requestor or a group of individuals from one geographic area to another geographic area. A transportation request can include information such as a pickup location, a destination location (e.g., a location to which the requestor wishes to travel), a request location (e.g., a location from which the transportation request is initiated), location profile information, a requestor rating, or a travel history. As an example of such information, a transportation request may include an address as a destination location and the requestor's current location as the pickup location.

Relatedly, the term "requestor" refers to a person who submits (or is projected to submit) a transportation request to a transportation matching system and/or who interacts with a requestor device. For instance, a requestor includes a person who interacts with a requestor device to send a transportation request to a dynamic transportation matching system. After a dynamic transportation matching system matches a requestor with a provider, the requestor can await pickup by a provider at a predetermined pickup location, travel to or await an intermediate vehicle, or travel to a rental-vehicle location.

As used herein, the term "data signals" refers to data indicating an attribute, characteristic, condition, or element of a transportation request. For example, data signals include information in a transportation request required to complete the transportation request. For example, data signals include general transportation request data including the pickup location and the destination location. Additionally, data signals can also refer to data associated with a transportation request. For example, data signals also include potential routes from a pickup location to a destination location, historical transportation data for provider vehicles, historical transportation data for the requestor, a provider-vehicle rate, a rental-vehicle rate, and other data signals.

As used herein, the term "provider transportation route" refers to a course or route from one location to another location for a provider. In particular, a provider transportation route includes a projected route by which a provider vehicle transports a requestor from one location to another location. For example, the provider transportation route includes a projected way by which a provider vehicle transports a requestor from a pickup location to a destination location.

As used herein, the term "provider vehicle" refers to a vehicle operated by a provider that transports one or more persons. Such vehicles may include, but are not limited to, an automobile, airplane, boat, motorcycle, or other vehicle. As indicated above, the multi-modal-transportation system can arrange for a provider vehicle to transport the requestor directly from the pickup location to the destination location.

Provider vehicles may be associated with a human operator or provider. The term "provider" refers to a driver or other person who operates a transportation vehicle and/or who interacts with a provider device. For instance, a provider includes a person who drives a transportation vehicle along various transportation routes to pick up and drop off requestors. The multi-modal-transportation system can send, to a provider device associated with the provider vehicle, transportation request data including the pickup location, requestor identification information, route data, and other data required to pick up the requestor and transport the requestor to the destination location.

As used herein, the term "intermediate vehicle" refers to a vehicle that transports a requestor along a segment of a route. In particular, an intermediate vehicle includes a vehicle that transports the requestor from an initial location to a rental-vehicle location or to another location en route to the rental-vehicle location. For example, intermediate vehicles can include, but are not limited to, autonomous vehicles, scooters, bicycles, public transportation vehicles (e.g., bus, train, subway, ferry), and other vehicles. In some cases, intermediate transport vehicles can include provider vehicles that transport a requestor to the rental-vehicle location.

As used herein, the term "rental route" refers to a course or route from one location to another location involving a rental vehicle and optionally an intermediate vehicle. In particular, a rental route includes a projected route comprising route segments by which one or more intermediate vehicles and a rental vehicle transports a requestor to a destination location. For example, a rental route includes the a route segment by which a requestor travels on foot or via an intermediate vehicle to a rental-vehicle location and the route segment by which the requestor travels to the destination location using a rental vehicle.

Relatedly, the term "segment" or "route segment" refers to a part or portion of a larger transportation route. In particular, a segment includes a portion of a route along which a transportation vehicle transports a requestor or a requestor travels on foot or other independent transportation. For example, a rental route can include two segments. To illustrate, for a first segment between a pickup location and a rental-vehicle location, a requestor may use one or more intermediate vehicles. For a second segment, the requestor may travel from the rental-vehicle location to a destination location by operating a rental vehicle.

As used herein, the term "rental vehicle" refers to a transportation vehicle for rent by a requestor. In particular, a rental vehicle includes a transportation vehicle operated by a requestor to transport the requestor to a destination location or to a waypoint or an intermediate location en route to a destination location. Such vehicles may include, but are not limited to, an automobile, airplane, boat, motorcycle, or other vehicle. Rental vehicles may be stored at rental-vehicle locations. Additionally, rental vehicles may include various components including a vehicle-display device and various telematics systems, such as a Global Positioning System ("GPS"), fuel usage monitors, accelerometers, and other systems.

Relatedly, the term "vehicle-display device" refers to a computing device associated with a vehicle for communicating any combination of graphics, messages, colors, or patterns. In some embodiments, for instance, a vehicle-display device comprises a digital display for presenting a graphic or a message identifying a rental vehicle (or other vehicle) for a requestor. In other embodiments, a vehicle-display device comprises a device including a panel of Light-Emitting Diodes (LED). The vehicle-display device may be located inside (e.g., on the dashboard) or outside (e.g., affixed to the windshield or body) of the vehicle. In certain implementations, the vehicle-display device can present a graphic, message, color, or pattern identifying a vehicle based on a rental-vehicle-matching identifier. Further, a vehicle-display device optionally presents such graphics, messages, colors, or patterns in a user interface based on interactions with a requestor or provider (e.g., user selection of buttons or instructions from a client device).

As used herein, the term "multi-modal graphical user interface" refers to a graphical user interface comprising various different transportation modes or routes. In particular, a multi-modal graphical user interface can include information for at least a rental route and a provider transportation route. In some embodiments, a multi-modal graphical user interface can also include information for other routes, including public transit routes, walking routes, bikeshare routes, driving routes, etc. A multi-modal graphical user interface can also include interactive elements and information to facilitate comparing various routes and indicating a selected route.

As used herein, the term "data" refers to data indicating a route, transportation option, or other features associated with a route or transportation option. For example, data might include data indicating vehicles or rates for a provider transportation route or a rental route. For example, data for a provider transportation route or a rental route may include estimated rates, duration of the route, or estimated time of arrival at destination. In addition, data for the rental route might include additional information including a type of rental vehicle (e.g., sedan, SUV, van), estimated mileage.

As used herein, the term "telematics data" refers to data recorded by diagnostic computing devices attached or connected to a vehicle. In particular, telematics data can indicate location, movements, status, and behavior of a vehicle. In some cases, telematics data is captured by one or more vehicle tracking devices associated with a rental vehicle. For example, the vehicle tracking devices can include GPS receivers, accelerometers, odometers, and other components. Telematics data can include location, speed, idling time, harsh acceleration or braking, fuel consumption, vehicle faults, and other movements of a rental vehicle.

Figure 1B:
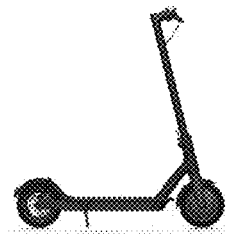
Figure 1B:
Figure 1B:
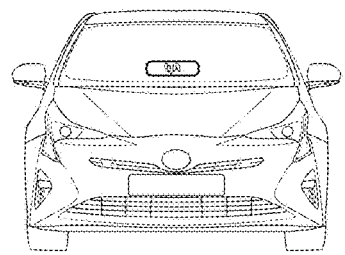
Figure 1B:
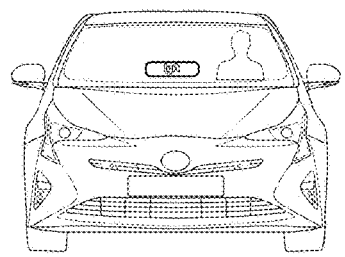
Figure 1B:
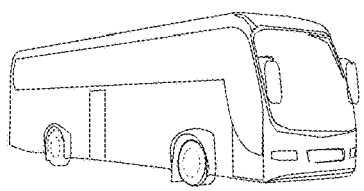

As indicated above, this disclosure includes illustrative figures portraying example embodiments and implementations of the multi-modal-transportation system. In accordance with one or more embodiments, FIGS. 1A-1B illustrate a schematic diagram of an environment 100 in which a multi-modal-transportation system 114 can operate and various transportation vehicles within the environment 100. As illustrated in FIG. 1A, for instance, the environment 100 includes one or more server(s) 110 comprising a dynamic transportation matching system 112 that can communicate via a network 106 with a provider device 107, a rental vehicle device 130, and a requestor device 116 (examples of which will be described in more detail below with respect to FIG. 12). In some cases, the environment 100 further includes intermediate vehicles 124. FIG. 1B illustrates intermediate vehicles 124 that may be a part of the environment 100.

Figure 12:
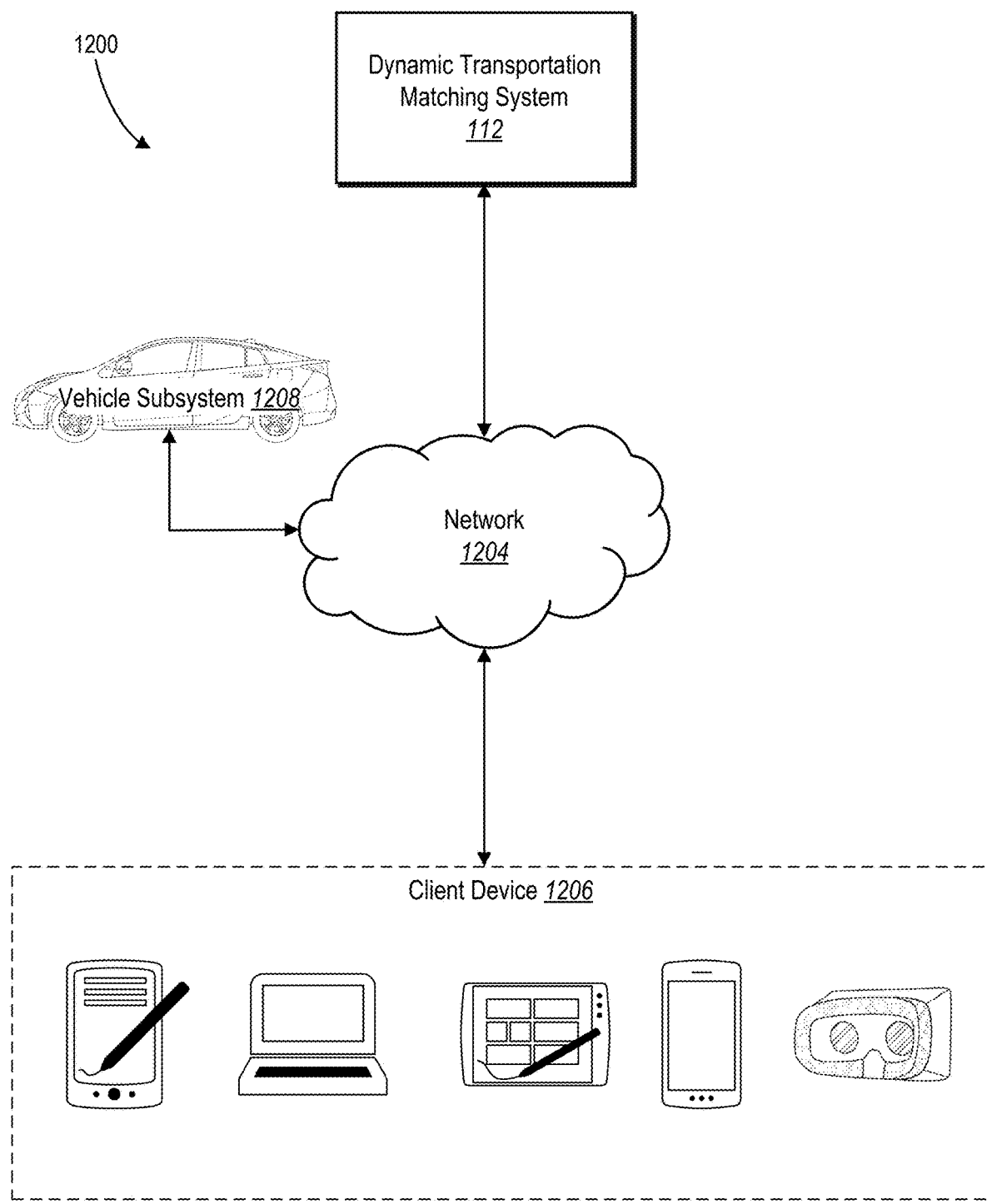
FIG. 12 illustrates an example environment for a dynamic transportation system in accordance with one or more embodiments.

As shown in FIG. 1A, the server(s) 110 may generate, store, receive, and transmit various types of data including data relating to mobile devices, transportation requests, and rental vehicles. The dynamic transportation matching system 112 may use the server(s) 110 to communicate with various computing devices. For example, the server(s) 110 receive data, including transportation requests, from the requestor device 116. The server(s) 110 can send relevant transportation request data to another computing device, such as the provider device 107, the rental vehicle device 130, and/or the intermediate vehicles 124. Additionally, the server(s) 110 can communicate route information to the requestor device 116. The server(s) 110 may comprise one or more server devices that implement the dynamic transportation matching system 112. The server(s) 110 may also comprise a communication server or a web-hosting server. FIG. 12 provides additional detail regarding the server(s) 110.

In one or more embodiments, the server(s) 110 can include or implement all or a portion of the dynamic transportation matching system 112. The dynamic transportation matching system 112 generates provider-transportation routes by managing the distribution and allocation of transportation requests from requestor devices. For example, the dynamic transportation matching system 112 receives a transportation request from the requestor device 116. In at least one embodiment, a transportation request includes data indicating a pickup location and a destination location. The dynamic transportation matching system 112 matches the transportation request to a provider 104 associated with the provider device 107 based on availability information and location information from the provider device 107 and the requestor device 116.

As further shown in FIG. 1A, the server(s) 110 may include or implement all or a portion of the multi-modal-transportation system 114. As indicated above, in some cases, the multi-modal-transportation system 114 generates a provider transportation route and a rental route based on a transportation request. If a requestor 120 selects the provider transportation route, a provider vehicle 102 associated with the provider device 107 transports the requestor 120 to the destination location. If the requestor 120 selects the rental route, in some embodiments, one of the intermediate vehicles 124 transport the requestor 120 along a first segment to a rental-vehicle location and a rental vehicle 126 transports the requestor 120 along a second segment to the destination location.

The multi-modal-transportation system 114 communicates with the dynamic transportation matching system 112 and receives data from the dynamic transportation matching system 112 regarding matched provider-transportation routes. For example, the multi-modal-transportation system 114 accesses rental vehicle data to determine the availability and locations of rental vehicles. In some cases, the multi-modal-transportation system 114 matches the rental vehicle 126 with the requestor 120 to generate the rental route. As indicated above, the multi-modal-transportation system 114 can further analyze the transportation request to determine to present the rental-vehicle route to the requestor 120. Additionally, the multi-modal-transportation system 114 can access the intermediate vehicles 124, the provider device 107, the rental vehicle device 130, and the requestor device 116. FIG. 13 provides additional detail regarding the multi-modal-transportation system 114.

As further shown in FIG. 1A, the environment 100 includes the requestor device 116 associated with the requestor 120. The requestor device 116 collects, stores, and communicates data to the dynamic transportation matching system 112 or the multi-modal-transportation system 114 and other computing devices within the environment 100. For example, the requestor device 116 sends transportation requests to the dynamic transportation matching system 112 or the multi-modal-transportation system 114 and receives route information and transportation options from either system.

As further indicated in FIG. 1A, the requestor device 116 includes the requestor application 118. In some embodiments, the requestor application 118 comprise web browsers, applets, or other software applications (e.g., native applications) available to the requestor device 116. Additionally, in some instances, the dynamic transportation matching system 112 provides data including instructions that, when executed by the requestor device 116, create or otherwise integrate requestor applications within an application or webpage. Though not illustrated, the provider device 107 and the rental vehicle device 130 may similarly include a provider application and a rental application, respectively. The provider application and the rental application are analogous to the requestor application 118 described above.

As further shown in FIG. 1A, the provider device 107 is associated with a provider vehicle 102, a vehicle-display device 108, and the provider 104. The provider device 107 communicates with the dynamic transportation matching system 112 or the multi-modal-transportation system 114. For example, the provider device 107 transmits, to the dynamic transportation matching system 112 or the multi-modal-transportation system 114, location information, and the provider device 107 receives transportation request data required to complete the transportation request. For example, the provider device 107 can receive information regarding the requestor 120, a desired destination location, and route information. In some embodiments, the provider device 107 is not associated with the provider 104 but is attached to (or integrated within) the provider vehicle 102.

In some embodiments, the dynamic transportation matching system 112 communicates with the provider device 107 through a provider application. For instance, the dynamic transportation matching system 112 can transmit, via a provider application, route data to navigate to a pickup location to pick up the requestor 120, navigate to the destination location, and/or collect fares. In some embodiments, the provider application includes computer-executable instructions that (upon execution) cause the provider device 107 to initiate a wireless connection with the vehicle-display device 108 (e.g., via Bluetooth®).

As further illustrated in FIG. 1A, the environment 100 optionally includes the intermediate vehicles 124. In some embodiments, the dynamic transportation matching system 112 or the multi-modal-transportation system 114 communicate with the intermediate vehicles 124. In at least one embodiment, the dynamic transportation matching system 112 or the multi-modal-transportation system 114 can communicate directly with individual intermediate vehicles 124. For instance, the dynamic transportation matching system 112 can access location information of individual intermediate vehicles 124 to identify available intermediate vehicles. In other embodiments, the dynamic transportation matching system 112 communicates with the intermediate vehicles 124 through intermediate vehicle systems to identify available intermediate vehicles. For example, intermediate vehicle systems may track availability and scheduling of the intermediate vehicles 124 and communicate the availability and scheduling data to the dynamic transportation matching system 112. FIG. 1B provides additional detail regarding the intermediate vehicles 124.

As mentioned above and shown in FIG. 1A, the environment 100 includes the rental vehicle 126. The rental vehicle 126 is associated with the rental vehicle device 130 and a vehicle-display device 108. The rental vehicle device 130 can include telematics devices including GPS systems, accelerometers, fuel usage monitors, and other sensors. The rental vehicle device 130 can thus collect the position, speed, fuel consumption, idling time, vehicle faults, battery voltage, and other engine data of the rental vehicle 126. The rental vehicle device 130 can communicate telematics data to the multi-modal-transportation system 114. In some embodiments, the rental vehicle device 130 is not separate from the rental vehicle 126 but is attached to (or integrated within) the rental vehicle 126. For example, the telematics devices may be integrated as part of the rental vehicle 126.

In some embodiments, the dynamic transportation matching system 112 communicates with the rental vehicle device 130 via a rental vehicle application. For instance, the dynamic transportation matching system 112 can transmit, via the rental vehicle application, route data to navigate from the rental-vehicle location to the destination location. Additionally, the rental vehicle device 130 can communicate telematics data to the dynamic transportation matching system 112 via the rental vehicle application. As suggested above, in some embodiments, the rental vehicle application includes computer-executable instructions that (upon execution) cause the rental vehicle device 130 to initiate a wireless connection with a vehicle-display device 128 (e.g., via Bluetooth®).

As illustrated in FIG. 1A, the environment 100 includes a number of computing devices. As suggested above, each of the provider device 107, the rental vehicle device 130, and the requestor device 116 may comprise a mobile device such as a laptop, smartphone, or tablet associated with a provider 104, the rental vehicle 126, or a requestor 120, respectively. The provider device 107, the rental vehicle device 130, and the requestor device 116 may be any type of computing device as further explained below with reference to FIG. 13.

As suggested above, in some embodiments, the rental vehicle device 130 communicates with the vehicle-display device 128. Based on receiving a rental-vehicle-matching identifier from the rental vehicle device 130 or the dynamic transportation matching system 112, for example, the vehicle-display device 128 can present a visual indicator representing a paring between the rental vehicle 126 and the requestor 120. Visual indicators might include colors, patterns, or other visual signals to display on the vehicle-display device 128.

Although not illustrated in FIG. 1A, in some embodiments, the environment 100 may have a different arrangement of components and/or may have a different number or set of components altogether. In certain implementations, for instance, some of the provider vehicles and/or rental vehicles do not require a human operator but are instead autonomous vehicles—that is, self-driving vehicles that include computer components and accompanying sensors for driving without manual-provider input from a human operator. As a further example, in some embodiments, the provider vehicle 102 and/or the rental vehicle 126 may comprise a hybrid self-driving vehicle with both self-driving functionality and some human operator interaction.

When the provider vehicle 102 and/or the rental vehicle 126 comprise an autonomous vehicle or a hybrid self-driving vehicle, the provider vehicle 102 and/or the rental vehicle 126 may include additional components not depicted in FIG. 1A. Such components may include location components, one or more sensors by which the autonomous vehicle navigates, and/or other components necessary to navigate without a human operator (or with minimal interactions with a human operator).

As mentioned above, the environment 100 includes the intermediate vehicles 124. The intermediate vehicles 124 may transport the requestor 120 along a segment of a route from a pickup location to a rental-vehicle location for a rental route. FIG. 1B illustrates example intermediate vehicles in accordance with one or more embodiments.

As illustrated in FIG. 1B, the intermediate vehicles 124 may include, but are not limited to, a scooter 132, a bicycle 134, an autonomous vehicle 136, an intermediate provider vehicle 138, or public transportation vehicles 140. Although not illustrated, the intermediate vehicles 124 may include additional vehicle types. For example, the intermediate vehicles 124 may include taxis, motorcycles, ferries, or other types of vehicles.

In at least one embodiment, the scooter 132 represents a scooter that is part of a scooter share program. Likewise, the bicycle 134 may represent a bicycle that is part of a bicycle share program. The scooter 132 and the bicycle 134 may accordingly include GPS transmitters that communicate location data to the dynamic transportation matching system 112.

As illustrated in FIG. 1B, the public transportation vehicles 140 include vehicles within a public transportation system. The public transportation vehicles 140 can include commuter trains, subway, trams, ferries, monorail, and other types of public transportation. The multi-modal-transportation system 114 can communicate with the public transportation system to identify public transportation vehicles 140 that operate at or near the pickup location within a threshold period of time. Additionally, the multi-modal-transportation system 114 can access public transportation route information of the public transportation vehicles 140.

As mentioned, in some embodiments, the dynamic transportation matching system 112 or the multi-modal-transportation system 114 can communicate directly with individual intermediate vehicles 124. For instance, some of the intermediate vehicles 124, such as the intermediate provider vehicle 138 and the autonomous vehicle 136, may be managed by the dynamic transportation matching system 112. In such instances, the multi-modal-transportation system 114 may access location information of the intermediate vehicles 124 and reserve use of the intermediate vehicles 124 for use by the requestor 120. Furthermore, the dynamic transportation matching system 112 or the multi-modal-transportation system 114 may send, to the autonomous vehicle 136 or the intermediate provider vehicle 138, pickup location data and route data to transport the requestor 120 to the rental-vehicle location.

As indicated above, in some cases, the dynamic transportation matching system 112 or the multi-modal-transportation system 114 receive from the requestor device 116 an indication of a selection by the requestor 120 of a rental-vehicle option corresponding to a rental route. Based on the selection of the rental-vehicle option, the dynamic transportation matching system 112 or the multi-modal-transportation system 114 transmits routing instructions to the autonomous vehicle 136 to navigate to a pickup location to pick up the requestor 120. In certain implementations, the dynamic transportation matching system 112 or the multi-modal-transportation system 114 send an address or GPS coordinates as routing instructions to the autonomous vehicle 136 or a computing device of the autonomous vehicle 136. Further, in some embodiments, the dynamic transportation matching system 112 or the multi-modal-transportation system 114 manages or sends routing instructions to autonomous vehicles as described by Autonomous Vehicle Pickup and Drop-off Management, U.S. patent application Ser. No. 15/396,422 (filed on Dec. 31, 2016), the entirety of which is hereby incorporated by reference.

In yet other embodiments, the dynamic transportation matching system 112 or the multi-modal-transportation system 114 does not communicate with individual intermediate vehicles 124 but rather with systems that manage the intermediate vehicles 124. For example, the dynamic transportation matching system 112 may communicate with an intermediate vehicle system that manages bike share programs, scooter share programs, or public transportation. The dynamic transportation matching system 112 may accordingly access the locations of scooters, bicycles, or public transportation vehicles.

Figure 2:
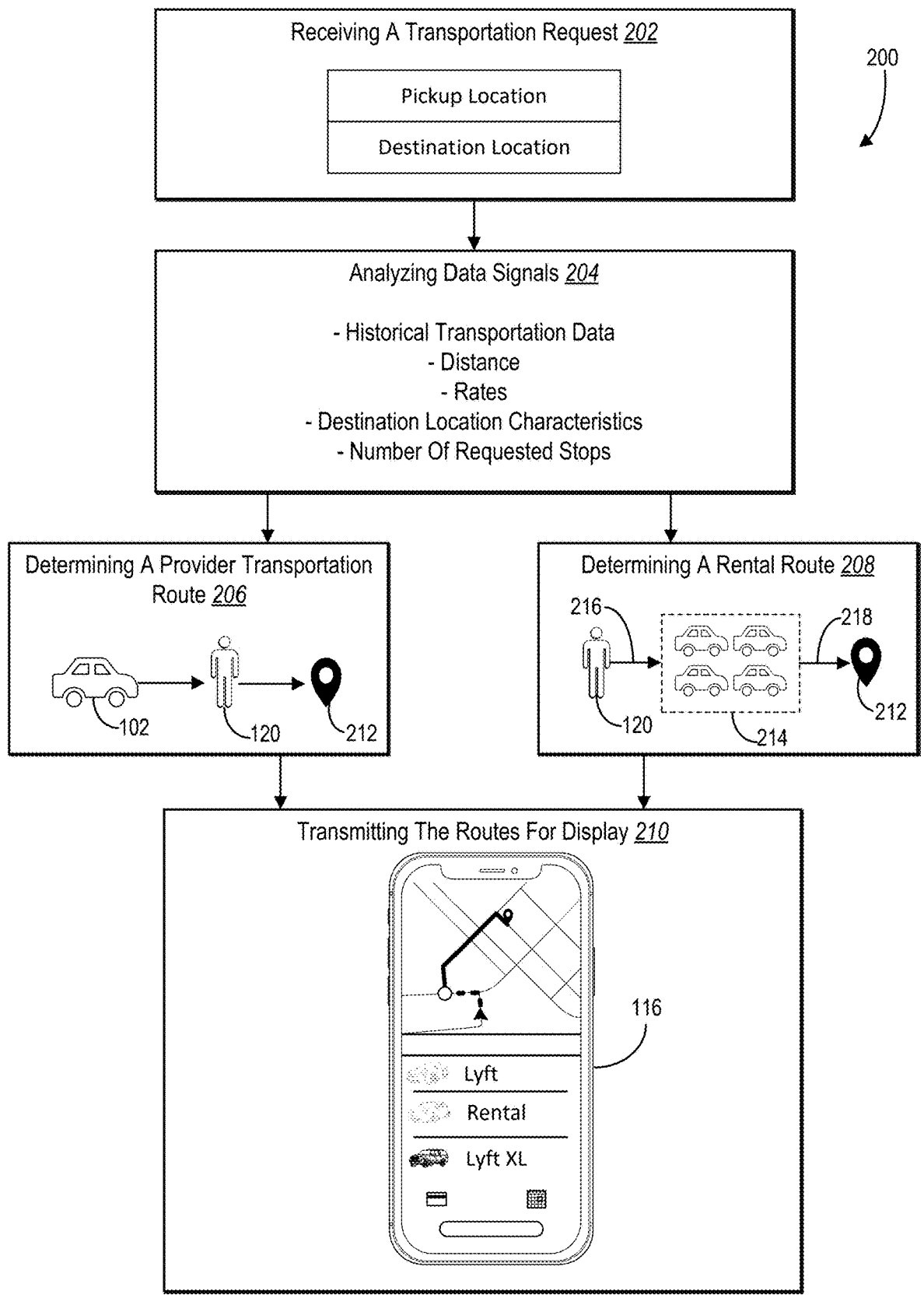
FIG. 2 illustrates an overview of a multi-modal-transportation system generating and transmitting indicators of routes for display in a multi-modal graphical user interface accordance with one or more embodiments.

In accordance with one or more embodiments, FIG. 2 provides an overview of the multi-modal-transportation system 114 generating and transmitting data of routes for display within a multi-modal graphical user interface. In particular, FIG. 2 illustrates a series of acts 200 including an act 202 of receiving a transportation request, an act 204 of analyzing data signals, an act 206 of determining a provider transportation route, an act 208 of determining a rental route, and an act 210 of transmitting the routes for display.

As illustrated in FIG. 2, in the act 202, the multi-modal-transportation system 114 receives a transportation request. In particular, the multi-modal-transportation system 114 receives the transportation request from the requestor device 116 associated with the requestor 120. The transportation request includes data indicating a pickup location and a destination location. The transportation request may also include additional data indicating the number people in the party with the requestor 120 (e.g., how many riders). The pickup location may include an address or the current location of the requestor 120. The destination location comprises an address to which the requestor 120 would like to travel. Some transportation requests may include multiple destination locations.

Figure 5:
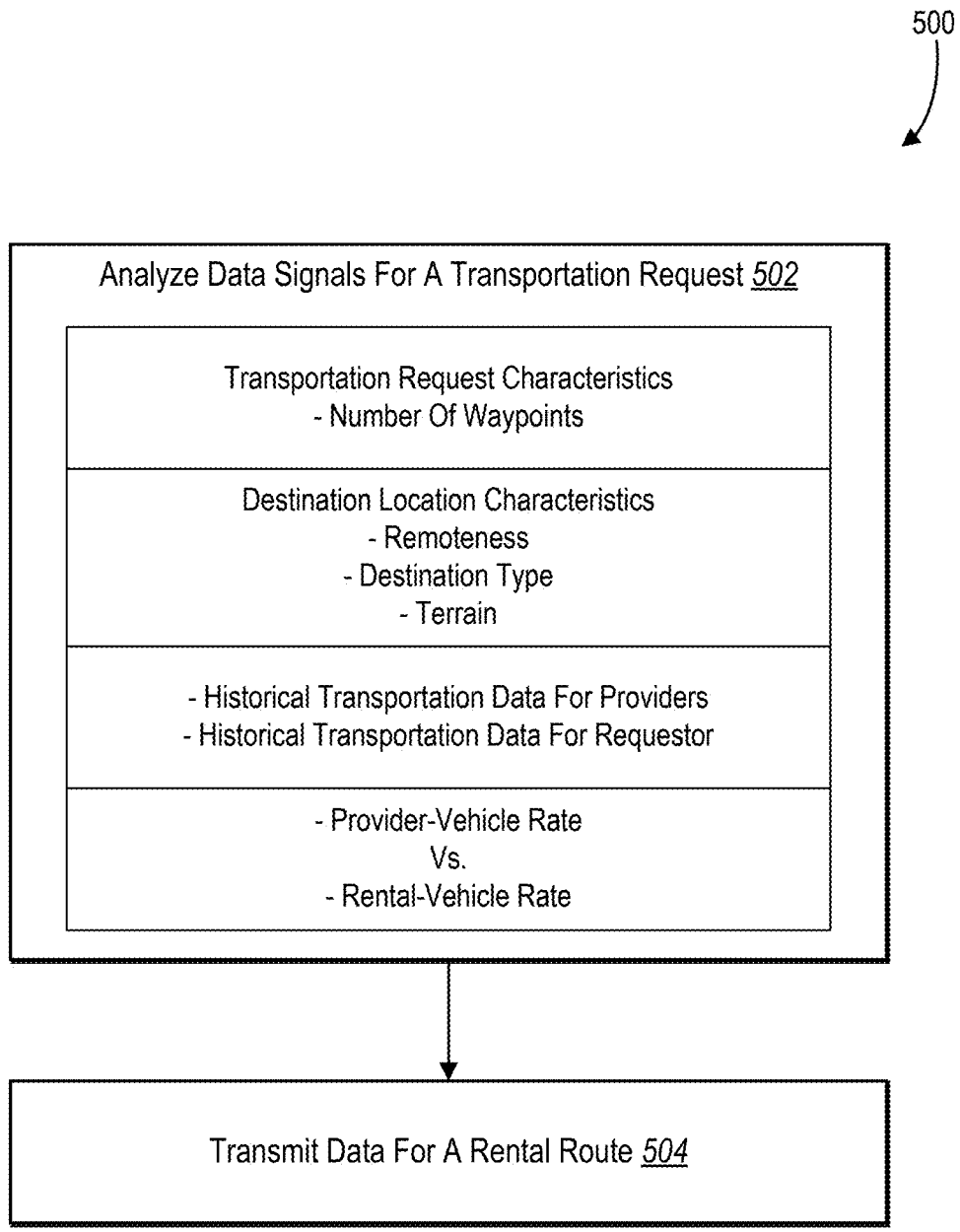
FIG. 5 illustrates a multi-modal-transportation system analyzing data signals for a transportation request and transmitting data for a rental route based on such an analysis in accordance with one or more embodiments.

As further indicated by the act 204 in FIG. 2, the multi-modal-transportation system 114 analyzes data signals. In particular, the multi-modal-transportation system 114 analyzes data signals associated with the transportation request. As indicated, example data signals include historical transportation data, a distance between the pickup location and the destination location, an estimated rate of travel, destination location characteristics, a number of requested stops, and other data signals. The multi-modal-transportation system 114 uses information provided in the transportation request and other data sources to generate and analyze data signals. For example, the multi-modal-transportation system 114 determines the distance between the pickup location and the destination location based on the received transportation request. Furthermore, the multi-modal-transportation system 114 can access historical transportation data of the requestor 120 based on accessing data from the dynamic transportation matching system 112. FIG. 5 and the accompanying discussion provide additional detail regarding how the multi-modal-transportation system 114 analyzes data signals according to some embodiments.

As further shown in FIG. 2, in the act 206, the multi-modal-transportation system 114 generates a provider transportation route. Generally, the multi-modal-transportation system 114 can generate a direct route for a single provider vehicle to transport the requestor from the pickup location to the destination location. As mentioned previously, in some cases, the multi-modal-transportation system 114 matches the requestor 120 with the provider vehicle 102. As illustrated in FIG. 2, as part of the provider transportation route, the provider vehicle 102 would pick up the requestor 120 at the pickup location and transport the requestor 120 to a destination location 212.

Figure 3:
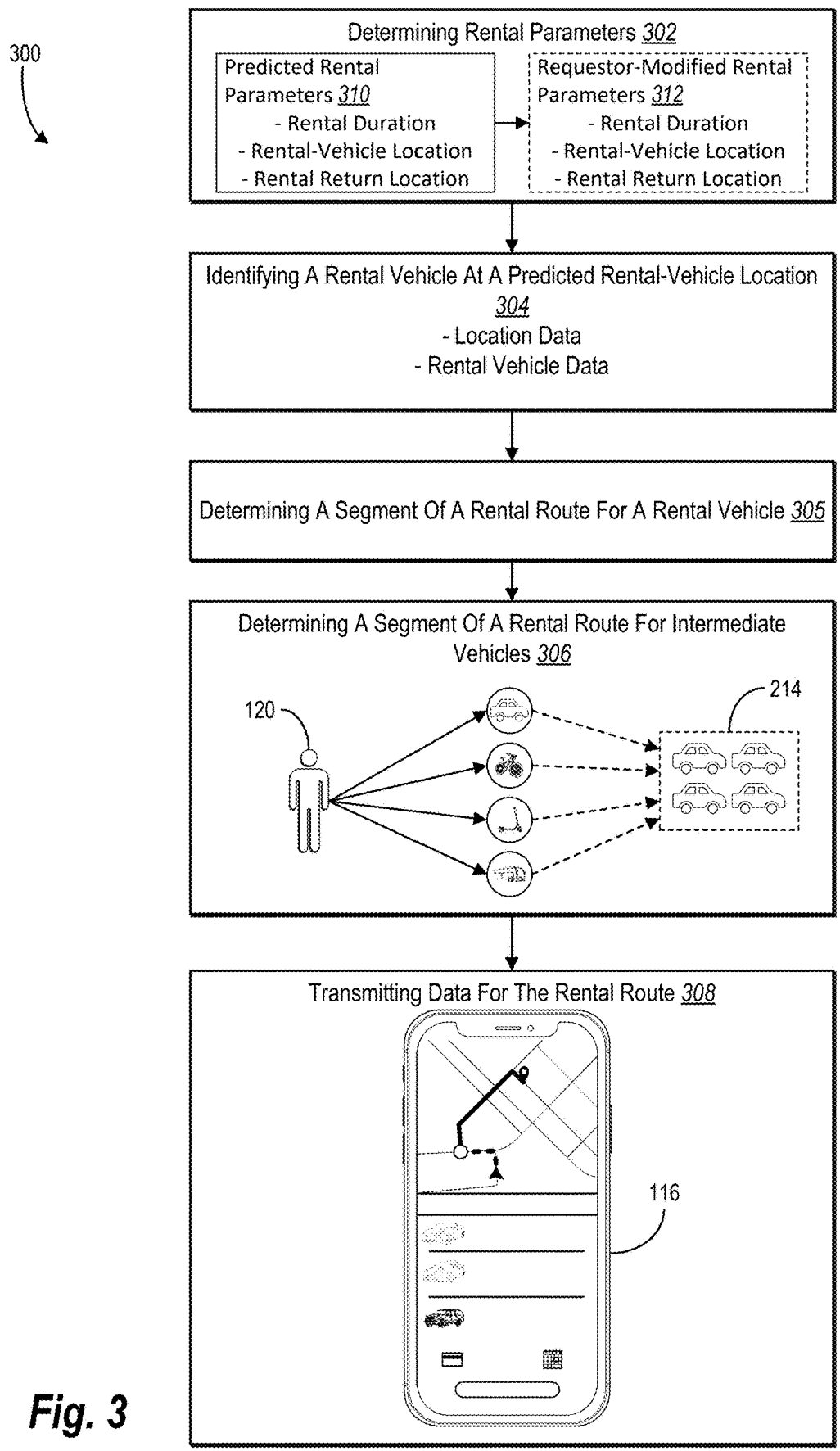
FIG. 3 illustrates a multi-modal-transportation system determining a rental route and intermediate vehicles for the rental route in accordance with one or more embodiments.

In the act 208, the multi-modal-transportation system 114 determines a rental route. Generally, the multi-modal-transportation system 114 generates a multi-segment route. As illustrated the rental route includes at least a first segment 216 and a second segment 218. For the first segment 216, the multi-modal-transportation system 114 identifies one or more intermediate vehicles that can transport the requestor 120 to a rental-vehicle location 214. For the second segment 218, the requestor 120 would use the rental vehicle 126 to travel to the destination location 212. FIG. 3 illustrates additional detail regarding how the multi-modal-transportation system 114 can determine the rental route.

Figure 7B:
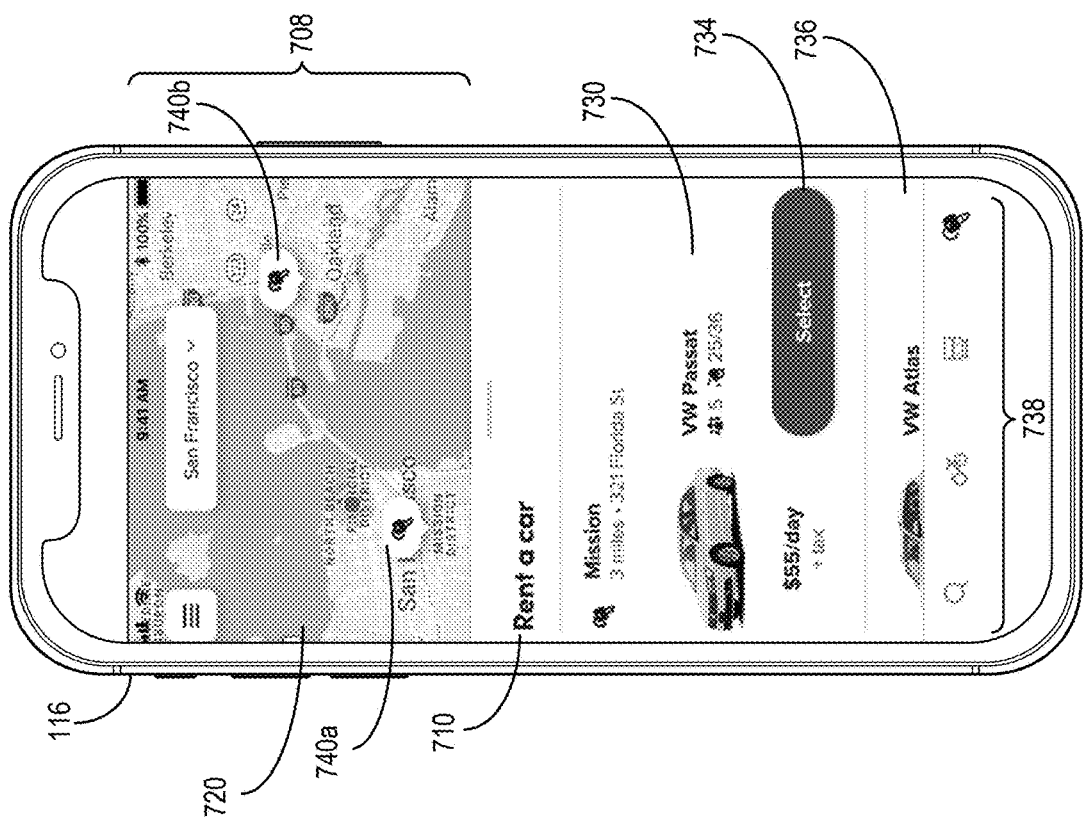
FIGS. 7A-7B illustrate graphical user interfaces for selecting a rental transportation vehicle in accordance with one or more embodiments.
Figure 7A:
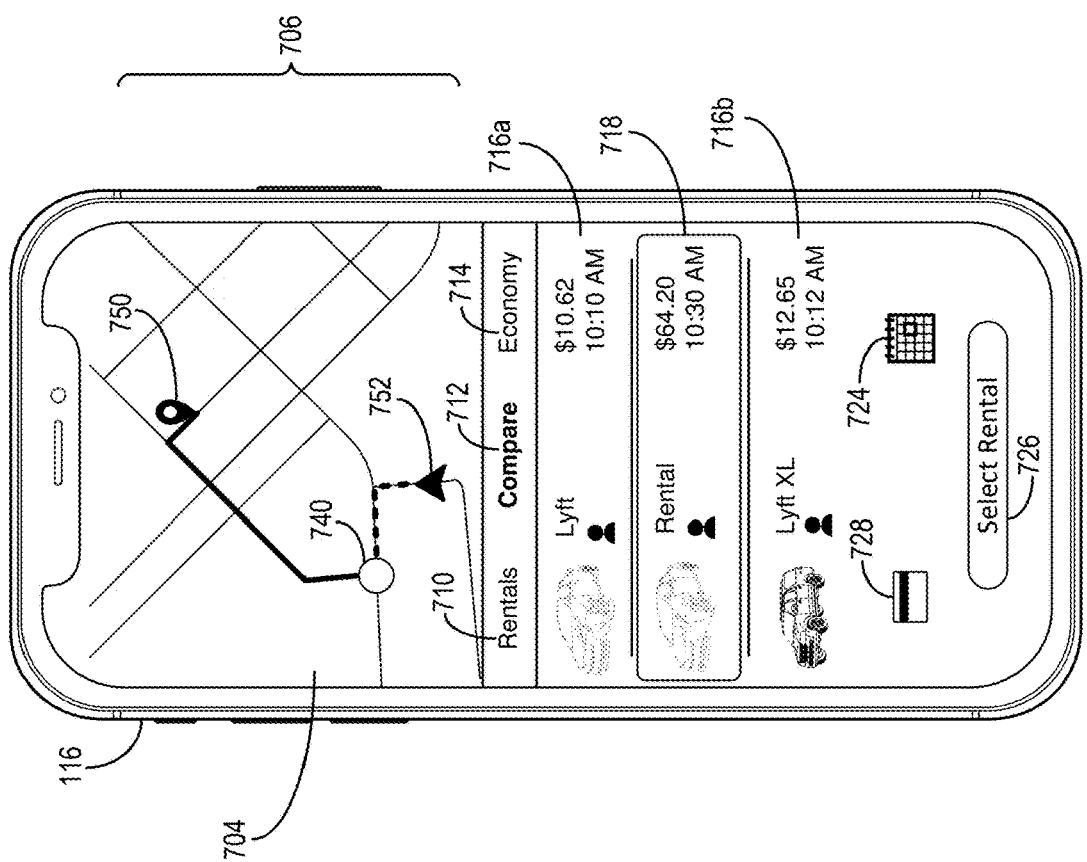

As further illustrated in FIG. 2, in the act 210, the multi-modal-transportation system 114 transmits to the requestor device 116 data for the provider transportation route and the rental route for display within a multi-modal graphical user interface. As illustrated, the requestor device 116 can present, via the multi-modal graphical user interface, both transportation routes. Based on receiving an indication of an interaction with the multi-modal graphical user interface from the requestor device 116, the multi-modal-transport system 114 may arrange to transport the requestor 120 to the destination location 212 using either the provider transportation route or the rental route. FIGS. 7A-7B illustrate an example multi-modal graphical user interface.

The following figures provide additional detail regarding certain acts from the series of acts 200. For example, FIG. 3 illustrates an example series of acts 300 of determining a rental route for an identified rental vehicle and intermediate vehicles for the rental route. As illustrated in FIG. 3, the series of acts 300 includes an act 302 of determining rental parameters, an act 304 of identifying a rental vehicle at a rental-vehicle location, an act 305 of determining a segment of a rental route for a rental vehicle, an act 306 of determining a segment of a rental route for intermediate vehicles, and an act 308 of transmitting data for the rental route.

As just mentioned, the series of acts 300 includes the act 302 of determining rental parameters. Generally, rental parameters comprise metrics that inform or constrain rental vehicle requirements. For example, rental parameters can include a rental duration, a rental-vehicle location or area, and a rental return location or area. The multi-modal-transportation system 114 selects available rental vehicles based on rental vehicles that comply with such rental parameters.

As indicated, in certain implementations, the multi-modal-transportation system 114 determines predicted rental parameters 310 and requestor-modified rental parameters 312. In particular, the multi-modal-transportation system 114 generates the predicted rental parameters 310 to potentially present a rental-vehicle option to a requestor based on the transportation request. Thus, the multi-modal-transportation system 114 can efficiently determine and present a rental-vehicle route to the requestor 120 using limited information provided in the transportation request. For example, the multi-modal-transportation system 114 can determine a predicted rental duration based on an estimated travel time from the pickup location to the destination location. The multi-modal-transportation system 114 can determine the rental-vehicle location based on locations within a threshold distance of the pickup location. Additionally, the multi-modal-transportation system 114 may predict the rental return location based on rental return locations within a threshold distance of the destination location. Alternatively, the multi-modal-transportation system 114 may determine to designate the rental-vehicle location as the rental return location (e.g., the requestor 120 returns the rental vehicle to the same place where the requestor 120 picked up the rental vehicle).

In at least one embodiment, the multi-modal-transportation system 114 accesses additional data beyond the transportation request to generate the predicted rental parameters 310. In particular, in one or more embodiments, the multi-modal-transportation system 114 accesses historical transportation data specific to the requestor 120 as a basis for generating the predicted rental parameters 310. The multi-modal-transportation system 114 can identify patterns in the transportation data of the requestor 120. In one embodiment, the multi-modal-transportation system 114 identifies date ranges in the historical transportation data for which the requestor 120 has submitted a threshold number of transportation requests. For example, the multi-modal-transportation system 114 determines the number of consecutive days in which the requestor requested a threshold of two or more transportation requests per day within or around a geographic area. In one embodiment, the multi-modal-transportation system 114 averages the number of days within the date ranges to generate the predicted rental duration.

The multi-modal-transportation system 114 can predict additional rental parameters to those illustrated in FIG. 3. In particular, in some embodiments, the multi-modal-transportation system 114 can access data stored by the dynamic transportation matching system 112 to predict a rental vehicle pickup time, rental insurance information, driver personal information, and other information required to complete the rental process. For example, the multi-modal-transportation system 114 can predict, as the rental-vehicle pickup time, a time by which the requestor 120 will arrive at a rental-vehicle location. Additionally, the multi-modal-transportation system 114 can utilize, based on privacy settings set by the requestor 120, personal information as determined driver information. In some cases, the multi-modal-transportation system 114 can access the requestor name, birth date, and driver license information based on data stored by the dynamic transportation matching system 112.

As further shown in FIG. 3, the multi-modal-transportation system 114 performs the act 304 of identifying a rental vehicle at a rental-vehicle location, such as a predicted rental-vehicle location. In at least one embodiment, the multi-modal-transportation system 114 accesses a database of available rental vehicles and identifies rental vehicles located at a rental-vehicle location within a threshold distance of the pickup location based on telematics data from the rental vehicles. The multi-modal-transportation system 114 may identify an available rental vehicle with a current location nearest to the pickup location or the requestor 120's current location as indicated by the requestor device 116.

As mentioned, the multi-modal-transportation system 114 analyzes the transportation request to generate a rental route. As part of generating the rental route, the multi-modal-transportation system 114 performs the act 305 of determining a segment of a rental route for a rental vehicle and the act 306 of determining a segment of a rental route for intermediate vehicles. The following paragraphs provide additional detail regarding the acts 305 and 306.

As illustrated in FIG. 3, the multi-modal-transportation system 114 performs the act 305 of determining a segment of a rental route for a rental vehicle. In particular, the multi-modal-transportation system 114 determines the portion of the route from the rental-vehicle location to the destination location. For example, the multi-modal-transportation system 114 identifies the rental-vehicle location and the destination location on a map. The multi-modal-transportation system 114 determines possible road segments between the rental-vehicle location and the destination location and scores each of the road segments based on shortest distance, the length of connecting road segments, traffic conditions, and other factors. The multi-modal-transportation system 114 designates the highest-scoring route as the segment for the rental vehicle.

The multi-modal-transportation system 114 utilizes various methods to perform the act 305 of determining the segment of the rental route for the rental vehicle. In some embodiments, the multi-modal-transportation system 114 applies pathfinding algorithms to determine a segment of a route from a starting location (e.g., rental-vehicle location) to an end location (e.g., destination location). For instance, in one embodiment, the multi-modal-transportation system 114 utilizes Dijkstra's algorithm to determine the shortest route between the rental-vehicle location and the destination location within a map comprising a network of roads.

To implement such a pathfinding algorithm, in some cases, the multi-modal-transportation system 114 generates a weighted graph comprising vertices and edges where each vertex represents various locations and edges represent routes between the locations. The vertices can represent locations between the starting location and the end location. The multi-modal-transportation system 114 assigns each edge a numerical value or a weight. In one embodiment, the multi-modal-transportation system 114 assigns weights that correspond to distances between the locations. For instance, greater distances between locations correspond to greater edge weights between the locations. In other embodiments, the multi-modal-transportation system 114 may assign weights based on various other factors including predicted traffic, speed limit, etc.

To create the weighted graph used to determine the segment of the rental route for the rental vehicle described above, in some embodiments, the multi-modal-transportation system 114 identifies vertices and edges on a map. For instance, the multi-modal-transportation system 114 can determine a route on an OpenStreetMap ("OSM") or modified version of an OSM. The multi-modal-transportation system 114 may determine weights for edges and locations of vertices by accessing data associated with the map. The multi-modal-transportation system 114 may determine vertices and edges on other types of maps. For instance, in one embodiment, the multi-modal-transportation system 114 accesses and analyzes maps as described by Utilizing Artificial Neural Networks to Evaluate Routes Based on Generated Route Tiles, U.S. patent application Ser. No. 15/858,775 (filed Dec. 29, 2017), the entirety of which is hereby incorporated by reference.

As suggested above, in some cases, the multi-modal-transportation system 114 applies Dijkstra's algorithm to a weighted graph representing objects from a map. For instance, the multi-modal-transportation system 114 determines the end location (e.g., destination location), identifies vertices connected to the end location, and determines a closest vertex to the end location. To do so, the multi-modal-transportation system 114 identifies the lowest-weight edge from the end location. The multi-modal-transportation system 114 repeats this process with all vertices connected to the closest vertex to identify the vertex nearest to the closest vertex. In some embodiments, the multi-modal-transportation system 114 continues to repeat the process of determining the nearest vertices until the multi-modal-transportation system 114 reaches the beginning vertex corresponding to the beginning location. Thus, the multi-modal-transportation system 114 can determine the fastest or shortest route from a beginning location to an end location for determining a route or route segment.

As further illustrated in FIG. 3, the multi-modal-transportation system 114 performs the act 306 of determining a segment of a rental route for intermediate vehicles. In particular, as part of the act 306, the multi-modal-transportation system 114 determines intermediate vehicles and predicts routes for the intermediate vehicles from a pickup location to a rental-vehicle location. Similar to how the multi-modal-transportation system 114 determines the rental route for the rental vehicle, the multi-modal-transportation system 114 plots the pickup location and the rental-vehicle location on a map. In some cases, the multi-modal-transportation system 114 identifies possible intermediate vehicles, determines routes for each of the transportation vehicles, scores the intermediate vehicle routes, and selects the highest scoring transportation vehicle route as the segment for intermediate vehicles.

In at least one embodiment, the multi-modal-transportation system 114 identifies possible intermediate vehicles based on proximity of the intermediate vehicle to the pickup location. The multi-modal-transportation system 114 can access location information from the various intermediate vehicles (discussed above with respect to FIG. 1B). For example, the multi-modal-transportation system 114 can access GPS or other location data for each of the intermediate vehicles in a proximity range of the rental-vehicle location (e.g., within a threshold distance of the rental-vehicle location).

As part of the act 306, the multi-modal-transportation system 114 determines potential intermediate routes for each of the identified possible intermediate vehicles. For instance, the multi-modal-transportation system 114 maps the pickup location to the rental-vehicle location and identifies potential routes for intermediate transportation routes for a scooter, bicycle, autonomous vehicle, or other intermediate provider vehicles. For public transportation vehicles, the multi-modal-transportation system 114 accesses public transportation information to determine predicted pickup and drop-off times.

As part of the multi-modal-transportation system 114 performing the act 306 of determining a segment of a rental route for intermediate vehicles, the multi-modal-transportation system 114 selects an intermediate vehicle route from the potential intermediate routes. The multi-modal-transportation system 114 may utilize Dijkstra's algorithms (described above) or other pathfinding algorithms to determine an intermediate vehicle route. The multi-modal-transportation system 114 can use different criteria to select an intermediate vehicle route for the intermediate vehicle segment. For example, the multi-modal-transportation system 114 may select the shortest distance intermediate route, the fastest possible intermediate route, the lowest rate intermediate route, the intermediate route having the fewest number of transfers, etc. For instance, to determine the lowest rate intermediate route, in some embodiments, the multi-modal-transportation system 114 assigns weights to edges based on predicted prices of intermediate vehicles to travel the distances represented by edges. Depending on the selection criteria, the multi-modal-transportation system 114 weights each of the edges to determine the intermediate transportation route.

To illustrate, in at least one embodiment, the multi-modal-transportation system 114 selects the quickest possible intermediate route. For example, the multi-modal-transportation system 114 may select the autonomous vehicle 136, the intermediate provider vehicle 138, or a taxi to directly transport the requestor 120 from the pickup location to the rental-vehicle location 214. Alternatively, if the pickup location is near the rental-vehicle location 214 within a threshold distance (e.g., less than a mile), the multi-modal-transportation system 114 can determine an intermediate route in which the requestor 120 walks or rides a scooter to the rental-vehicle location 214.

In one or more embodiments, the multi-modal-transportation system 114 determines a route segment for intermediate vehicles including two or more intermediate vehicles. For example, the multi-modal-transportation system 114 may determine that the quickest intermediate route utilizes one or more of the public transportation vehicles 140. The multi-modal-transportation system 114 may analyze the intermediate route using the public transportation vehicles 140 to determine portions of the intermediate route for which other intermediate vehicles can transport the requestor 120. For example, the multi-modal-transportation system 114 may identify walking portions or segments (e.g., walking to a public transportation stop or between public transportation stops) and determine additional intermediate vehicles that fit within the walking portions or segments. For instance, the multi-modal-transportation system 114 may identify the bicycle 134 or the scooter 132 in the walking segment. Thus, the multi-modal-transportation system 114 may recommend an intermediate route that includes both the use of public transportation vehicles and the scooter 132 and/or the bicycle 134.

Additionally, or alternatively, in some embodiments, the multi-modal-transportation system 114 selects the intermediate route of lowest rate or cost for a requestor. In particular, the multi-modal-transportation system 114 identifies possible intermediate vehicles that can transport the requestor 120 to the rental-vehicle location 214. The multi-modal-transportation system 114 accesses the cost of each of the intermediate vehicles and selects the intermediate route of lowest cost. For example, the multi-modal-transportation system 114 might select one or more of the public transportation vehicles 140 as the most cost-efficient intermediate vehicles to transport the requestor 120 to the rental-vehicle location 214.

As further shown in FIG. 3, the multi-modal-transportation system 114 performs the act 308 of transmitting data for the rental route. In particular, the multi-modal-transportation system 114 generates data corresponding to a rental route based on the predicted rental parameters 310. The multi-modal-transportation system 114 transmits the data to the requestor device 116. Based on the indicators, the requestor device 116 presents options for and/or graphical representations of the rental route as part of the multi-modal graphical user interface. Data that the multi-modal-transportation system 114 transmits indicate the rental-vehicle rate, the rental-vehicle location, distance to the rental-vehicle location, estimated time of arrival at the rental-vehicle location, estimated time of arrival at the destination location, rental vehicle characteristics (e.g., number of seats, gas mileage, vehicle make, vehicle model). As mentioned, the requestor device 116 receives the route data and presents an option for the rental route corresponding to the predicted rental parameters 310 along with the information relevant to the rental route. As the following paragraphs explain, the multi-modal-transportation system 114 can generate and transmit data for the rental route based on requestor-modified rental parameters 312. FIGS. 7A-7B and the corresponding discussion provide additional detail regarding an example multi-modal graphical user interface.

As further illustrated in FIG. 3, in some embodiments, the multi-modal-transportation system 114 also determines the requestor-modified rental parameters 312. In at least one embodiment, based on detecting selection of the rental route, the multi-modal-transportation system 114 presents the predicted rental parameters 310 along with modification elements to the requestor 120 via the requestor device 116. Thus, the multi-modal-transportation system 114 can, based on user interaction with modification elements, adjust the rental parameters to create the requestor-modified rental parameters 312. For example, the multi-modal-transportation system 114 may change the duration of the rental (e.g., by adding or subtracting days and/or hours), the rental-vehicle location, and/or the rental return location. FIGS. 8A-8D and the corresponding discussion provide an example graphical user interfaces for receiving the requestor-modified rental parameters 312.

In some cases, the multi-modal-transportation system 114 repeats the act 304, the act 305, and the act 306 described above, using the requestor-modified rental parameters 312 in place of the rental parameters 310. For instance, the multi-modal-transportation system 114 performs the act 304 of identifying a rental vehicle at the requestor-modified rental-vehicle location. Additionally, the multi-modal-transportation system 114 also performs the act 305 of determining a segment of a rental route for a rental vehicle complying with the requestor-modified rental parameters 312. The multi-modal-transportation system 114 also performs the act 306 of determining a segment for intermediate vehicles to the requestor-modified rental-vehicle location. In at least one embodiment, the multi-modal-transportation system 114 determines the intermediate vehicle(s) based on requestor-indicated preference. For example, the multi-modal-transportation system 114 may present, to the requestor 120, options to select the quickest intermediate route or the lowest cost intermediate route. The multi-modal-transportation system 114 performs the act 308 of transmitting data for the rental route based on the requestor-modified rental parameters 312.

Figure 4:
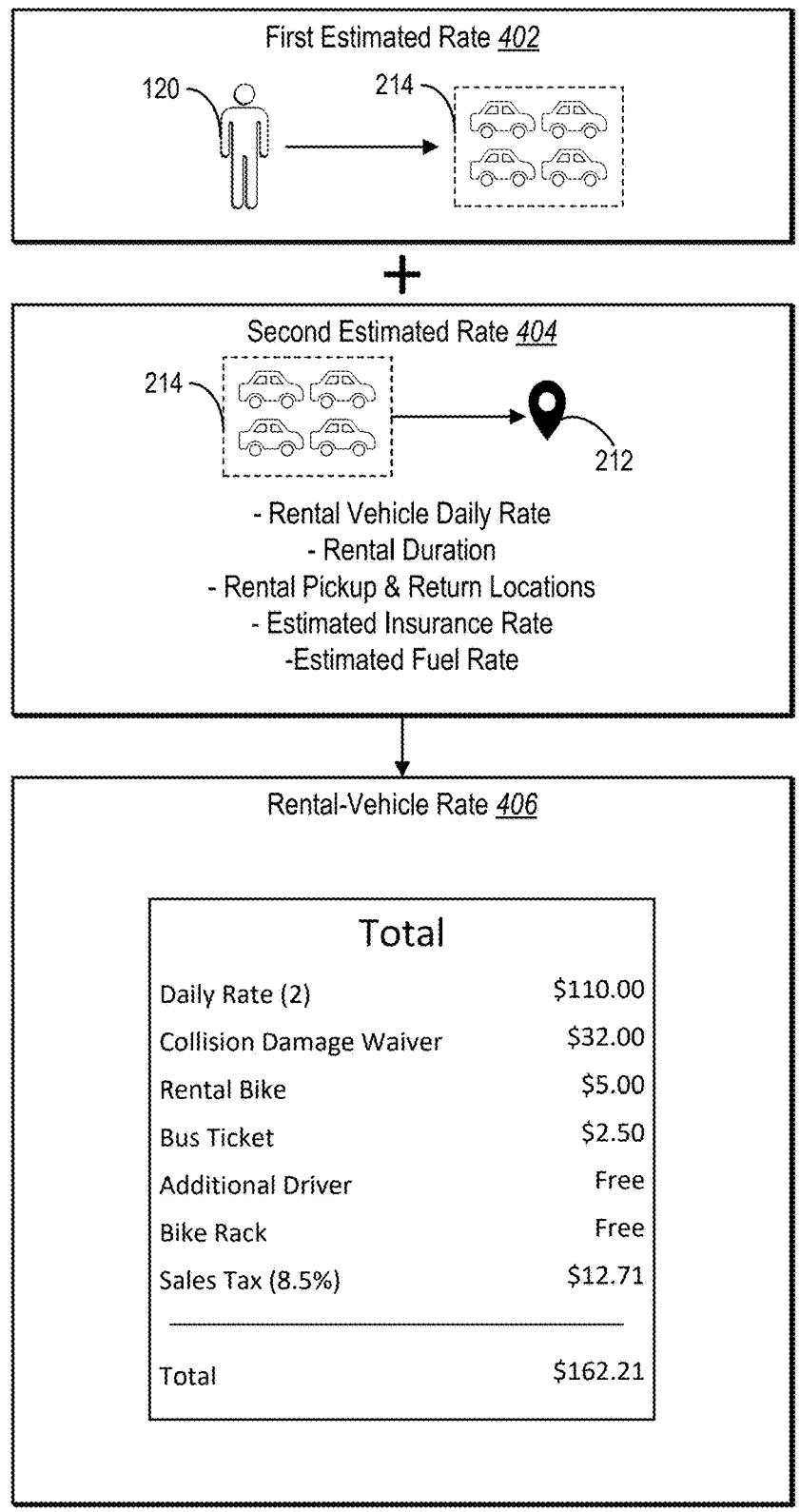
FIG. 4 illustrates a multi-modal-transportation system determining a rental-vehicle rate in accordance with one or more embodiments.

As suggested above, in at least one embodiment, the multi-modal-transportation system 114 generates a predicted or estimated rental-vehicle rate for display with a rental route in a multi-modal graphical user interface. In some such cases, the multi-modal-transportation system 114 predicts an estimated rate for an intermediate vehicle and a rental-vehicle rate for a duration of renting a rental vehicle. FIG. 4 and the accompanying discussion illustrate the multi-modal-transportation system 114 generating an overall rental rate in accordance with one or more embodiments.

As illustrated in FIG. 4, the multi-modal-transportation system 114 generally computes a total rental-vehicle rate 406 based on the combination of a first estimated rate 402 and a second estimated rate 404. The multi-modal-transportation system 114 generates the first estimated rate 402 for a segment of the rental route by which one or more intermediate vehicles transport the requestor 120 from the pickup location to the rental-vehicle location 214. In at least one embodiment, the multi-modal-transportation system 114 sums the rates of the intermediate vehicles. For example, the multi-modal-transportation system 114 determines and sums the rates of a rental bike and a bus ticket purchased during the intermediate route.

As further illustrated in FIG. 4, the multi-modal-transportation system 114 also determines the second estimated rate 404 for a rental vehicle. The second estimated rate 404 comprises the cost or price for a segment of a rental route by which the rental vehicle 126 travels from the rental-vehicle location 214 to the destination location. As illustrated, the second estimated rate 404 comprises an aggregate of one or more of a rental vehicle daily rate, a rental duration, rental pickup and return locations, an estimated insurance rate, or an estimated fuel rate.

As indicated in FIG. 4, the multi-modal-transportation system 114 generates a rental vehicle daily rate as part of the second estimated rate 404. The vehicle daily rate comprises a price per day for utilizing the rental vehicle 126. In one embodiment, the multi-modal-transportation system 114 determines a fixed rental vehicle daily rate for each rental vehicle. In another embodiment, the multi-modal-transportation system 114 dynamically determines the rental vehicle daily rate for the rental vehicle 126. The multi-modal-transportation system 114 can analyze factors including rental vehicle supply, seasonality, rental-vehicle location, requestor data, and other external data points to adjust the rental vehicle daily rate. For example, the multi-modal-transportation system 114 can increase the rental vehicle daily rate based on the rental vehicle supply falling below certain threshold points. The multi-modal-transportation system 114 may apply varying weights to the analyzed factors. The multi-modal-transportation system 114 may also access and analyze historical vehicle rental data to determine seasonality. For example, based on identifying a peak vehicle rental season, the multi-modal-transportation system 114 can increase the rental vehicle daily rate for the rental vehicle 126.

In some embodiments, the multi-modal-transportation system 114 customizes a daily rate based on location, requestor, or third-party information. As just suggested, the multi-modal-transportation system 114 may adjust the rental vehicle daily rate based on the location of the rental vehicle 126. For example, the multi-modal-transportation system 114 may analyze rental vehicle daily rates for similar rental vehicles within a geographic region and accordingly adjust the rental vehicle daily rate of the rental vehicle 126. The multi-modal-transportation system 114 may analyze requestor data to adjust the rental vehicle daily rate. For example, the multi-modal-transportation system 114 can reduce the rental vehicle daily rate based on determining that the requestor 120 is above a certain age or has rented a threshold number of rental vehicles. The multi-modal-transportation system 114 may also access and analyze external data points from external databases. For example, the multi-modal-transportation system 114 can access and analyze data points from third-party vehicle rental systems to determine the rental vehicle daily rate.

As indicated, the multi-modal-transportation system 114 may also determine the second estimated rate 404 based on the rental duration. In at least one embodiment, the multi-modal-transportation system 114 offers a duration discount in which the multi-modal-transportation system 114 reduces the second estimated rate 404 if the requestor 120 rents the rental vehicle 126 for longer than a threshold duration (e.g., four days). In another embodiment, the multi-modal-transportation system 114 reduces the second estimated rate 404 for each day in the rental duration.

The multi-modal-transportation system 114 also adjusts the second estimated rate 404 based on the rental-vehicle location at which the requestor 120 picks up the vehicle and the rental return location. For example, the multi-modal-transportation system 114 may charge an additional rate if the rental pickup location and the rental return location are different. In one embodiment, the multi-modal-transportation system 114 analyzes rental vehicle supplies at various rental-vehicle locations. Based on the rental vehicle supplies, the multi-modal-transportation system 114 may offer a discount to the requestor 120 if the requestor 120 returns the rental vehicle 126 at a rental-vehicle location with a low rental vehicle supply. Similarly, the multi-modal-transportation system 114 may increase the second estimated rate 404 based on determining that the rental return location has an excess of rental vehicles.

Additionally, the multi-modal-transportation system 114 factors the estimated insurance rate into the second estimated rate 404. The multi-modal-transportation system 114 may offer rental vehicle insurance and estimate the price of coverage for the rental vehicle 126. Additionally, the multi-modal-transportation system 114 may intelligently determine whether or not the requestor 120 will need to purchase coverage through the multi-modal-transportation system 114. More specifically, the multi-modal-transportation system 114 can determine whether the requestor 120 utilizes a payment option (e.g., credit card) that provides coverage without additional payment. For example, the multi-modal-transportation system 114 can access historical payment data for the requestor 120 to determine requestor payment options. The multi-modal-transportation system 114 can access external payment systems (e.g., a credit card company) corresponding to the requestor payment options to determine whether the external payment systems offer coverage. The multi-modal-transportation system 114 can access the amount of coverage provided by the payment company. For instance, based on determining that the requestor 120 is utilizing a credit card linked with rental vehicle coverage, the multi-modal-transportation system 114 sets the estimated insurance rate to zero.

In at least one embodiment, the multi-modal-transportation system 114 can recommend, to the requestor 120, to utilize a particular payment option when booking the rental vehicle 126 based on insurance data. In particular, the multi-modal-transportation system 114 can access all the payment options associated with the requestor 120 stored in the dynamic transportation matching system 112. The multi-modal-transportation system 114 accesses external data for each of the payment options to determine the coverage provided by each of the payment options. Based on determining that a first payment option corresponds to more coverage than the other payment options, the multi-modal-transportation system 114 may present, via the requestor device 116, a notification recommending that the requestor 120 use the first payment option when booking the rental vehicle 126.

As further illustrated in FIG. 4, the multi-modal-transportation system 114 generates an estimated fuel rate as part of the second estimated rate 404. In one embodiment, the multi-modal-transportation system 114 estimates the fuel rate based on a daily fuel usage. For example, the multi-modal-transportation system 114 determines the average daily fuel usage for all rental vehicles within the rental vehicle fleet. Alternatively, in some embodiments, the multi-modal-transportation system 114 may specifically identify the average daily fuel usage for rental vehicles within a geographic region. In at least one embodiment, the multi-modal-transportation system 114 determines the daily fuel usage based on historical transportation data of the requestor 120. For example, the multi-modal-transportation system 114 can access and utilize, as the predicted fuel usage, an average daily fuel usage specific to the requestor 120.

As further indicated by FIG. 4, in some embodiments, the multi-modal-transportation system 114 also determines the fuel rate. In at least one embodiment, the multi-modal-transportation system 114 accesses and utilizes the market rate for fuel as the fuel rate. The multi-modal-transportation system 114 predicts the estimated fuel rate based on the rental duration, the average daily fuel usage, and the fuel rate. For example, in at least one embodiment, the multi-modal-transportation system 114 multiplies the rental duration, the average daily fuel usage, and the fuel rate to generate the estimated fuel rate.

Although the multi-modal-transportation system 114 utilizes predicted metrics to generate the second estimated fuel rate, the multi-modal-transportation system 114 may also update the predicted metrics as the requestor 120 uses the rental vehicle 126. In some cases, the multi-modal-transportation system 114 accesses telematics data from the rental vehicle 126 to determine the actual daily fuel usage of the rental vehicle 126. Thus, the multi-modal-transportation system 114 can more accurately predict the estimated fuel rate for the rental duration. For example, the multi-modaltransportation system 114 can analyze daily mileage for the rental vehicle 126 and predict that the requestor 120 will drive roughly the same number of miles for the remainder of the rental duration. In at least one embodiment, the multi-modal-transportation system 114 determines daily fuel usage rate by accessing the fuel levels of the rental vehicle 126. The multi-modal-transportation system 114 may adjust the estimated fuel rate based on the actual daily mileage and/or actual daily fuel usage.

As further illustrated in FIG. 4, the multi-modal-transportation system 114 adds the first estimated rate 402 and the second estimated rate 404 to generate the total rental-vehicle rate 406. The total rental-vehicle rate 406 comprises an estimated composite cost for the rental route. As indicated, the multi-modal-transportation system 114 may present, to the requestor 120, an itemized list of predicted rates. For example, the multi-modal-transportation system 114 may present the daily rate, collision damage waiver (e.g., insurance coverage), and rates for a rental bike and a bus ticket as part of the first estimated rate 402. The multi-modal-transportation system 114 may also include additional rates for rental vehicle add-ons, such as bike racks, child/baby seats, snow tires/winter chains, GPS navigation systems, and others. Additionally, the multi-modal-transportation system 114 accesses additional costs including sales taxes and fees for underage (e.g., under 25) renters.

As mentioned, in some embodiments, the multi-modal-transportation system 114 analyzes a total rental-vehicle rate or other data signals to determine whether or not to transmit data for the rental route. FIG. 5 illustrates a series of acts 500 by which the multi-modal-transportation system 114 can determine to transmit data for the rental route in accordance with one or more embodiments. As illustrated, the series of acts 500 includes an act 502 of analyzing data signals for a transportation request and an act 504 of transmitting data for a rental route.

As illustrated in FIG. 5, the multi-modal-transportation system 114 analyzes a number of data signals to determine whether to transmit data for the rental route. The multi-modal-transportation system 114 determines, in some instances, that a rental route is impractical. For instance, if the destination location is within a threshold distance of the pickup location (e.g., 10 miles), a rental vehicle may be an impractical transportation option. Thus, the multi-modal-transportation system 114 accesses and analyzes data signals for the transportation request. Each of the data signals for the transportation request may indicate the utility of a rental route. The following discussion provides detail regarding various data signals the multi-modal-transportation system 114 analyzes.

As illustrated in FIG. 5, the multi-modal-transportation system 114 accesses and analyzes transportation request characteristics. In some embodiments, transportation request characteristics can include the number of waypoints, such as mid-route stops. Transportation request characteristics may also include the date of a request, a requested time of arrival at the destination location, number of passengers, and others. The multi-modal-transportation system 114 can associate a higher number of requested waypoints with an increased utility of a rental route. In one embodiment, the multi-modal-transportation system 114 determines that the transportation request characteristics indicate the utility of a rental route based on the number of waypoints satisfying a threshold value.

As further illustrated in FIG. 5, the multi-modal-transportation system 114 also analyzes destination location characteristics. In some embodiments, destination location characteristics include destination remoteness, destination type, and destination terrain. The multi-modal-transportation system 114 analyzes destination remoteness by accessing GPS or mapping data regarding the area immediately surrounding the destination location. In one embodiment, the multi-modal-transportation system 114 determines the distance between the destination location and a main center of population. For instance, the multi-modal-transportation system 114 can classify the destination location as being within, near, or far from a main center of population based on a threshold distance (e.g., 10 miles, 20 miles). The multi-modal-transportation system 114 associates a high utility of a rental route with destination locations far from the nearest main center of population.

In addition to analyzing the remoteness of a destination location, the multi-modal-transportation system 114 may also analyze the destination type. In particular, the multi-modal-transportation system 114 analyzes the destination location to determine whether or not the requestor 120 will need a vehicle to transport items from the destination location. For example, the multi-modal-transportation system 114 determines that if the requestor 120 is going to a hardware store, lumber yard, or junk yard, the requestor 120 will likely need a rental vehicle to transport whatever hardware, supplies, or materials the requestor 120 purchases. Other destination types that indicate the utility of a rental route may include gear/equipment stores, gear/equipment rental locations, and others.

As mentioned above, in some embodiments, the multi-modal-transportation system 114 can analyze the terrain of the destination location and the surrounding area. The multi-modal-transportation system 114 can access map data to determine the type and condition of roads leading to the destination location. For example, the multi-modal-transportation system 114 can determine that roads leading to the destination location include dirt roads, such as formally designated rural routes or country roads. The multi-modal-transportation system 114 can determine a rental route using a high-clearance rental vehicle is favorable to a provider transportation route.

As further illustrated in FIG. 5, the multi-modal-transportation system 114 also analyzes historical transportation data. In some embodiments, the multi-modal-transportation system 114 analyzes historical transportation data for both providers and requestors. In particular, the multi-modal-transportation system 114 may access general historical transportation matching data including historical pickup locations, historical destination locations, historical routes, historical provider vehicle types (e.g., SUV, sedan, coupe), and other historical data. Additionally, in some embodiments, the multi-modal-transportation system 114 accesses historical transportation data related specifically to rental vehicles. For example, the multi-modal-transportation system 114 may access historical rental vehicle types, historical rental vehicle pickup and drop-off locations, historical rental routes, and other rental-vehicle-specific data.

As mentioned, the multi-modal-transportation system 114 may analyze historical transportation data for providers and requestors traveling to and from geographical areas. For instance, in some cases, the multi-modal-transportation system 114 determines a geographic area associated with the pickup location and a geographic area associated with the destination location. The multi-modal-transportation system 114 further accesses historical provider logs of routes involving the geographic area associated with the pickup and destination locations. For example, in some embodiments, the multi-modal-transportation system 114 determines an area of a set radius around each of the destination location and the pickup location.

In one or more embodiments, the multi-modal-transportation system 114 determines a cost threshold or a time for transportation threshold. The multi-modal-transportation system 114 can determine, based on provider logs, that providers traveling from the pickup area to the destination area often incur costs above the cost threshold. Similarly, the multi-modal-transportation system 114 can determine that time required to complete provider transportation matching routes between the pickup area to the destination area often meet a time for transportation threshold. Based on these determinations, the multi-modal-transportation system 114 may determine to transmit data for a rental route.

Additionally, the multi-modal-transportation system 114 accesses the provider logs to determine the frequency of provider vehicles traveling from the geographic area associated with the pickup location to the geographic area associated with the destination location. The multi-modal-transportation system 114 associates a low frequency, or simply a low number of, provider vehicles traveling form the pickup location geographic area and the destination location geographic area with a higher utility of the rental route. In at least one embodiment, the multi-modal-transportation system 114 also determines the number of cancelled rides between the pickup location geographic area and the destination location geographic area. Based on determining a threshold number of cancelled rides, the multi-modal-transportation system 114 determines a higher utility of using a rental vehicle and proposing a rental route.

As noted above, in some embodiments, the multi-modal-transportation system 114 accesses historical transportation data for the requestor 120. More specifically the multi-modal-transportation system 114 accesses a requestor log indicating historical transportation data for the requestor in a particular location. For example, the multi-modal-transportation system 114 analyzes the number and frequency of requests, number of requested stops, whether the requestor 120 incurred additional charges, and the number of times the requestor 120 asked past providers to wait. Based on the historical transportation data of the requestor 120, the multi-modal-transportation system 114 can determine, for example, that the requestor 120 often submits numerous transportation requests from a certain geographic location. For example, the multi-modal-transportation system 114 might determine that the requestor 120 often submits transportation requests when the requestor 120 is in San Francisco or another city. Based on receiving a transportation request from the requestor 120 including a destination location in or around San Francisco, the multi-modal-transportation system 114 may determine a higher likelihood that the requestor 120 will be interested in renting a vehicle. In at least one embodiment, the multi-modal-transportation system 114 only accesses and analyzes a requestor log for a requestor who has opted into storing and sharing requestor log data.

Additionally, and as illustrated in FIG. 5, the multi-modal-transportation system 114 can compare the provider-vehicle rate and the rental-vehicle rate. In one embodiment, the multi-modal-transportation system 114 compares the provider-vehicle rate to a threshold rate. Based on determining that the provider-vehicle rate equals or exceeds a threshold rate, for instance, the multi-modal-transportation system 114 determines the utility of and determines to generate data for a rental route. In another embodiment, the multi-modal-transportation system 114 compares the provider-vehicle rate with the rental-vehicle rate.

As further shown in FIG. 5, She multi-modal-transportation system 114 performs the act 504 of transmitting the data for the rental route based on the data signals for the transportation request. To determine whether to suggest a rental route, in at least one embodiment, the multi-modal-transportation system 114 assigns, for each of the data signals, a binary value indicating the utility of a rental route. The multi-modal-transportation system 114 can assign a score of 0 or 1 to each of the data signals. For example, the multi-modal-transportation system 114 can assign a 1 to the destination location characteristics for indicating the utility of a rental route. Based on the binary values, the multi-modal-transportation system 114 can determine to transmit data for the rental route. For example, the multi-modal-transportation system 114 can determine a threshold number of data signals indicating the utility of a rental route. Based on two or more of the data signals indicating the utility of a rental route, for instance, the multi-modal-transportation system 114 transmits data for the rental route.

Alternatively, in another embodiment, the multi-modal-transportation system 114 assigns scores to each of the data signals. The multi-modal-transportation system 114 associates higher scores with a higher likelihood that the rental route is more practical. For example, a remote destination will result in a higher score for the destination location characteristics data signal. In some embodiments, the multi-modal-transportation system 114 sums the scores for the data signals, and, based on the sum meeting a threshold value, performs the act 504 of transmitting data for the rental route.

In addition to proposing and sending data for a rental route, in some embodiments, the multi-modal-transportation system 114 facilitates pick up of a rental vehicle at a rental-vehicle location. In accordance with one or more embodiments, FIG. 6 illustrates an example of a rental-vehicle location 600 where the requestor 120 may pick up or return the rental vehicle 126.

Figure 6:
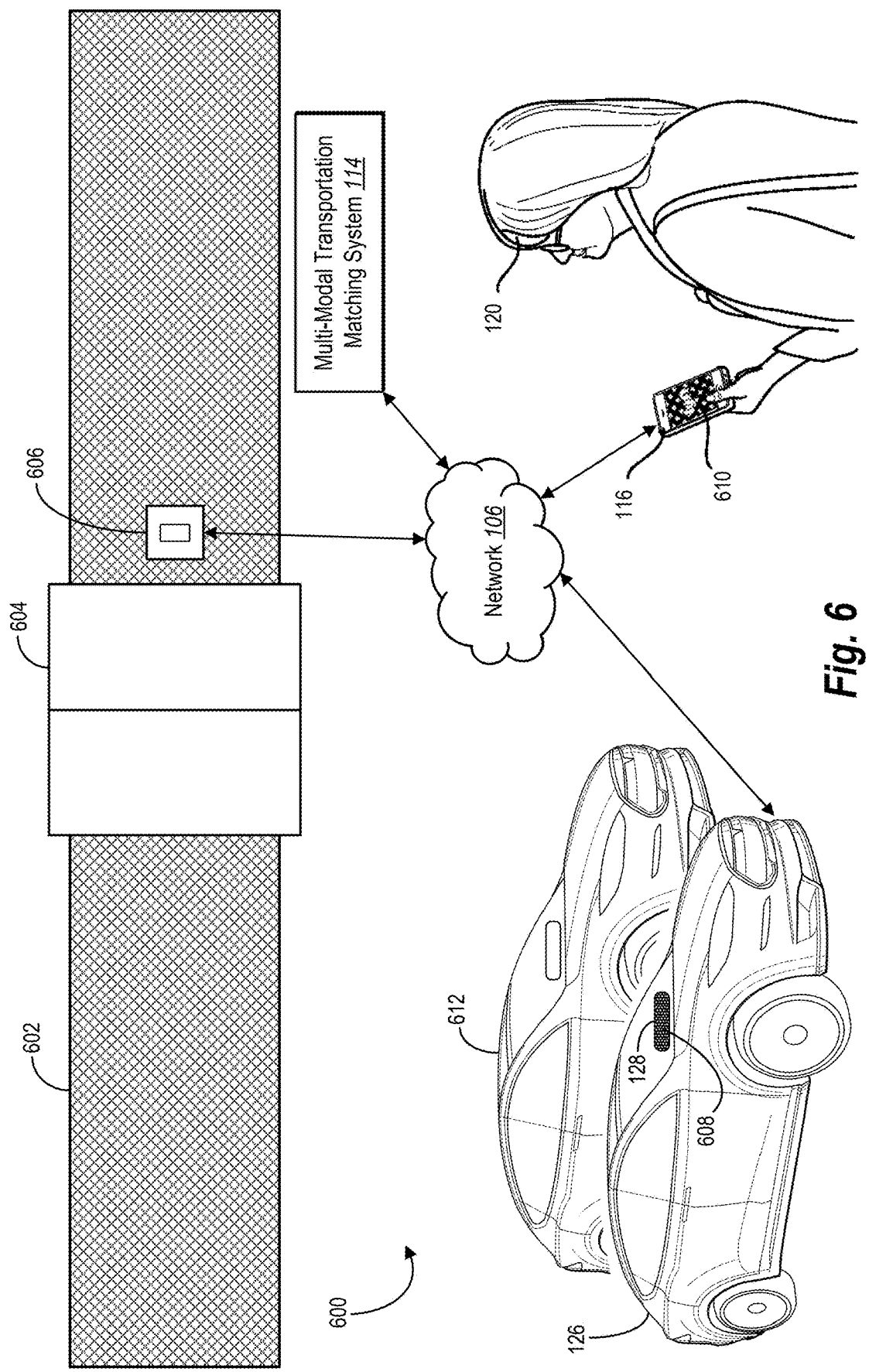
FIG. 6 illustrates a location of a rental vehicle in accordance with one or more embodiments.

As shown in FIG. 6, the rental-vehicle location 600 includes a security barrier 602, a gate 604, a gate transceiver 606, a rental fleet vehicle 612, and the rental vehicle 126. FIG. 6 also includes a representation of the multi-modal-transportation system 114 and the network 106. Generally, the rental-vehicle location 600 is a centralized geographic location at which the multi-modal-transportation system 114 stores rental vehicles.

As illustrated in FIG. 6, the rental-vehicle location 600 includes the rental fleet vehicle 612 and the rental vehicle 126. Although FIG. 6 depicts only two vehicles at the rental-vehicle location 600, the rental-vehicle location 600 may house more vehicles of a vehicle fleet. The rental fleet vehicle 612 and the rental vehicle 126 may comprise human-operated vehicles designated by the multi-modal-transportation system 114, autonomous vehicles, or a combination. Furthermore, the multi-modal-transportation system 114 may designate the rental fleet vehicle 612 and the rental vehicle 126 as rental vehicles, provider vehicles, or a combination of both. For example, the multi-modal-transportation system 114 may designate the rental fleet vehicle 612 and/or the rental vehicle 126 as provider vehicles to be accessed and operated by providers. The multi-modal-transportation system 114 can flexibly convert the rental fleet vehicle 612 and the rental vehicle 126 between being used as rental vehicles and provider vehicles. The multi-modal-transportation system 114 may also store various types of vehicles within the same rental-vehicle location 600. For example, the multi-modal-transportation system 114 may designate the rental fleet vehicle 612 for use by a provider while providing the rental vehicle 126 for rent.

As illustrated in FIG. 6, the rental-vehicle location 600 includes the security barrier 602, the gate 604, and the gate transceiver 606. The security barrier 602 encompasses the area storing a rental vehicle fleet. The multi-modal-transportation system 114 utilizes the gate 604 and the gate transceiver 606 to control traffic into and out of the rental-vehicle location 600. The gate transceiver 606 receives signals and manages the operation of the gate 604. For example, in one embodiment, the multi-modal-transportation system 114 sends, to the gate transceiver 606, a requestor device identification signal associated with the requestor device 116. The gate transceiver 606 stores the requestor device identification signal, and based on detecting the requestor device identification signal, the gate transceiver 606 opens the gate 604. For instance, the gate transceiver 606 opens the gate 604 based on detecting Bluetooth signals of an immediate strength from the requestor device 116.

In at least one embodiment, the multi-modal-transportation system 114 directly controls the gate 604 without the help of the gate transceiver 606. For example, the multi-modal-transportation system 114 may rely on location data received from the requestor device 116. Based on determining that the requestor device 116 is within a proximity range of the rental-vehicle location, the multi-modal-transportation system 114 opens the gate 604 to give the requestor 120 access to the rental vehicle 126.

In some embodiments, the multi-modal-transportation system 114 sends, to the requestor device 116, information for locating the rental vehicle 126 in the rental-vehicle location 600. For example, the multi-modal-transportation system 114 may provide detailed instructions to the requestor device 116 on how to navigate or travel from a location of the requestor device 116 to a location of the rental vehicle 126. For example, the multi-modal-transportation system 114 may present, at the requestor device 116, a detailed map illustrating all the vehicles within the rental-vehicle location 600 and the specific location of the rental vehicle 126. In at least one embodiment, the multi-modal-transportation system 114 organizes vehicles in the rental-vehicle location 600 by numbered parking stalls. The multi-modal-transportation system 114 provides the number of the appropriate parking stall to the requestor device 116.

As further illustrated in FIG. 6, the multi-modal-transportation system 114 also presents visual indicators representing the paring of the rental vehicle 126 and the requestor 120 to aid the requestor 120 in accessing a correct rental vehicle. For instance, in some embodiments, the multi-modal-transportation system 114 sends, to the requestor device 116 via the network 106, a rental-vehicle-matching identifier. The rental-vehicle-matching identifier can comprise a code or programming instructions that cause the requestor device to perform various tasks. For example, based on receiving the rental-vehicle-matching identifier, the requestor device 116 displays a requestor visual indicator 610.

In at least some embodiments, the multi-modal-transportation system 114 generates a rental-vehicle-matching identifier that uniquely identifies the paring between the requestor 120 and the rental vehicle 126. When the requestor 120 enters the rental-vehicle location 600, the requestor may face difficulty in identifying the rental vehicle 126 among all vehicles within the rental-vehicle location 600. In at least one embodiment, the multi-modal-transportation system 114 generates the rental-vehicle-matching identifier based on user selection of the rental vehicle 126. As suggested above, in some embodiments, the multi-modal-transportation system 114 generates a different rental-vehicle-matching identifier for each paring of requestor to rental vehicle. In some cases, the multi-modal-transportation system 114 generates and transmits a rental-vehicle matching identifier as identification elements, as described by Identifying Matched Requestors and Providers, U.S. patent application Ser. No. 15/396,417 (filed Dec. 30, 2016), the entirety of which is hereby incorporated by reference.

To illustrate such visual indicators, in some embodiments, the requestor visual indicator 610 may include a unique color or pattern that represents or indicates the specific matching between the requestor 120 and the rental vehicle 126. Similarly, the multi-modal-transportation system 114 sends the rental-vehicle matching identifier to the vehicle-display device 128. Based on receiving the rental-vehicle matching identifier, the vehicle-display device 128 displays a rental-vehicle-visual indicator 608 matching the requestor visual indicator 610. As illustrated in FIG. 6, the rental-vehicle-visual indicator 608 and the requestor visual indicator 610 comprise a matching pattern. In one embodiment, the multi-modal-transportation system 114 may employ techniques for generating and transmitting a rental-vehicle matching identifier as an identification element or displaying visual indicators, as described in Identifying Matched Requestors and Providers, U.S. patent application Ser. No. 15/396,417 (filed Dec. 30, 2016), which is hereby incorporated by reference as though fully set forth herein.

As mentioned, the multi-modal-transportation system 114 provides the requestor device 116 with access to the rental vehicle 126. In some embodiments, the multi-modal-transportation system 114 utilizes near field communications between the rental vehicle 126 and the requestor device 116 to enable access. For example, in some embodiments, the rental vehicle 126 includes a Near Field Communications ("NFC") coil mounted to the windshield or dashboard of the rental vehicle 126. In some cases, the NFC coil is part of a telematics device. The NFC coil sends and receives information exchanged at short distances. Based on detecting that the requestor device 116 is within a proximity range of the NFC coil, the computing device in the rental vehicle 126 may unlock and otherwise enable access to the rental vehicle 126 and functions of the rental vehicle 126.

As further illustrated in FIG. 6, in some embodiments, the multi-modal-transportation system 114 transmits, to the requestor device 116, a virtual key to unlock and operate the rental vehicle 126. In some cases, virtual keys comprise digital code that, when validated by computing device in a rental vehicle, prompt the rental vehicle to unlock or provide access to the vehicle, similar to physical keys. For instance, when the multi-modal-transportation system 114 pairs the requestor 120 to the rental vehicle 126, the multi-modal-transportation system 114 creates a virtual key for the rental vehicle 126. The multi-modal-transportation system 114 sends the virtual key to the requestor device 116 and the rental vehicle 126. When the requestor 120 wishes to access the rental vehicle 126, the requestor device 116 transmits the virtual key to the rental vehicle 126 (or the rental vehicle device 130). The rental vehicle 126 verifies the virtual key and allows the requestor 120 to access the rental vehicle 126. For example, when the requestor 120 approaches the rental vehicle 126, the requestor device 116 may automatically send the virtual key to the rental vehicle 126, and upon receiving and verifying the virtual key, the rental vehicle 126 unlocks itself (e.g., by unlocking a door). The virtual key enables the requestor 120 to access the rental vehicle 126 for the rental duration. Additionally, in some embodiments, the requestor device 116 may remotely lock, unlock, and otherwise operate the rental vehicle 126.

As suggested above, the multi-modal-transportation system 114 may transmit the virtual key to the requestor device 116 at various times after the requestor 120 has selected the rental vehicle 126. In one embodiment, immediately after or within a threshold time period of processing payment for reservation of the rental vehicle 126, the multi-modal-transportation system 114 sends a virtual key to the requestor device 116. In another embodiment, the multi-modal-transportation system 114 does not transmit the virtual key until the multi-modal-transportation system 114 detects that the requestor 120 has entered the rental-vehicle location 600 or has entered a proximity region of the rental vehicle 126. For example, the multi-modal-transportation system 114 may transmit or activate the virtual key at the requestor device 116 based on detecting that the requestor device 116 has entered a proximity range of the gate transceiver 606. Alternatively, the multi-modal-transportation system 114 may transmit the virtual key based on detecting that the requestor device 116 is within a proximity distance of the vehicle-display device 128.

As noted above, the multi-modal-transportation system 114 can access telematics data to determine rates or perform other functions. In at least one embodiment, the multi-modal-transportation system 114 accesses telematics data from the rental vehicle 126 based on detecting entry of the requestor 120 into the rental vehicle 126. The multi-modal-transportation system 114 stores the accessed telematics data as a baseline. For example, the multi-modal-transportation system 114 accesses fuel levels of the rental vehicle 126 before the requestor 120 begins operating the rental vehicle 126. The multi-modal-transportation system 114 may also access mileage data to determine how many miles the rental vehicle 126 has traveled before operation by the requestor 120.

Though not illustrated, the multi-modal-transportation system 114 also arranges to receive returning rental vehicles at the rental-vehicle location 600. In particular, the multi-modal-transportation system 114 sends, to the gate transceiver 606 identification signals for the requestor device 116 and/or the rental vehicle 126. Based on detecting that the requestor device 116 and/or the rental vehicle 126 have entered a proximity range of the gate transceiver 606, the multi-modal-transportation system 114 opens the gate 604 to allow entry of the rental vehicle 126. As indicated above, the multi-modal-transportation system 114 may receive the rental vehicle at return at the same rental-vehicle location or at a different rental-vehicle location.

Based on detecting entry of the rental vehicle 126 at the rental-vehicle location 600, the multi-modal-transportation system 114 accesses telematics data from the rental vehicle 126. In particular, the multi-modal-transportation system 114 accesses telematics data that it can compare to the baseline telematics data recorded when the requestor 120 first accessed the rental vehicle 126. For example, the multi-modal-transportation system 114 accesses fuel level at the end of the rental period and compares it with the fuel level recorded at the beginning of the rental period. The multi-modal-transportation system 114 calculates the difference of the recorded fuel levels and adds the fuel rate to the final rental-vehicle rate charged to the requestor 120. The multi-modal-transportation system 114 may also access mileage information of the rental vehicle 126 at the end of the rental period.

In accordance with one or more embodiments, FIGS. 7A-9E provide examples of various graphical user interfaces generated and transmitted by the multi-modal-transportation system 114. As mentioned, the multi-modal-transportation system 114 can present (or cause the requestor device 116 to present) a multi-modal graphical user interface comprising at least a rental route and a provider transportation route. FIGS. 7A-7B illustrate example embodiments of graphical user interfaces comprising a rental route and provider transportation routes in parallel on the requestor device 116. FIGS. 8A-8D illustrate example embodiments of graphical user interfaces comprising interactive elements for reserving a rental vehicle. FIGS. 9A-9E illustrate example embodiments of graphical user interfaces comprising various intermediate transportation options.

As an overview, FIGS. 7A-9E each depict the requestor device 116 comprising the requestor application 118 for the dynamic transportation matching system 112. In some embodiments, the requestor application 118 comprises computer-executable instructions that (upon execution) cause the requestor device 116 to perform certain actions and present interactive elements depicted in FIGS. 7A-9E. Based on receiving route data from the multi-modal-transportation system 114, in some embodiments, the requestor device 116 executes instructions from the requestor application 118 presents the graphical user interfaces shown in FIGS. 7A-9E.

FIGS. 7A-7B illustrate an example multi-modal graphical user interface 704 displayed on a screen of the requestor device 116. For instance, FIG. 7A illustrates the requestor device 116 presenting the multi-modal graphical user interface 704 including a rental-vehicle option and a provider-matching option. FIG. 7B illustrates a vehicle-selection-user interface 720 including various rental-vehicle options.

As discussed, the multi-modal-transportation system 114 presents, at the requestor device 116, the multi-modal graphical user interface 704 including a provider transportation route and a rental route. As illustrated in FIG. 7A, the multi-modal graphical user interface 704 includes a map element 706, provider matching transportation options 716a-716b (collectively "provider transportation options 716"), and a rental-vehicle option 718.

As shown in FIG. 7A, the requestor device 116 presents the multi-modal graphical user interface 704 includes the map element 706. As illustrated, the map element 706 depicts an overview of a selected transportation option-whether that be a provider-matching option or a rental-vehicle option. As illustrated in FIG. 7A, the map element 706 depicts an overview of the selected rental-vehicle option 718, as indicated by a box around the rental-vehicle option 718. The requestor device 116 presents, within the map element 706, a requestor icon 752 indicating the current location of the requestor 120, a rental-vehicle location icon 740 indicating the rental-vehicle location, and a destination location icon 750.

As further indicated by FIG. 7A, the requestor device 116 presents the multi-modal graphical user interface 704 including a rental routes element 710, a comparison element 712, and a provider transportation routes element 714. As illustrated, based on receiving an indication of requestor interaction (e.g., selection) with the comparison element 712 from the requestor device 116, the multi-modal-transportation system 114 sends data for routes or options to the requestor device 116—to cause the requestor device 116 to present both provider and rental-vehicle routes or options. Based on the data, the requestor device 116 presents various transportation options with routes by which a vehicle can transport the requestor 120 to the destination location. Based on requestor interaction with the rental routes element 710, on the one hand, the requestor device 116 presents rental routes, but not provider transportation routes. Based on requestor interaction with the provider transportation routes element 714, on the other hand, the requestor device 116 presents provider transportation routes, but not rental routes.

As mentioned above, the requestor device 116 presents both a provider transportation route and a rental route based on selection of the comparison element 712. As illustrated in FIG. 7A, the requestor device 116 presents the provider-matching transportation options 716 and the rental-vehicle option 718. The requestor device 116 can visually indicate a selection of one of the transportation options. As illustrated in FIG. 7A, for instance, the requestor device 116 detects requestor interaction with the rental-vehicle option 718 corresponding to a rental route. Based on the requestor interaction, the requestor device 116 visually indicates (e.g., generates a highlight box surrounding) the rental-vehicle option 718. The rental-vehicle option includes details concerning a rental vehicle and corresponding travel, such as the number of available seats (e.g., 5), the rental-vehicle rate ($64.20), and an estimated time of arrival at the destination location.

As illustrated in FIG. 7A, the provider-matching transportation option 716*a* corresponds to a provider transportation route involving a sedan-sized provider vehicle. The provider-matching transportation option 716*a* indicates includes provider-matching transportation route information, including the number of available seats (e.g., 4), the provider-vehicle rate for the sedan-sized provider vehicle (e.g., $10.62), and the estimated time of arrival at the destination location (e.g., 10:10 AM). Similarly, the provider-matching transportation option 716*b* includes provider-matching transportation route information corresponding to an alternative provider-vehicle route involving a larger (e.g., SUV) provider vehicle. As illustrated, the provider-matching transportation option 716*b* indicates the number of available seats, the rate, and the estimated time of arrival at the destination location. Based on requestor interaction with the provider-matching transportation options 716, the requestor device 116 updates the graphical user interface to present additional details regarding the corresponding provider transportation route.

The multi-modal graphical user interface 704 also includes a payment options element 728. Based on requestor selection of the payment options element 728, the requestor device 116 updates the graphical user interface to provide additional details regarding potential payment options. The requestor 120 may input alternative payment option or otherwise manage payment options.

Based on receiving indications of user selection of the scheduling element 724, the multi-modal-transportation system 114 may determine and schedule transportation routes for the future. For example, the multi-modal-transportation system 114 identify a future date for a provider transportation route or a rental route based on user input.

As illustrated in FIG. 7A, based on detecting user selection of the selection element 726, the requestor device 116 updates the multi-modal graphical user interface 704 to provide additional details regarding the selected transportation option. For example, as illustrated, the requestor device 116 detects user interaction with the rental-vehicle option 718. Based on an additional requestor selection of the selection element 726, the requestor device 116 presents additional detail regarding the rental-vehicle option 718.

As previously mentioned, based on user interaction with the rental routes element 710, the comparison element 712, or the provider transportation routes element 714, the multi-modal-transportation system 114 presents additional transportation route options corresponding to the selected element. FIG. 7B illustrates an example vehicle-selection-user interface 720 on the screen of the requestor device 116 based on the multi-modal-transportation system 114 detecting requestor selection of the rental routes element 710.

As illustrated in FIG. 7B, the requestor device 116 presents, within the vehicle-selection-user interface 720, a rental map element 708, a first rental-vehicle option 730, and a first rental-vehicle option selection element 734.

The requestor device 116 presents the rental map element 708, which includes the rental-vehicle location icons 740*a* and 740*b*. Each of the rental-vehicle location icons 740*a* and 740*b* indicate a rental-vehicle location. The requestor device 116 presents the rental-vehicle location icons 740*a* and 740*b* to generally indicate the nearest rental-vehicle location. Based on detecting requestor selection of one of the rental-vehicle location icons 740*a* or 740*b*, the requestor device 116 updates the vehicle-selection-user interface 720 to indicate available rental vehicles that are located at the selected rental-vehicle location.

As further illustrated by FIG. 7B, the multi-modal-transportation system 114 presents, via the vehicle-selection-user interface 720, the first rental-vehicle option 730. The first rental-vehicle option 730 indicates a particular available rental vehicle along with the corresponding rental-vehicle location. For example, as indicated by the first rental-vehicle option 730, the rental vehicle is located at the Mission rental-vehicle location of the address 321 Florida St, which is 3 miles away from the requestor's current location.

Additionally, the first rental-vehicle option 730 indicates characteristics of the particular available rental vehicle. For example, the requestor device 116 presents the make and model (e.g., VW Passat), number of seats (e.g., 5), mileage (25/36), and estimated rental-vehicle rate ($55/day). Although FIG. 7B illustrates the rental-vehicle rate as the rental vehicle daily rate, in one or more embodiments, the multi-modal-transportation system 114 may also present a predicted total rental-vehicle rate which includes an estimated intermediate rate.

The requestor device 116 also presents a second rental-vehicle option 736 via the vehicle-selection-user interface 720. Although FIG. 7B illustrates the inclusion of a first and a second rental-vehicle options, the requestor device 116 can present multiple rental-vehicle options via the vehicle-selection-user interface 720.

As illustrated, the vehicle-selection-user interface 720 includes route-option elements 738. The route-option elements 738 may include a number of selectable icons (e.g., a magnifying glass, a bicycle, a train, and keys), and the requestor device 116 updates the vehicle-selection-user interface 720 to present information regarding the selected icon. In one embodiment, the multi-modal-transportation system 114 transmits information regarding various other transportation options to the destination location based on detected selection of the corresponding selected icon. For example, the requestor device 116 may present a bikeshare transportation route in response to user selection of the bicycle icon. Similarly, the requestor device 116 updates the vehicle-selection-user interface 720 to present public transit route options and rental route options based on a user selection of the train icon and the bicycle icon, respectively. Based on a detected selection of the magnifying glass icon, the multi-modal-transportation system 114 may update the destination location. Though not illustrated, the route-option elements 738 may include additional selectable icons including icons corresponding to a provider-vehicle route, a scooter share route, a taxi route, and any other transportation route determined by the multi-modal-transportation system 114.

As described, FIG. 7B illustrates the vehicle-selection-user interface 720 as an example interface presented by the requestor device 116 after the multi-modal-transportation system 114 has received a transportation request. In at least one embodiment, the requestor device 116 presents the vehicle-selection-user interface 720 without receiving a transportation request. For example, the multi-modal-transportation system 114 presents various transportation options near the requestor 120. The multi-modal-transportation system 114 presents various transportation options based on selection of icons in the route-option elements 738. In addition to presenting rental-vehicle options, the multi-modal-transportation system 114 may provide data for bike-share options, public transportation options, and provider-matching options to the requestor device 116 based on selection of the corresponding selectable icon. Additionally, based on detecting interaction with the magnifying glass selectable icon, the requestor device 116 receives an input destination location from the requestor.

FIGS. 7A-7B illustrate example graphical user interfaces presenting rental-vehicle options corresponding to predicted rental parameters. Based on detecting selection of the first rental-vehicle option selection element 734, the requestor device 116 updates the graphical user interface to present interactive elements for adjusting rental parameters.

As mentioned previously in relation to FIG. 3, the multi-modal-transportation system 114 generates predicted rental parameters to transmit data for the provider transportation route and the rental route. The multi-modal graphical user interface 704 and the vehicle-selection-user interface 720 illustrated in FIGS. 7A-7B include transportation route information determined by the multi-modal-transportation system 114 using the predicted rental parameters. As further discussed in relation to FIG. 3, the multi-modal-transportation system 114 may generate requestor-modified rental parameters based on requestor input. FIGS. 8A-8D illustrate a series of example graphical user interfaces by which the requestor device 116 may receive the input of requestor modifications and present the requestor modifications for confirmation by the requestor 120.

FIG. 8A illustrates a rental-reservation-user interface 802 as an example graphical user interface by which the requestor 120 can generate or modify a rental-vehicle reservation. Based on user interaction with elements of the rental-reservation-user interface 802, the multi-modal-transportation system 114 modifies the rental parameters utilized in determining the data for the rental route. As illustrated in FIG. 8A, the rental-reservation-user interface 802 includes a calendar 806 including a selected-rental-duration element 804 and a duration discount notification 808. The rental-reservation-user interface 802 further comprises a vehicle pickup and return time element 810, a rental-vehicle rate 812a, and a requestor modification confirmation element 814.

As illustrated, the calendar 806 comprises a visual representation of a monthly calendar. The multi-modal-transportation system 114 visually indicates (e.g., by generating a circle around) the selected-rental-duration element 804 based on requestor interaction with the rental-reservation-user interface 802. For example, the requestor device 116 can generate the selected-rental-duration element 804 based on detecting a user tap of the first and last dates or a dragging motion between the dates of the desired rental duration. As illustrated, the requestor device 116 generates the selected-rental-duration element 804 indicating that the requestor 120 selected the rental duration of June 29-July 1.

As further shown in FIG. 8A, the rental-reservation-user interface 802 also includes the duration discount notification 808. The requestor device 116 presents the duration discount notification 808 based on determining that the rental duration meets a threshold length. The duration discount notification 808 indicates the discount value and the reason for the discount. The requestor device 116 may also present additional notifications in place of (or in addition to) the duration discount notification 808. For example, the requestor device 116 can present a notification indicating a reduced rate contingent on returning the rental vehicle at a particular rental-vehicle location.

As further illustrated in FIG. 8A, the calendar 806 includes both date values as well as predicted daily rates. For example, the multi-modal-transportation system 114 associates each date with a predicted daily rate. As discussed previously, the multi-modal-transportation system 114 can dynamically generate the predicted daily rates based on seasonality, demand, location, etc.

Relatedly, as further illustrated in FIG. 8A, the rental-reservation-user interface 802 includes the vehicle pickup and return time element 810. Based on detected requestor interaction with the vehicle pickup and return time element 810, the multi-modal-transportation system 114 adjusts the rental vehicle pickup time and the rental vehicle return time.

In addition to a calendar and return times, the requestor device 116 presents the rental-vehicle rate 812a. More specifically, the multi-modal-transportation system 114 generates the rental-vehicle rate 812a based on the received requestor modifications. In at least one embodiment, the multi-modal-transportation system 114 adjusts and transmits the rental-vehicle rate 812a in real-time to reflect the most recent requestor modifications. For example, based on changes to the rental vehicle parameters, the multi-modal-transportation system 114 may recalculate and update the rental-vehicle rate 812a.

Based on detecting selection of the requestor modification confirmation element 814, the multi-modal-transportation system 114 confirms the received requestor modifications. Consequently, the requestor device 116 presents a reservation-review-user interface to provide an overview of the rental route based on the requestor-modified rental parameters. For example, FIG. 8B illustrates a reservation-review-user interface 826a including various confirmation elements. As illustrated in FIG. 8B, the reservation-review-user interface 826a includes a rental-vehicle-location element 816, a rental-return-location element 818, a rental duration element 820, a rental vehicle detail element 824, a rental reservation element 828, and rental-vehicle rate 812b.

As shown in FIG. 8B, the requestor device 116 presents the rental-vehicle-location element 816, the rental-return-location element 818, and the rental duration element 820. The requestor device 116 presents information regarding the rental-vehicle location such as the address via the rental-vehicle-location element 816. Likewise, the requestor device 116 presents return location information including the return location address via the rental-return-location element 818. The requestor device 116 also presents the rental duration dates via the rental duration element 820. Based on detected interaction with any one of the above-mentioned elements, the multi-modal-transportation system 114 can adjust the corresponding rental parameter. For example, based on detecting requestor selection of the rental-vehicle-location element 816, the multi-modal-transportation system 114 may generate and transmit prompts for selecting a different rental-vehicle location for picking up the vehicle.

As illustrated in FIG. 8B, the reservation-review-user interface 826a also includes the rental vehicle detail element 824. The requestor device 116 presents, via the rental vehicle detail element 824, information regarding the rental vehicle 126. For example, rental vehicle detail element 824 includes rental route information comprising the make and model, number of seats, gas mileage, daily rental rate, and other information. As illustrated, the rental vehicle detail element 824 may include an interactive modification element (e.g., a "Change car" button). Based on detecting interaction with the interactive modification element, the multi-modal-transportation system 114 transmits, for display at the requestor device 116, alternative rental vehicles.

As illustrated in FIG. 8B, the reservation-review-user interface 826a includes a payment option element 830. The payment option element 830 indicates the payment option that will be used to cover the cost of the rental vehicle 126. Based on detecting user interaction with the payment option element 830, the requestor device 116 may present alternative payment options or allow the requestor 120 to input a new payment method. In at least one embodiment, the multi-modal-transportation system 114 transmits for display a notification in addition to the payment option element 830 to notify the requestor 120 that a different payment option than the one currently selected offers additional rental vehicle coverage. For example, the requestor device 116 may include a notification icon (e.g., a red dot) within the payment option element 830 to notify the requestor 120.

As further shown in FIG. 8B, the reservation-review-user interface 826a also includes the rental reservation element 828. The multi-modal-transportation system 114 confirms the rental vehicle details based on detected interaction with the rental reservation element 828. For example, based on detected selection of the rental reservation element 828, the multi-modal-transportation system 114 reserves the identified rental vehicle for the selected rental duration. As part of reserving the rental vehicle 126, the multi-modal-transportation system 114 pairs the rental vehicle 126 with the requestor 120.

The reservation-review-user interface 826a may include additional confirmation elements to those illustrated in FIG. 8B. For example, the requestor device 116 may, based on detecting a scrolling motion, present additional confirmation elements. FIG. 8C illustrates additional confirmation elements in accordance with one or more embodiments. For example, the requestor device 116 presents the reservation-review-user interface 826b illustrated in FIG. 8C including a rental coverage element 832, an add-on selection element 834, driver information 836, an update license element 838, an add driver element 840, and an additional information element 842. Additionally, the reservation-review-user interface 826b includes rental-vehicle rate 812c.

Based on user interaction with the rental coverage element 832 illustrated in the reservation-review-user interface 826b of FIG. 8C, the multi-modal-transportation system 114 adds and/or adjusts rental coverage information. In at least one embodiment, the multi-modal-transportation system 114 provides various degrees of coverage. Based on selection of the rental coverage element 832, the multi-modal-transportation system 114 may also transmits, for display, additional coverage options including coverage provided by the payment companies associated with the payment option selected by the requestor 120.

In addition to coverage options, the reservation-review-user interface 826b includes interactive elements for selecting rental vehicle add-ons. As illustrated in FIG. 8C, the multi-modal-transportation system 114 also provides the add-on selection element 834. Based on selection of the add-on selection element 834, the requestor device 116 presents various add-on options. As mentioned previously, the multi-modal-transportation system 114 may provide additional options including child/baby seats, bike or other gear racks, snow gear, GPS navigation units, and other add-ons.

As further shown in FIG. 8C, the multi-modal-transportation system 114 also presents the driver information 836 via the reservation-review-user interface 826b. In at least one embodiment, the multi-modal-transportation system 114 automatically predicts the driver information 836 based on information from the requestor device 116 of the requestor 120. For example, the multi-modal-transportation system 114 accesses information stored by the dynamic transportation matching system 112 regarding the requestor 120. As illustrated, the driver information 836 includes the driver name, license number, and contact information. The requestor 120 may select the driver information 836 and provide updated driver information.

Additionally, in at least one embodiment, the multi-modal-transportation system 114 may identify a new driver based on user interaction with the driver information 836. As illustrated in FIG. 8C, the driver information 836 corresponds to the requestor 120 associated with the requestor device 116. If the requestor 120 wishes to rent the vehicle for a new driver that is not associated with the requestor device 116, the multi-modal-transportation system 114 may update the driver information 836. More specifically, the multi-modal-transportation system 114 will receive identification information for the new driver so that the multi-modal-transportation system 114 may communicate directly with the mobile device associated with the new driver.

As further illustrated in FIG. 8C, the multi-modal-transportation system 114 may also update the driver's license on file for the requestor 120 based on a selection of the update license element 838. For example, based on selection of the update license element 838, the multi-modal-transportation system 114 may update the reservation-review-user interface 826b to display the current driver's license on file corresponding to the driver information 836. The multi-modal-transportation system 114 presents, to the requestor 120, an option to update or continue using the current driver's license. If the requestor 120 opts to update the driver's license, the multi-modal-transportation system 114 transmits data corresponding to options to update the license. In one embodiment, the multi-modal-transportation system 114 transmits data for the requestor device 116 to present interactive elements by which the requestor 120 can manually input updated driver's license information. In another embodiment, the multi-modal-transportation system 114 accesses the camera of the requestor device 116 to take a picture of the updated driver's license. The multi-modal-transportation system 114 may then extract driver's license information from the picture of the updated driver's license.

Based on interaction with the add driver element 840, the multi-modal-transportation system 114 provides options to add authorized drivers. The multi-modal-transportation system 114 may transmit data for interactive elements by which the requestor 120 may manually input information for additional drivers. Additionally, or alternatively, the multimodal-transportation system 114 may again access the camera of the requestor device 116 to take a picture of the additional driver's license.

The multi-modal-transportation system 114 may also present additional information in the additional information element 842. As further illustrated in FIG. 8C, the multi-modal-transportation system 114 transmits additional information relevant to operating a vehicle within a particular geographical area. For example, the reservation-review-user interface 826b includes a "Prop 65" legal warning for drivers within the state of California. Based on requestor selection of the additional information element 842, the multi-modal-transportation system 114 updates the graphical user interface to provide additional detail regarding the indicated additional information.

Figure 8D:
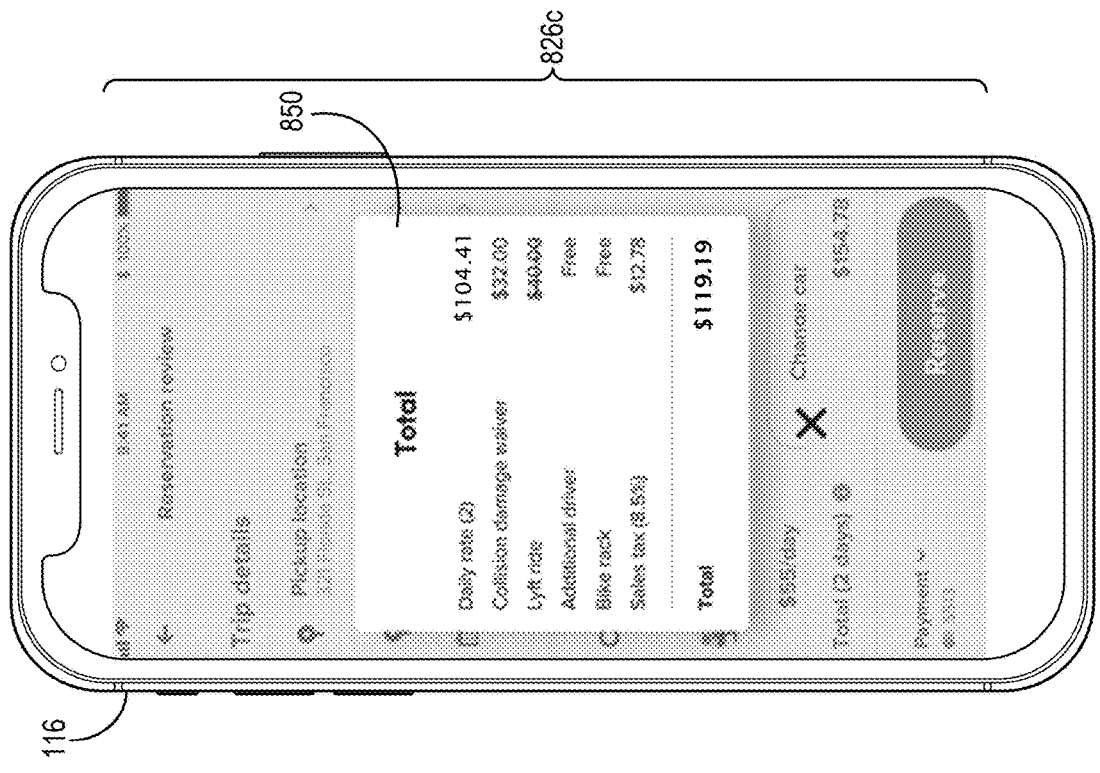
Figure 8C:
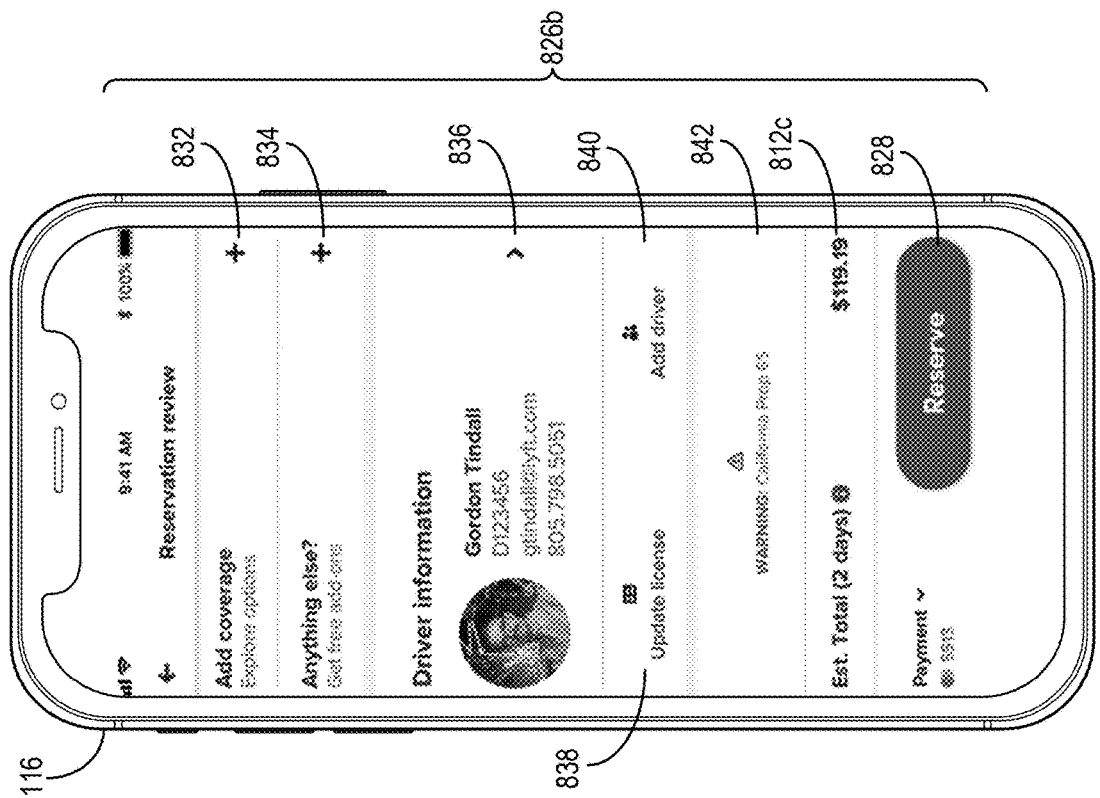

As mentioned with reference to FIGS. 8A-8C, the multi-modal-transportation system 114 sends data for the requestor device 116 to present the rental-vehicle rates 812a-812c in a graphical user interface. In at least one embodiment, based on detecting a user selection of one of the rental-vehicle rate 812a-812c, the requestor device 116 updates a corresponding reservation-review-user interface to present an itemized rental-vehicle rate notification. FIG. 8D illustrates the requestor device 116 presenting an itemized rental-vehicle rate notification 850 within a reservation-review-user interface 826c. The itemized rental-vehicle rate notification 850 includes an itemized list of costs that add up to the rental-vehicle rate. As previously discussed with respect to FIG. 4, the itemized rental-vehicle rate notification 850 may include the daily rate, insurance coverage rate, intermediate route rate, and any additional rates including additional driver rates, add-on rates, taxes, and others.

FIGS. 8A-8D present example graphical user interfaces that the multi-modal-transportation system 114 uses to receive requestor modifications to the rental parameters and confirm the paired rental vehicle. As discussed, the multi-modal-transportation system 114 determines the intermediate transportation route to transport the requestor 120 from the pickup location to the rental-vehicle location. In some embodiments, the multi-modal-transportation system 114 determines the intermediate transportation route when matching the requestor 120 and the rental vehicle 126. In other embodiments, the multi-modal-transportation system 114 determines the intermediate transportation route at the beginning of the rental duration. FIGS. 9A-9E illustrate an example series of graphical user interfaces for selecting an intermediate route.

Figure 9B:
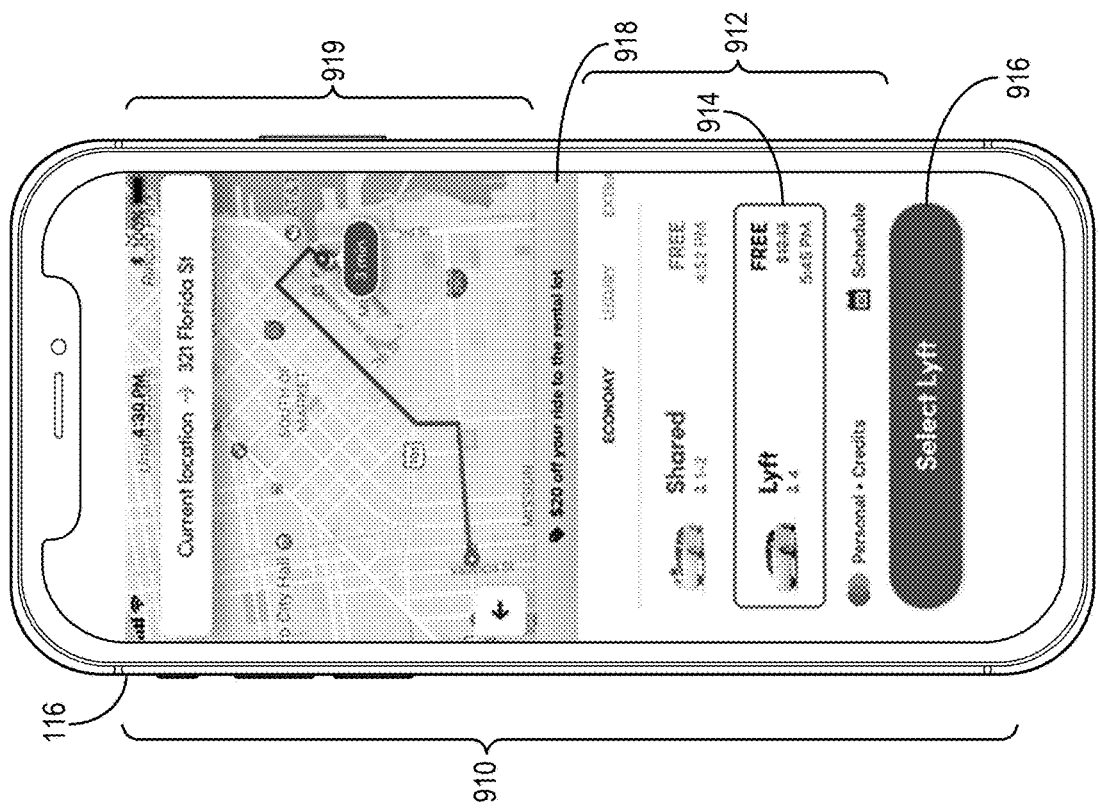
Figure 9A:
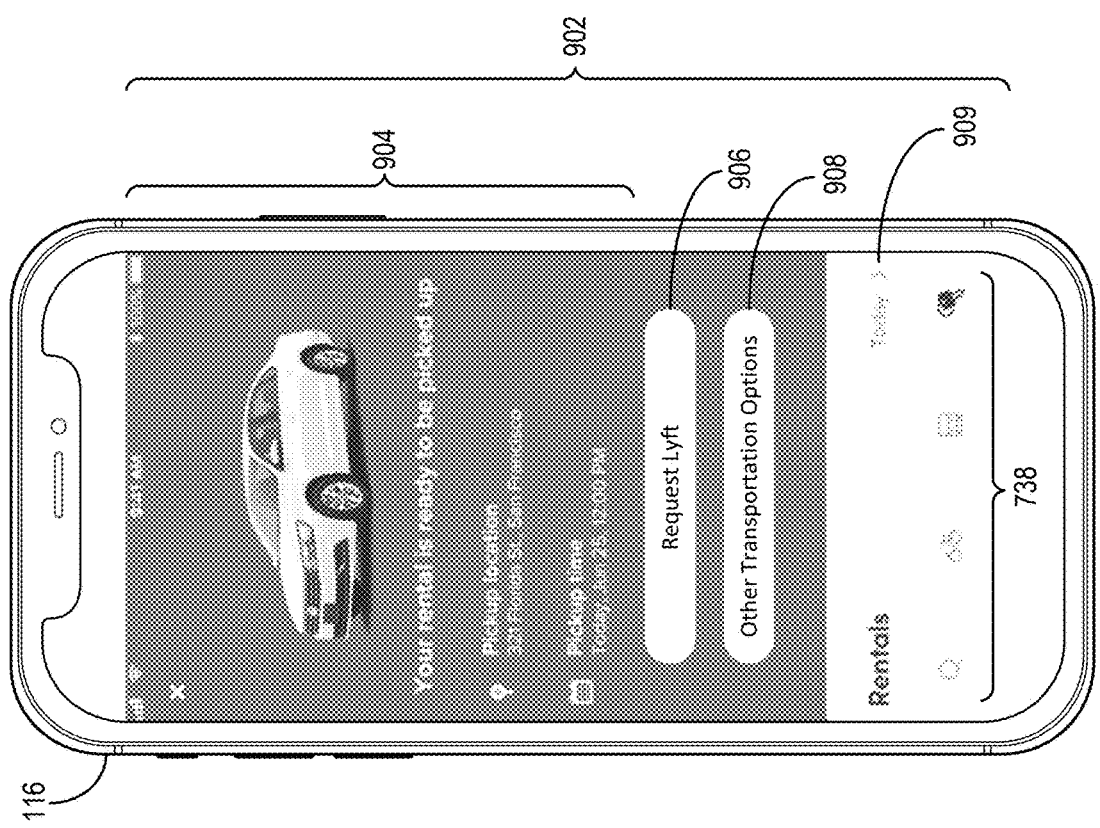

As illustrated in FIG. 9A, the multi-modal-transportation system 114 sends data to the requestor device 116 to present an intermediate transportation graphical user interface 902. The requestor device 116 presents the intermediate transportation graphical user interface 902 to receive user input regarding the desired intermediate transportation route. The intermediate transportation graphical user interface 902 includes rental-vehicle-pickup information 904, a provider-matching option 906, an alternative-transportation option 908, a rental-vehicle-information element 909, and the route-option elements 738.

The requestor device 116 presents, via the rental-vehicle-pickup information 904, information regarding the rental vehicle 126, the rental-vehicle location, and the rental vehicle reservation. For example, as illustrated in FIG. 9A, the rental-vehicle-pickup information 904 includes a representation of the rental vehicle 126, the address of the rental-vehicle location, and the pickup time for the rental vehicle 126.

As further shown in FIG. 9A, the intermediate transportation graphical user interface 902 also includes the provider-matching option 906. Based on detected selection of the provider-matching option 906, the requestor device 116 updates the graphical user interface to present provider-matching transportation options. For example, based on detecting selection of the provider-matching option 906, the requestor device 116 presents a provider-matching-user interface as illustrated in FIG. 9B below.

Figure 9D:
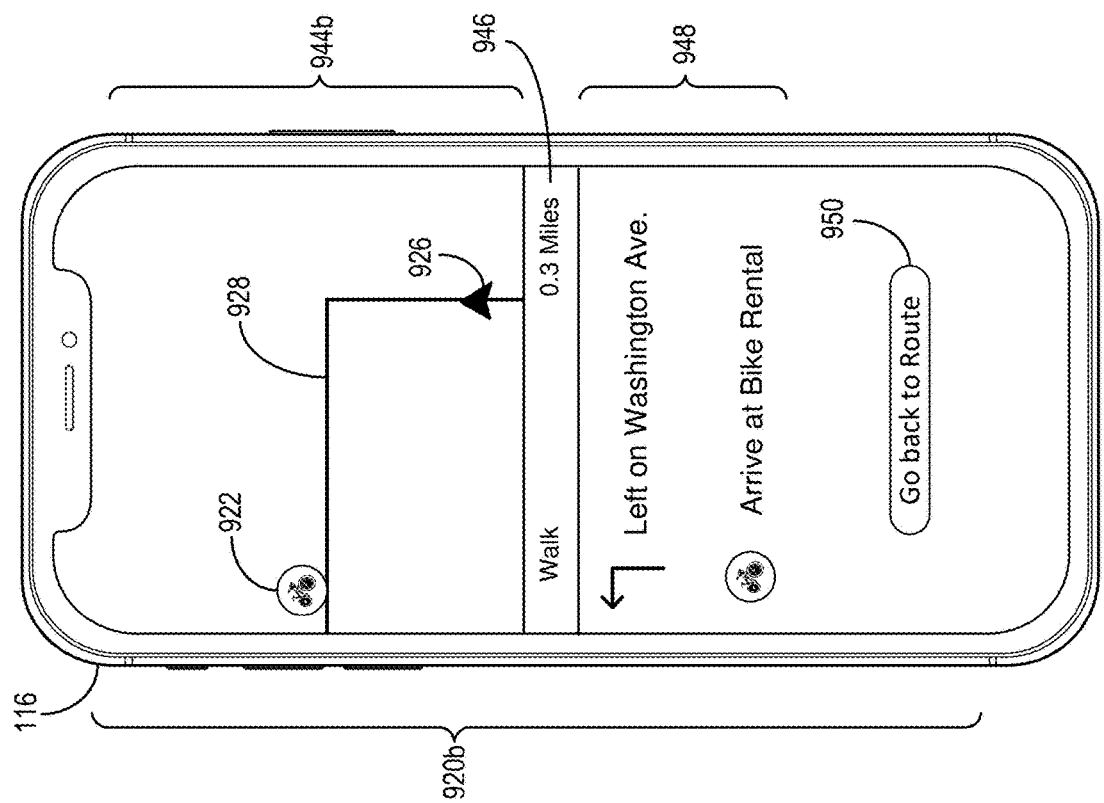
Figure 9C:
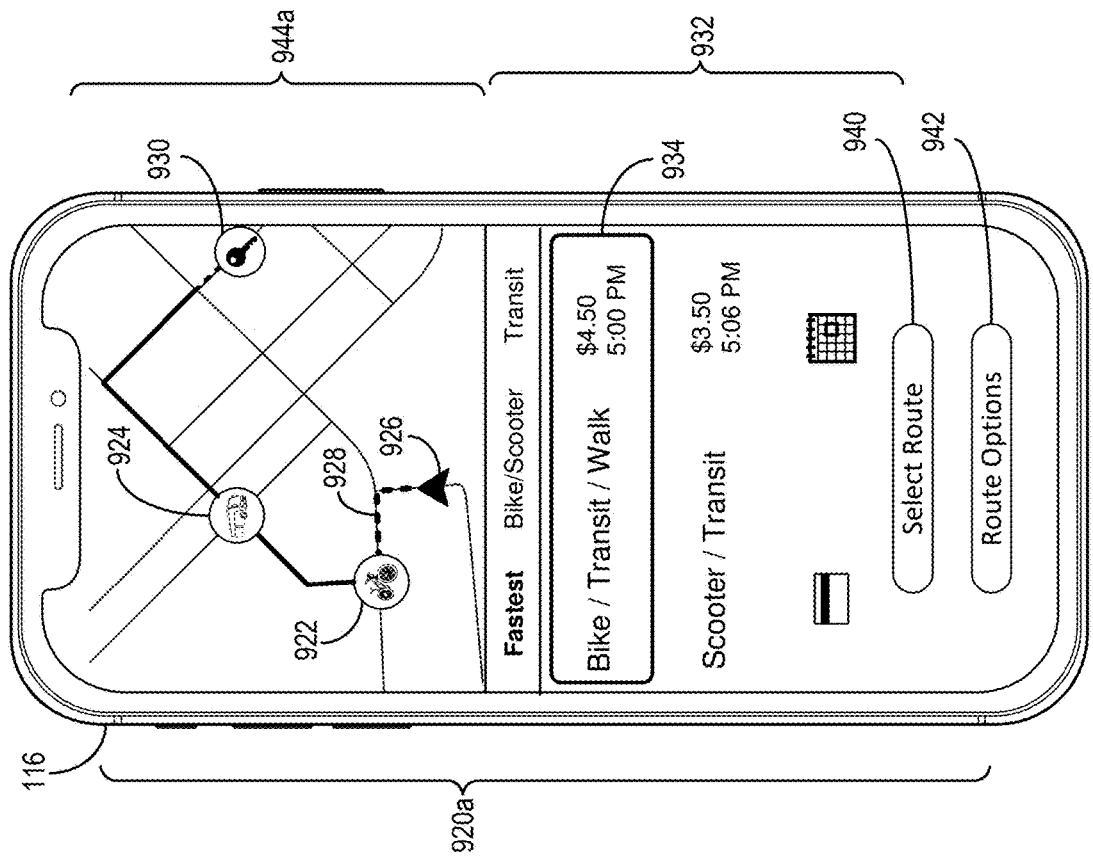

Similarly, based on detected interaction with the alternative-transportation option 908 illustrated in FIG. 9A, the requestor device 116 updates the graphical user interface to present alternative intermediate transportation options including bikeshare/scooter-share and public transportation options. FIG. 9C and the accompanying discussion provide additional detail regarding an example alternative intermediate transportation graphical user interface by which the requestor device 116 presents additional intermediate transportation options.

As further shown in FIG. 9A, based on detecting selection of the rental-vehicle-information element 909, the requestor device 116 updates the graphical user interface to provide additional information regarding the rental vehicle 126. For example, the requestor device 116 may update the graphical user interface to include additional information similar to that illustrated in FIGS. 8A-8D regarding the rental vehicle duration, coverage information, add-on information, and other information.

Additionally, the requestor device 116 presents, as part of the intermediate transportation graphical user interface 902 illustrated in FIG. 9A, the route-option elements 738 as described above with respect to FIG. 7B. In at least one embodiment, the requestor device 116 presents the nearest available transportation options based on selection of the corresponding icon. For example, if the requestor 120 would like to see what bikeshare options are nearby, the requestor 120 may select the bike icon.

As mentioned, based on detecting selection of the provider-matching option 906, the requestor device 116 presents a provider-matching-user interface. FIG. 9B illustrates an example provider-matching-user interface 910. The provider-matching-user interface 910 includes a provider location map element 919, a discount notification 918, intermediate provider matching transportation options 912 including a selected intermediate provider transportation option 914, and an intermediate provider vehicle selection element 916.

As illustrated in FIG. 9B, the provider location map element 919 includes icons that indicate the locations of the requestor 120, the rental-vehicle location, and available intermediate provider vehicles. Additionally, the provider location map element 919 includes the predicted route by which the intermediate provider vehicle transports the requestor 120 to the rental-vehicle location. For example, the route shown in the provider location map element 919 represents the first segment of the rental route by which an intermediate vehicle transports the requestor 120 to the rental-vehicle location.

The provider-matching-user interface 910 illustrated in FIG. 9B also includes the discount notification 918. In particular, the multi-modal-transportation system 114 may provide a discount for the intermediate route if the multi-modal-transportation system 114 determines to utilize an intermediate provider vehicle to transport the requestor 120 to the rental-vehicle location. For example, as illustrated, the multi-modal-transportation system 114 notifies the requestor 120 of a $20 discount off the intermediate provider vehicle ride.

The requestor device 116 also presents various intermediate provider vehicle options via the intermediate provider matching transportation options 912. For example, the multi-modal-transportation system 114 transmits potential options including a private intermediate provider vehicle, a shared intermediate provider vehicle, luxury vehicles, and vehicles with extra space.

As further illustrated in FIG. 9B, the requestor device 116 detects an interaction with the selected intermediate provider transportation option 914. The requestor device 116 may automatically update the provider location map element 919 to present the location of the intermediate provider vehicle corresponding to the selected intermediate provider transportation option 914. Based on receiving a detected interaction with the intermediate provider vehicle selection element 916, the multi-modal-transportation system 114 sends intermediate transportation request information to the selected intermediate provider vehicle via the intermediate provider vehicle device.

As mentioned, based on detecting user selection of the alternative-transportation option 908 illustrated in FIG. 9A, the requestor device 116 presents an alternative intermediate transportation graphical user interface. FIGS. 9C-9D illustrate alternative intermediate transportation graphical user interfaces 920a and 920b, respectively. In particular, the alternative intermediate transportation graphical user interfaces 920a-920b include various other intermediate transportation options beside the intermediate provider transportation option.

As illustrated in FIG. 9C, for example, the requestor device 116 presents the alternative intermediate transportation graphical user interface 920a based on receiving data from the multi-modal-transportation system 114. The alternative intermediate transportation graphical user interface 920a includes an intermediate vehicle location map 944a, an intermediate transportation selection element 932, a select-route option 940, and a route-modification option 942.

As illustrated in FIG. 9C, the intermediate vehicle location map 944a indicates the locations of intermediate vehicles and a route to the rental-vehicle location. For example, the intermediate vehicle location map 944a includes a requestor icon 926, a bike share icon 922, a transit icon 924, and a rental-vehicle location icon 930. The icons represent the locations of the respective intermediate vehicles for the intermediate transportation route. The multi-modal-transportation system 114 provides directions to the requestor 120 via the requestor device 116 within the intermediate vehicle location map 944a. For example, the multi-modal-transportation system 114 directs the requestor 120 to walk via a walking route 928 to the location indicated by the bike share icon 922. The multi-modal-transportation system 114 can determine that the requestor 120 has accessed an intermediate bikeshare bicycle based on determining that the requestor 120 is in proximity to the intermediate bikeshare bicycles. For example, the multi-modal-transportation system 114 may access location information of the requestor device 116 and/or distance signals (e.g., Bluetooth signals) communicated between the requestor device 116 and the bike share system. Based on determining that the requestor 120 is in proximity to the intermediate bikeshare bicycles, the multi-modal-transportation system 114 directs the requestor 120 via the requestor device 116 to the transit location indicated by the transit icon 924.

As further illustrated in FIG. 9C, the intermediate transportation selection element 932 presents various intermediate transportation options, including a selected-intermediate-route summary 934. The requestor device 116 may, using interaction with elements within the intermediate transportation selection element 932, present different intermediate transportation options. For example, the requestor device 116 can present the fastest intermediate transportation route, intermediate transportation routes that utilize only bikes/scooters, and/or intermediate transportation routes that only use public transit. As illustrated, the requestor device 116 presents the fastest intermediate transportation option that utilizes a combination of bike/scooter and transit options.

As further illustrated in FIG. 9C, the requestor device 116 detects a selection of an intermediate route indicated by the selected-intermediate-route summary 934. The selected-intermediate-route summary 934 indicates details for the intermediate route, including the intermediate vehicles involved, the predicted intermediate vehicle rate, and the estimated time of arrival at the rental-vehicle location. The requestor device 116 updates the intermediate vehicle location map 944a based on the selected-intermediate-route summary 934 and data from the multi-modal-transportation system 114. As illustrated, the selected-intermediate-route summary 934 visually references a bike, transit, and walking to reach the rental-vehicle location. Thus, the requestor device 116 presents the intermediate vehicle location map 944a indicating the selected intermediate transportation route.

As further shown in FIG. 9C, the requestor device 116 presents further options for selecting or modifying an intermediate route-including a select-route option 940 to select an intermediate route indicated by the selected-intermediate-route summary 934 and a route-modification option 942 to view options to adjust a selected intermediate route. Based on detecting a selection of the select-route option 940, the multi-modal-transportation system 114 directs the requestor 120 via the requestor device 116 to the rental-vehicle location using the selected intermediate vehicles. Based on detecting a selection of the route-modification option 942, the multi-modal-transportation system 114 may adjust options for the intermediate route. The multi-modal-transportation system 114 may receive, from the requestor device 116, intermediate route preferences. For example, the requestor device 116 can indicate to the multi-modal-transportation system 114 that the requestor 120 would like to eliminate public transportation options. Additionally, the requestor device 116 can send a request to the multi-modal-transportation system 114 to view additional intermediate transportation options including ferries, taxis, and others.

As mentioned, the multi-modal-transportation system 114 may present specific instructions or directions to the requestor 120 for using the intermediate transportation route. The multi-modal-transportation system 114 may provide additional detail regarding individual intermediate transportation routes based on detected interaction with the intermediate vehicle location map 944a. For example, the requestor device 116 can update the alternative intermediate transportation graphical user interface 920a to provide additional detail regarding the walking route 928 based on a selection of the walking route 928. In other embodiments, the requestor device 116 provides detailed directions based on detecting selection of the select-route option 940. FIG. 9D illustrates the requestor device 116 updating the alternative intermediate transportation graphical user interface 920b to provide specific detail regarding the intermediate vehicle route.

As illustrated in FIG. 9D, the requestor device 116 updates the alternative intermediate transportation graphical user interface 920b to provide specific detail regarding the selected walking route 928. For example, the multi-modal-transportation system 114 transmits data for the requestor device 116 to update the intermediate vehicle location map 944b. Additionally, the requestor device 116 updates the alternative intermediate transportation graphical user interface 920b to include selected intermediate route information 946, navigation instructions 948, and a route overview element 950.

The intermediate vehicle location map 944b illustrated in FIG. 9D includes more detailed information regarding the walking route 928. For example, the requestor device 116 presents a zoomed-in view of the walking route 928 to provide additional specifics regarding the walking route 928. In some embodiments, the intermediate vehicle location map 944b can include details such as street, landmark, and local building names.

As further illustrated in FIG. 9D, the alternative intermediate transportation graphical user interface 920b includes the selected intermediate route information 946. The selected intermediate route information 946 provides additional detail regarding the selected intermediate route portion. As illustrated, the requestor device 116 presents the distance that the requestor 120 needs to walk along the walk route 928. Additionally, the alternative intermediate transportation graphical user interface 920b may include the estimated time of arrival to either the next intermediate vehicle or the rental-vehicle location within the selected intermediate route information 946.

The navigation instructions 948 include instructions to direct the requestor 120 along the intermediate transportation route. Though not illustrated, the navigation instructions 948 can be accompanied by audio instructions. The audio instructions may comprise dictated instructions as included in the navigation instructions 948.

Based on detecting interaction with the route overview element 950, the requestor device 116 returns to the alternative intermediate transportation graphical user interface 920a of FIG. 9C that provides an overview of the entire intermediate transportation route.

FIGS. 9A-9D illustrate example graphical user interfaces relating to intermediate transportation routes including provider-matching transportation options and alternative intermediate transportation options. As discussed previously, in at least one embodiment, the multi-modal-transportation system 114 utilizes an autonomous vehicle along the intermediate transportation route. Though not illustrated in FIG. 9A, in at least one embodiment, the intermediate transportation graphical user interface 902 includes an autonomous vehicle selection element in addition to (or in place of) the provider-matching option 906 and the alternative-transportation option 908 illustrated in FIG. 9A. Based on detecting user selection of the autonomous vehicle selection element, the requestor device 116 presents an intermediate autonomous vehicle graphical user interface. FIG. 9E illustrates a vehicle-notification-user interface 962 for an autonomous vehicle. As illustrated in FIG. 9E, the vehicle-notification-user interface 962 includes an autonomous vehicle location map 960 and autonomous vehicle information.

The autonomous vehicle location map 960 includes the rental-vehicle location icon 930 and an autonomous vehicle icon 964 indicating the current location of the autonomous vehicle. The autonomous vehicle information 966 includes information relevant to the autonomous vehicle. For example, the requestor device 116 presents information about the autonomous vehicle including an image of the autonomous vehicle and license plate information for the autonomous vehicle. The requestor device 116 may also present information including the estimated time of arrival for the autonomous vehicle to arrive at the current location of the requestor 120. Additionally, the requestor device 116 may present the make and model of the autonomous vehicle.

Figure 10:
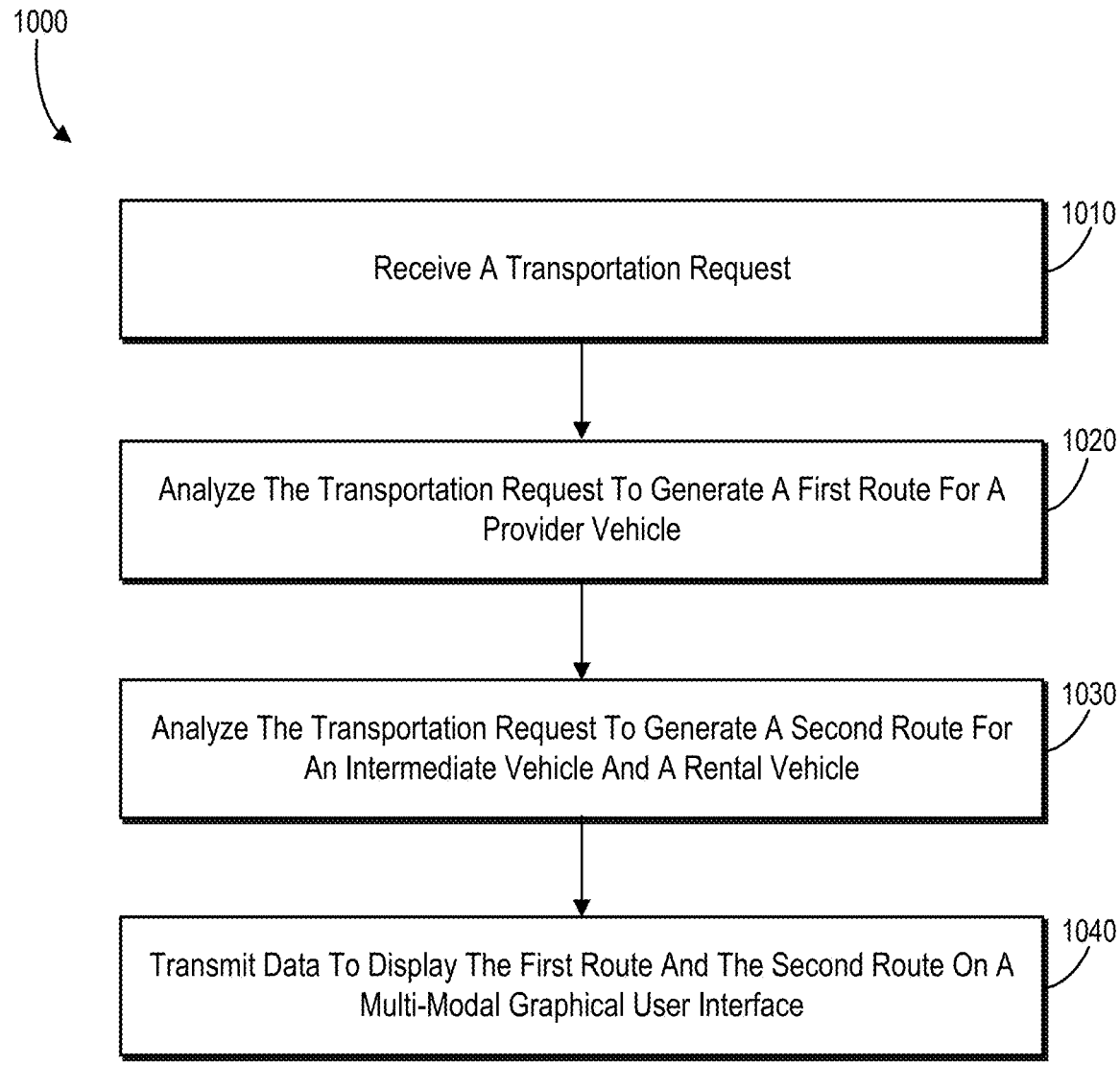
FIG. 10 illustrates a flowchart of a series of acts in a method of determining different routes along which provider vehicles and rental vehicles can transport a requestor to a destination and transmitting indicators of such routes to a computing device for display on a multi-modal graphical user interface in accordance with one or more embodiments.

FIGS. 1-9E, the corresponding text, and the examples provide several different systems, methods, techniques, components and/or devices of the multi-modal-transportation system 114 in accordance with one or more embodiments. In addition to the above description, one or more embodiments can also be described in terms of flowcharts including acts for accomplishing a particular result. For example, FIG. 10 illustrates a flowchart of an example sequence of acts in accordance with one or more embodiments. In addition, the acts illustrated in FIG. 10 may be performed with more or fewer acts. Further, the acts may be performed in different orders. The acts described herein may be repeated or performed in parallel with one another or in parallel with different instances of the same or similar acts.

To illustrate, FIG. 10 includes a flowchart of a series of acts 1000 of determining different routes along which provider vehicles and rental vehicles can transport a requestor to a destination and transmitting indicators of such routes to a computing device for display on a multi-modal graphical user interface. As shown, the series of acts includes an act 1010 of receiving a transportation request. In particular, the act 1010 includes receiving a transportation request transmitted by a mobile device associated with a requestor, the transportation request indicating a pickup location and a destination location.

The series of acts 1000 includes act 1020 of analyzing data signals to generate a first route for a provider vehicle. In particular, the act 1020 includes analyzing the transportation request to generate a first route for a provider vehicle to transport the requestor to the destination location. In some embodiments, the first route for the provider vehicle comprises a direct route for a single provider vehicle to transport the requestor from the pickup location to the destination location.

The series of acts 1000 includes act 1030 of analyzing data signals to generate a second route for an intermediate vehicle and a rental vehicle. In particular, the act 1030 includes analyzing the transportation request to generate a second route for an intermediate vehicle and a rental vehicle to respectively transport the requestor along a first segment and a second segment of the second route to the destination location. In some cases, the second route for the intermediate vehicle and the rental vehicle comprises a multi-segment route, where the intermediate vehicle transports the requestor from the pickup location to an intermediate location between the pickup location and the destination location along the first segment of the second route; and the rental vehicle transports the requestor from the intermediate location to the destination location along the second segment of the second route.

The series of acts 1000 includes act 1040 of transmitting data to display the first route and the second route on a multi-modal graphical user interface. In particular, the act 1040 includes transmitting, to the mobile device, data for the first route and the second route to display within a multi-modal graphical user interface. In at least one embodiment, the act 1040 further comprises the acts of transmitting the data for the second route to the mobile device based on analyzing data signals associated with the transportation request comprising one or more of: a first set of historical transportation data for provider vehicles traveling from a geographic area associated with the pickup location to a geographic area associated with the destination location; a second set of historical transportation data for the requestor using provider vehicles for transportation; a provider-vehicle rate for the provider vehicle to transport the requestor to the destination location; or a rental-vehicle rate for the rental vehicle to travel from a rental-vehicle location to the destination location.

The series of acts 1000 can further include the acts of selecting the intermediate vehicle from among a set of available intermediate vehicles based on a location of the mobile device and a rental-vehicle location of the rental vehicle; receiving, from the mobile device, an indication of a selection by the requestor of a rental-vehicle option corresponding to the second route; and based on the selection of the rental-vehicle option, generating, for display on the mobile device, a walking route for the requestor to travel from the location of the mobile device to an initial location of the intermediate vehicle.

Additionally, the series of acts 1000 can further include the acts of selecting an autonomous vehicle from a set of available intermediate vehicles within a threshold distance of a location of the mobile device; receiving, from the mobile device, an indication of a selection by the requestor of a rental-vehicle option corresponding to the second route; and based on the selection of the rental-vehicle option, transmitting routing instructions to the autonomous vehicle to navigate to the pickup location to pick up the requestor.

The series of acts 1000 can also include the acts of selecting the intermediate vehicle from among a set of available intermediate vehicles based on a location of the mobile device and a location of the rental vehicle; providing, for display within the multi-modal graphical user interface, a rental-vehicle option corresponding to the second route; and based on receiving an indication of a selection of the rental-vehicle option from the mobile device, generating, for display on the mobile device, a walking route for the requestor to travel from the location of the mobile device to an initial location of the intermediate vehicle.

The series of acts 1000 can also include the acts of selecting an autonomous vehicle from a set of available intermediate vehicles within a threshold distance of a location of the mobile device; receiving, from the mobile device, an indication of a selection by the requestor of a rental-vehicle option corresponding to the second route; and based on the selection of the rental-vehicle option, transmitting routing instructions to the autonomous vehicle to navigate to the pickup location to pick up the requestor.

The series of acts 1000 may also include the acts of providing, for display within the multi-modal graphical user interface, a rental-vehicle option corresponding to the second route; based on receiving an indication of a selection of the rental-vehicle option from the mobile device: transmitting a rental-vehicle-matching identifier to a vehicle-display device of the rental vehicle to cause the vehicle-display device to present a visual indicator representing a matching between the rental vehicle and the mobile device; and transmitting the rental-vehicle-matching identifier to the mobile device to cause the mobile device to present the visual indicator representing the matching between the rental vehicle and the mobile device.

The series of acts 1000 can also include the acts of receiving, from the mobile device, an indication of a selection by the requestor of a rental-vehicle option corresponding to the second route; and based on the selection of the rental-vehicle option, transmitting a virtual key to the mobile device to unlock the rental vehicle for the requestor.

The series of acts 1000 may also include the additional acts of generating a first estimated rate for the first segment of the second route by which the intermediate vehicle transports the requestor from the pickup location to a location of the rental vehicle; generating a second estimated rate for the second segment of the second route by which the rental vehicle travels from the location of the renal vehicle to the destination location; and transmitting, to the mobile device, the data further comprising indications of the first estimated rate and the second estimated rate for presentation with the second route within the multi-modal graphical user interface.

The components of the multi-modal-transportation system 114 can include software, hardware, or both. For example, the components of the multi-modal-transportation system 114 can include one or more instructions stored on a computer-readable storage medium and executable by processors of one or more computing devices (e.g., the computing device 1100). When executed by the one or more processors, the computer-executable instructions of the multi-modal-transportation system 114 can cause the computing device 1100 to perform the methods described herein. Alternatively, the components of the multi-modal-transportation system 114 can comprise hardware, such as a special purpose processing device to perform a certain function or group of functions. Additionally or alternatively, the components of the multi-modal-transportation system 114 can include a combination of computer-executable instructions and hardware.

Furthermore, the components of the multi-modal-transportation system 114 performing the functions described herein may, for example, be implemented as part of a stand-alone application, as a module of an application, as a plug-in for applications including content management applications, as a library function or functions that may be called by other applications, and/or as a cloud-computing model. Thus, the components of the multi-modal-transportation system 114 may be implemented as part of a stand-alone application on a personal computing device or a mobile device. Alternatively or additionally, the components of the multi-modal-transportation system 114 may be implemented in any application that allows creation and delivery of marketing content to users, including, but not limited to, various applications.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
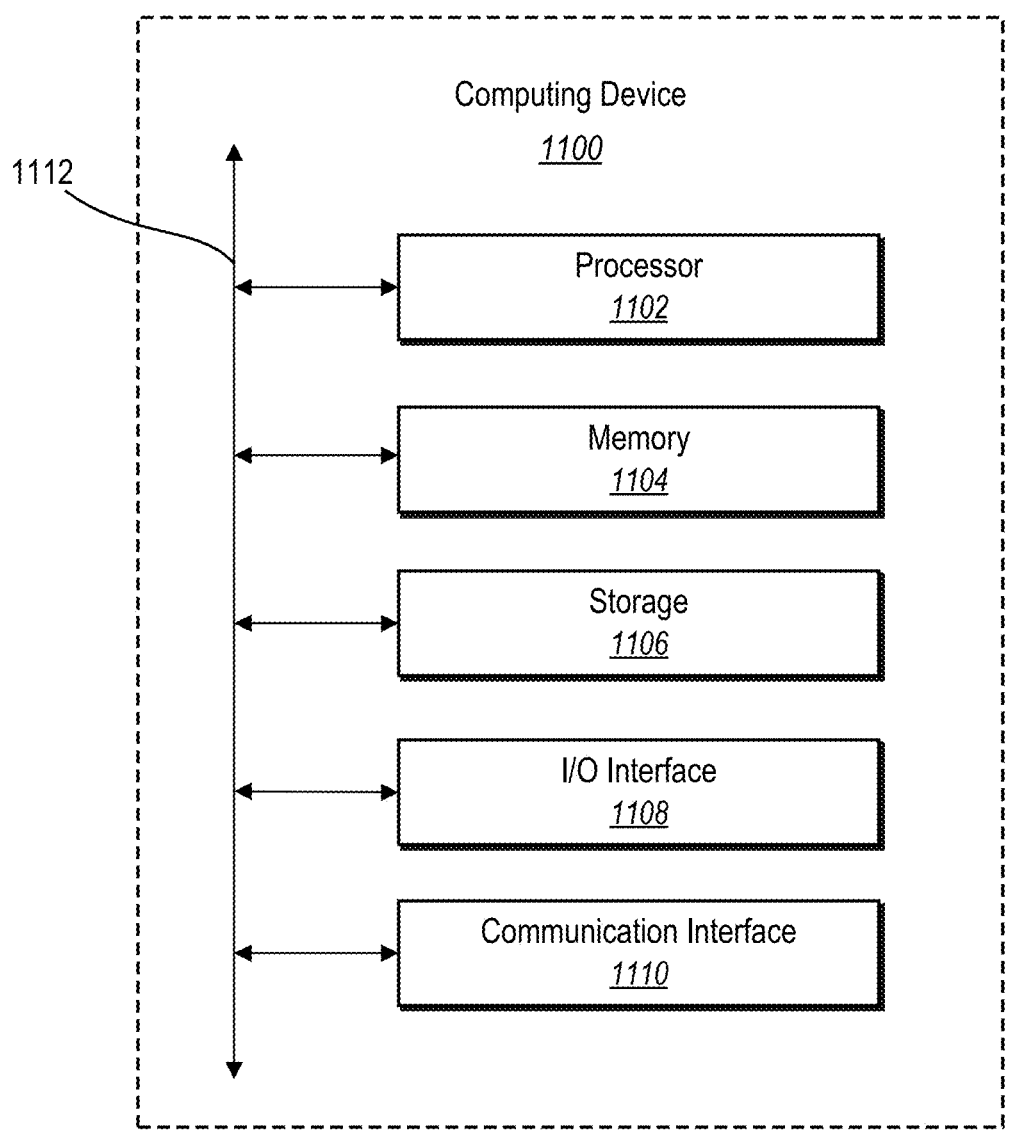
FIG. 11 illustrates a block diagram of an example computing device in accordance with one or more embodiments.

FIG. 11 illustrates, in block diagram form, an exemplary computing device 1100 (e.g., the server(s) 110, the provider device 107, the rental vehicle device 130, and/or the requestor device 116) that may be configured to perform one or more of the processes described above. One will appreciate that the multi-modal-transportation system 114 can comprise implementations of the computing device 1100, including, but not limited to, the requestor device 116, the provider device 107, the rental vehicle device 130, and/or the server(s) 110. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, the processor 1102 includes hardware for executing instructions, such as those making up a computer program. As an example, and not by way of limitation, to execute instructions, the processor 1102 may retrieve (or fetch) the instructions from an internal register, an internal cache, memory 1104, or a storage device 1106 and decode and execute them.

The computing device 1100 includes memory 1104, which is coupled to the processor 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive ("HDD"), flash memory, a Universal Serial Bus ("USB") drive or a combination of these or other storage devices.

The computing device 1100 also includes one or more input or output interface 1108 (or "I/O interface 1108"), which are provided to allow a user (e.g., requestor or provider) to provide input to (such as user strokes), receive output from, and otherwise transfer data to and from the computing device 1100. The I/O interface 1108 may include a mouse, keypad or a keyboard, a touch screen, camera, optical scanner, network interface, modem, other known I/O devices or a combination of such. The touch screen may be activated with a stylus or a finger.

The I/O interface 1108 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can comprise hardware, software, or both that connects components of computing device 1100 to each other.

FIG. 12 illustrates an example network environment 1200 of the dynamic transportation matching system 112. The network environment 1200 includes a client device 1206 (e.g., the requestor device 116, the rental vehicle device 130, or the provider device 107), the dynamic transportation matching system 112, and a vehicle subsystem 1208 connected to each other by a network 1204. Although FIG. 12 illustrates a particular arrangement of the client device 1206, the dynamic transportation matching system 112, the vehicle subsystem 1208, and the network 1204, this disclosure contemplates any suitable arrangement of client device 1206, the dynamic transportation matching system 112, the vehicle subsystem 1208, and the network 1204. As an example, and not by way of limitation, two or more of client device 1206, the dynamic transportation matching system 112, and the vehicle subsystem 1208 communicate directly, bypassing network 1204. As another example, two or more of client device 1206, the dynamic transportation matching system 112, and the vehicle subsystem 1208 may be physically or logically co-located with each other in whole or in part.

Moreover, although FIG. 12 illustrates a particular number of client devices 1206, dynamic transportation matching system 112, vehicle subsystems 1208, and networks 1204, this disclosure contemplates any suitable number of client devices 1206, dynamic transportation matching system 112, vehicle subsystems 1208, and networks 1204. As an example, and not by way of limitation, network environment 1200 may include multiple client device 1206, dynamic transportation matching system 112, vehicle subsystems 1208, and/or networks 1204.

This disclosure contemplates any suitable network 1204. As an example, and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, multi-modal-transportation system 114, and vehicle subsystem 1208 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by client device 1206. As an example, and not by way of limitation, a client device 1206 may include any of the computing devices discussed above in relation to FIG. 11. A client device 1206 may enable a network user at the client device 1206 to access the network 1204. A client device 1206 may enable its user to communicate with other users at other client devices 1206.

In particular embodiments, the client device 1206 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1206 one or more Hyper Text Markup Language ("HTML") files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, dynamic transportation matching system 112 may be a network-addressable computing system that can host a transportation matching network. The dynamic transportation matching system 112 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the dynamic transportation matching system 112. In addition, the dynamic transportation matching system 112 may manage identities of service requestors such as users/requestors. In particular, the dynamic transportation matching system 112 may maintain requestor data such as driving/riding histories, personal data, or other user data in addition to navigation and/or traffic management services or other location services (e.g., GPS services).

In particular embodiments, the dynamic transportation matching system 112 may manage transportation matching services to connect a user/requestor with a vehicle and/or provider. By managing the transportation matching services, the dynamic transportation matching system 112 can manage the distribution and allocation of resources from vehicle systems and user resources such as GPS location and availability indicators, as described herein.

The dynamic transportation matching system 112 may be accessed by the other components of network environment 1200 either directly or via network 1204. In particular embodiments, the dynamic transportation matching system 112 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 112 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a dynamic transportation matching system 112 to manage, retrieve, modify, add, or delete, the information stored in data store.

In particular embodiments, the dynamic transportation matching system 112 may provide users with the ability to take actions on various types of items or objects, supported by the dynamic transportation matching system 112. As an example, and not by way of limitation, the items and objects may include transportation matching networks to which users of the dynamic transportation matching system 112 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 112 or by an external system of a third-party system, which is separate from dynamic transportation matching system 112 and coupled to the dynamic transportation matching system 112 via a network 1204.

In particular embodiments, the dynamic transportation matching system 112 may be capable of linking a variety of entities. As an example, and not by way of limitation, the dynamic transportation matching system 112 may enable users to interact with each other or other entities, or to allow users to interact with these entities through an application programming interfaces ("API") or other communication channels.

In particular embodiments, the dynamic transportation matching system 112 may include a variety of servers, sub-systems, programs, modules, logs, and data stores. In particular embodiments, the dynamic transportation matching system 112 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requestor profile) store, connection store, third-party content store, or location store. The dynamic transportation matching system 112 may also include suitable components such as network interfaces, security mechanisms, load balancers, failover servers, management-and-network-operations consoles, other suitable components, or any suitable combination thereof. In particular embodiments, the dynamic transportation matching system 112 may include one or more user-profile stores for storing user profiles for transportation providers and/or transportation requestors. A user profile may include, for example, biographic information, demographic information, behavioral information, social information, or other types of descriptive information, such as interests, affinities, or location.

The web server may include a mail server or other messaging functionality for receiving and routing messages between the dynamic transportation matching system 112 and one or more client devices 1206. An action logger may be used to receive communications from a web server about a user's actions on or off the dynamic transportation matching system 112. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of the dynamic transportation matching system 112. A privacy setting of a user determines how particular information associated with a user can be shared. The authorization server may allow users to opt in to or opt out of having their actions logged by the dynamic transportation matching system 112 or shared with other systems, such as, for example, by setting appropriate privacy settings. Third-party-content-object stores may be used to store content objects received from third parties. Location stores may be used for storing location information received from client devices 1206 associated with users.

In addition, the vehicle subsystem 1208 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once i.e., split up throughout the vehicle subsystem 1208 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1208 may include a communication device capable of communicating with the client device 1206 and/or the multi-modal-transportation system 114. For example, the vehicle subsystem 1208 can include an on-board computing device communicatively linked to the network 1204 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A transportation matching system comprising:
   at least one processor; and
   a non-transitory computer-readable medium comprising instructions that, when executed by the at least one processor, cause the transportation matching system to:
      receive a transportation request transmitted by a mobile device, the transportation request indicating a pickup location, a number of waypoints, and a destination location;
      determine a set of data signals associated with the transportation request, wherein the set of data signals comprises the number of waypoints for the transportation request;
      based on determining that the number of waypoints satisfies a waypoint threshold value, determine to surface a rental-vehicle option to the mobile device;
      upon determining to surface the rental-vehicle option to the mobile device, transmit data to the mobile device to display:
         a provider-matching option corresponding to a first route for a provider vehicle to transport a requestor to the destination location; and
         the rental-vehicle option corresponding to a second route for a rental vehicle to transport the requestor to the destination location; and
      based on a selection of the rental-vehicle option, transmit data to the mobile device to display a rental-vehicle pickup location icon for a pickup location of the rental vehicle within a map of a multi-modal graphical user interface.

2. The transportation matching system as recited in claim 1, further comprising instructions that, when executed by the at least one processor, cause the transportation matching system to:
   select an intermediate vehicle from among a set of available intermediate vehicles based on a location of the mobile device and a location of the rental vehicle;
   provide, for display within the multi-modal graphical user interface, a rental-vehicle option corresponding to the second route; and
   based on receiving an indication of the selection of the rental-vehicle option from the mobile device, generate, for display on the mobile device, a walking route for the requestor to travel from the location of the mobile device to an initial location of the intermediate vehicle.

3. The transportation matching system as recited in claim 1, wherein determining to surface the rental-vehicle option to the mobile device further comprises analyzing destination location characteristics including a terrain of the destination location and a surrounding area.

4. The transportation matching system as recited in claim 1, further comprising instructions that, when executed by the at least one processor, cause the transportation matching system to:
   provide, for display within the multi-modal graphical user interface, a rental-vehicle option corresponding to the second route; and
   based on receiving an indication of a selection of the rental-vehicle option from the mobile device:
      transmit a rental-vehicle-matching identifier to a vehicle-display device of the rental vehicle to cause the vehicle-display device to present a visual indicator representing a matching between the rental vehicle and the mobile device; and
      transmit the rental-vehicle-matching identifier to the mobile device to cause the mobile device to present the visual indicator representing the matching between the rental vehicle and the mobile device.

5. The transportation matching system as recited in claim 1, wherein the second route for the rental vehicle comprises a multi-segment route, wherein:
- an intermediate vehicle transports the requestor from the pickup location to an intermediate location between the pickup location and the destination location along a first segment of the second route; and
- the rental vehicle transports the requestor from the intermediate location to the destination location along a second segment of the second route.

6. The transportation matching system as recited in claim 1, further comprising instructions that, when executed by the at least one processor, cause the transportation matching system to transmit the data for the second route to the mobile device based on analyzing data signals associated with the transportation request comprising one or more of:
- a first set of historical transportation data for provider vehicles traveling from a geographic area associated with the pickup location to a geographic area associated with the destination location;
- a second set of historical transportation data for the requestor using provider vehicles for transportation;
- a provider-vehicle rate for the provider vehicle to transport the requestor to the destination location; or
- a rental-vehicle rate for the rental vehicle to travel from a location of the rental vehicle to the destination location.

7. The transportation matching system as recited in claim 1, further comprising instructions that, when executed by the at least one processor, cause the transportation matching system to:
- generate a first estimated rate for a first segment of the second route by which an intermediate vehicle transports the requestor from the pickup location to the pickup location of the rental vehicle;
- generate a second estimated rate for a second segment of the second route by which the rental vehicle travels from the pickup location of the rental vehicle to the destination location; and
- transmit, to the mobile device, the data further comprising indications of the first estimated rate and the second estimated rate for presentation with the second route within the multi-modal graphical user interface.

8. A method comprising:
- receiving a transportation request transmitted by a mobile device, the transportation request indicating a pickup location, a number of waypoints, and a destination location;
- determining a set of data signals associated with the transportation request, wherein the set of data signals comprises the number of waypoints for the transportation request;
- based on determining that the number of waypoints satisfies a waypoint threshold value, determining to surface a rental-vehicle option to the mobile device;
- upon determining to surface the rental-vehicle option to the mobile device, transmitting data to the mobile device to display:
  - a provider-matching option for a provider vehicle to transport a requestor along a first route to the destination location; and
  - the rental-vehicle option for a rental vehicle to transport the requestor along a second route to the destination location; and
- based on a selection of the rental-vehicle option, transmitting data to the mobile device to display a rental-vehicle pickup location icon for a pickup location of the rental vehicle within a map of a multi-modal graphical user interface.

9. The method as recited in claim 8, further comprising:
- selecting an intermediate vehicle from among a set of available intermediate vehicles based on a location of the mobile device and a location of the rental vehicle; and
- based on receiving an indication of the selection of the rental-vehicle option from the mobile device, generating, for display on the mobile device, a walking route for the requestor to travel from the location of the mobile device to an initial location of the intermediate vehicle.

10. The method as recited in claim 8, wherein determining to surface the rental-vehicle option to the mobile device further comprises analyzing one or more of: historical transportation data for other requestors associated with historical transportation routes to the destination location; or historical transportation data for frequency of provider vehicles traveling from the pickup location to the destination location.

11. The method as recited in claim 8 further comprising, based on receiving an indication of a selection of the rental-vehicle option from the mobile device:
- transmitting a rental-vehicle-matching identifier to a vehicle-display device of the rental vehicle to cause the vehicle-display device to present a visual indicator representing a matching between the rental vehicle and the mobile device; and
- transmitting the rental-vehicle-matching identifier to the mobile device to cause the mobile device to present the visual indicator representing the matching between the rental vehicle and the mobile device.

12. The method as recited in claim 8, wherein the second route of the rental-vehicle option comprises a multi-segment route, wherein:
- an intermediate vehicle transports the requestor from the pickup location to an intermediate location between the pickup location and the destination location along a first segment of the second route; and
- the rental vehicle transports the requestor from the intermediate location to the destination location along a second segment of the second route.

13. The method as recited in claim 8, wherein analyzing the transportation request comprises analyzing data signals associated with the transportation request comprising one or more of:
- a first set of historical transportation data for provider vehicles traveling from a geographic area associated with the pickup location to a geographic area associated with the destination location;
- a second set of historical transportation data for the requestor using provider vehicles for transportation;
- a provider-vehicle rate for the provider vehicle to transport the requestor to the destination location; or
- a rental-vehicle rate for the rental vehicle to travel from a location of the rental vehicle to the destination location.

14. The method as recited in claim 8, further comprising:
- generating a first estimated rate for a first segment of the second route by which an intermediate vehicle transports the requestor from the pickup location to the pickup location of the rental vehicle;
- generating a second estimated rate for a second segment of the second route by which the rental vehicle travels from the pickup location of the rental vehicle to the destination location; and transmitting, to the mobile device, the data further comprising indications of the first estimated rate and the second estimated rate for presentation with the second route within the multi-modal graphical user interface.

15. A non-transitory computer-readable medium comprising instructions that, when executed by at least one processor, cause a computing device to:

receive a transportation request transmitted by a mobile device, the transportation request indicating a pickup location, a number of waypoints, and a destination location;

determine a set of data signals associated with the transportation request, wherein the set of data signals comprises the number of waypoints for the transportation request;

based on determining that the number of waypoints satisfies a waypoint threshold value, determine to surface a rental-vehicle option to the mobile device;

upon determining to surface the rental-vehicle option to the mobile device, transmit data to the mobile device to display:
  a provider-matching option for a provider vehicle to transport a requestor to the destination location; and
  the rental-vehicle option for a rental vehicle to transport the requestor along a second route to the destination location; and based on a selection of the rental-vehicle option, transmit data to the mobile device to display a rental-vehicle pickup location icon for a pickup location of the rental vehicle within a map of a multi-modal graphical user interface.

16. The non-transitory computer-readable medium as recited in claim 15, further comprising instructions that, when executed by the at least one processor, cause the computing device to:

select an intermediate vehicle from among a set of available intermediate vehicles based on a location of the mobile device and a location of the rental vehicle; and based on receiving an indication of the selection of the rental-vehicle option from the mobile device, generate, for display on the mobile device, a walking route for the requestor to travel from the location of the mobile device to an initial location of the intermediate vehicle.

17. The non-transitory computer-readable medium as recited in claim 15, further comprising instructions, that when executed by the at least one processor, cause the computing device to:

select an autonomous vehicle from a set of available intermediate vehicles within a threshold distance of a location of the mobile device; and based on receiving an indication of a selection of the rental-vehicle option, transmit routing instructions to the autonomous vehicle to navigate to the pickup location to pick up the requestor.

18. The non-transitory computer-readable medium as recited in claim 15, further comprising instructions, that when executed by the at least one processor, cause the computing device to, based on the selection of the rental-vehicle option:

transmit a rental-vehicle-matching identifier to a vehicle-display device of the rental vehicle to cause the vehicle-display device to present a visual indicator representing a matching between the rental vehicle and the mobile device; and transmit the rental-vehicle-matching identifier to the mobile device to cause the mobile device to present the visual indicator representing the matching between the rental vehicle and the mobile device.

19. The non-transitory computer-readable medium as recited in claim 15, further comprising instructions, that when executed by the at least one processor, cause the computing device to, based on the selection of the rental-vehicle option, transmit a virtual key to the mobile device to unlock the rental vehicle for the requestor.

20. The non-transitory computer-readable medium as recited in claim 15, further comprising instructions, that when executed by the at least one processor, cause the computing device to determine a rental score indicating a utility of the rental-vehicle option for the transportation request, the rental score comprising at least one of: a composite of binary scores for a plurality of data signals; or a numerical sum of scores for the plurality of data signals.

* * * * *